United States Patent
Kim et al.

(10) Patent No.: US 10,136,129 B2
(45) Date of Patent: *Nov. 20, 2018

(54) METHOD AND APPARATUS FOR ENCODING/DECODING VIDEO USING SPLIT LAYER

(71) Applicant: SK TELECOM CO., LTD., Seoul (KR)

(72) Inventors: Sunyeon Kim, Seoul (KR); Jeongyeon Lim, Seongnam-si (KR); Joohee Moon, Seoul (KR); Yunglyul Lee, Seoul (KR); Haekwang Kim, Seoul (KR); Byeungwoo Jeon, Seongnam-si (KR); Hyoungmee Park, Suwon-si (KR); Mincheol Park, Bucheon-si (KR); Dongwon Kim, Seoul (KR); Kibaek Kim, Seoul (KR); Juock Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 272 days.

This patent is subject to a terminal disclaimer.

(21) Appl. No.: 14/814,520

(22) Filed: Jul. 31, 2015

(65) Prior Publication Data

US 2015/0341637 A1 Nov. 26, 2015

Related U.S. Application Data

(63) Continuation of application No. 14/663,428, filed on Mar. 19, 2015, which is a continuation of application
(Continued)

(30) Foreign Application Priority Data

| Oct. 1, 2009 | (KR) | 10-2009-0093982 |
| Oct. 1, 2009 | (KR) | 10-2009-0093987 |
| Oct. 1, 2010 | (KR) | 10-2010-0096032 |

(51) Int. Cl.
H04N 19/105 (2014.01)
H04N 19/59 (2014.01)
(Continued)

(52) U.S. Cl.
CPC ........ *H04N 19/105* (2014.11); *H04N 19/119* (2014.11); *H04N 19/122* (2014.11);
(Continued)

(58) Field of Classification Search
CPC .. H04N 19/105; H04N 19/119; H04N 19/122; H04N 19/159; H04N 19/176;
(Continued)

(56) References Cited

U.S. PATENT DOCUMENTS

| 5,903,669 A | 5/1999 | Hirabayashi |
| 6,337,929 B1 | 1/2002 | Kajiwara et al. |

(Continued)

FOREIGN PATENT DOCUMENTS

| CN | 1700772 A | 11/2005 |
| CN | 101002476 A | 7/2007 |

(Continued)

OTHER PUBLICATIONS

Chinese Office Action dated Mar. 24, 2017 corresponding to Chinese Application No. CN 201510089243.1.
(Continued)

*Primary Examiner* — Jorge L Ortiz Criado
*Assistant Examiner* — Yong Joon Kwon
(74) *Attorney, Agent, or Firm* — Hauptman Ham, LLP

(57) ABSTRACT

A method performed by an apparatus of decoding a video in the unit of blocks, includes: extracting and decoding a first information corresponding to a minimum block size and a second information corresponding to a difference between
(Continued)

the minimum block size and a maximum block size, from a bitstream; calculating the maximum block size based on the first information corresponding to the minimum block size and the second information corresponding to the difference; decoding, from the bitstream, partition information of a square current block having the derived maximum block size to identify one or more subblocks in the current block which have sizes equal to or larger than the minimum block size; decoding a prediction mode information of each of the subblocks, the prediction mode information indicating whether a subblock is inter-predicted or intra-predicted; and reconstructing each of the subblocks in the current block by predicting each of the subblocks.

8 Claims, 30 Drawing Sheets

Related U.S. Application Data

No. 13/499,375, filed as application No. PCT/KR2010/006735 on Oct. 1, 2010, now Pat. No. 9,264,716.

(51) Int. Cl.
| | | |
|---|---|---|
| *H04N 19/122* | (2014.01) | |
| *H04N 19/176* | (2014.01) | |
| *H04N 19/159* | (2014.01) | |
| *H04N 19/119* | (2014.01) | |
| *H04N 19/96* | (2014.01) | |
| *H04N 19/463* | (2014.01) | |
| *H04N 19/44* | (2014.01) | |
| *H04N 19/179* | (2014.01) | |

(52) U.S. Cl.
CPC ......... *H04N 19/159* (2014.11); *H04N 19/176* (2014.11); *H04N 19/179* (2014.11); *H04N 19/44* (2014.11); *H04N 19/463* (2014.11); *H04N 19/59* (2014.11); *H04N 19/96* (2014.11)

(58) Field of Classification Search
CPC .... H04N 19/179; H04N 19/44; H04N 19/463; H04N 19/59; H04N 19/96
USPC .................................................. 375/240.12
See application file for complete search history.

(56) References Cited

U.S. PATENT DOCUMENTS

| | | | |
|---|---|---|---|
| 8,374,241 | B2 | 2/2013 | Chen et al. |
| 8,503,527 | B2* | 8/2013 | Chen .................... H04N 19/176 375/240.12 |
| 8,792,741 | B2* | 7/2014 | Lee .......................... G06T 9/00 382/238 |
| 2005/0249291 | A1 | 11/2005 | Gordon et al. |
| 2006/0168356 | A1 | 7/2006 | Mairs et al. |
| 2009/0003718 | A1 | 1/2009 | Liu et al. |
| 2009/0110079 | A1 | 4/2009 | Haga et al. |
| 2011/0103475 | A1 | 5/2011 | Alshina et al. |
| 2011/0310976 | A1* | 12/2011 | Wang ................... H04N 19/176 375/240.24 |
| 2012/0155540 | A1* | 6/2012 | Jagannathan ........ H04N 19/176 375/240.16 |

FOREIGN PATENT DOCUMENTS

| | | |
|---|---|---|
| CN | 101507280 A | 8/2009 |
| CN | 101268697 B | 12/2010 |
| JP | 2009-272702 A | 11/2009 |
| KR | 10-1997-0019616 B1 | 4/1997 |

OTHER PUBLICATIONS

Chinese Office Action dated Apr. 27, 2017 corresponding to Chinese Application No. CN 201510089787.8.
S. Naito, A. Matsumura, A Koike, Efficient coding scheme for super high definition video based on extending H.264 high profile, 2005, p. 1-8, vol. 6077, 607727, Visual Communications and Image Processing.
Ching Yang Wang, Shih Jac Liao, Long Wen Chang, Wavelet transform coding using variable blocksize vector quantization with optimal quadtree segmentation, p. 715-718, 1997 IEEE Tencon.
Jaeil Kim, Taeyoung Na, Changhee Kim, Bumshik Lee, Munchurl Kim, Enlarging MB size for high fidelity video coding beyond HD, Oct. 5, 2008, p. 1-6, ITU-Telecommunications Standardization Sector, San Diego, USA.
European Search Report for application No. 10820868.7 dated Sep. 30, 2013.
International Search Report dated Jun. 3, 2011 for PCT/KR2010/006735.

* cited by examiner

M, N are Integers Equal to or Larger than 16

CIF Image Including 396 Macroblocks of Size 16 x 16

CIF Image Including 54 Macroblocks of Size 64 x 32

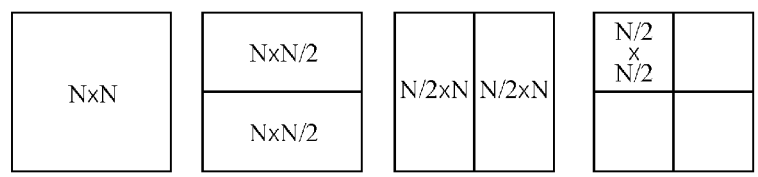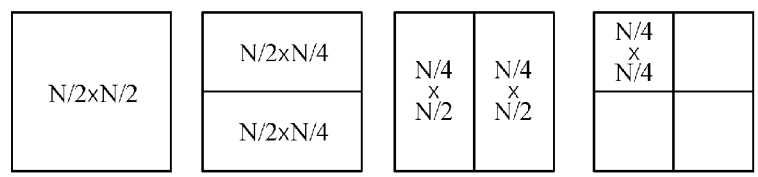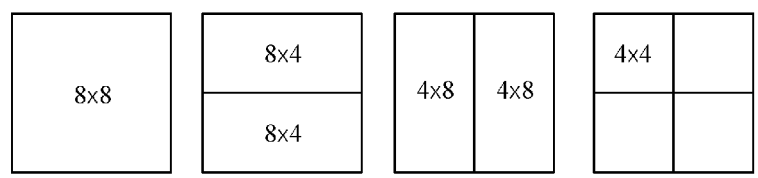
FIG. 9

| Encoding Order | Layer Number | Partition Number | Partition Type |
|---|---|---|---|
| 1 | 0 | 0 | 3 |
| 2 | 1 | 0 | 3 |
| 3 | 2 | 0 | 3 |
| 4 | 3 | 0 | 3 |
| 5 | 3 | 1 | 3 |
| 6 | 3 | 2 | 0 |
| 7 | 3 | 3 | 0 |
| 8 | 2 | 1 | 0 |
| 9 | 2 | 2 | 0 |
| 10 | 2 | 3 | 1 |
| 11 | 1 | 1 | 2 |
| 12 | 1 | 2 | 1 |
| 13 | 1 | 3 | 3 |
| 14 | 2 | 0 | 0 |
| 15 | 2 | 1 | 0 |
| 16 | 2 | 2 | 0 |
| 17 | 2 | 3 | 0 |

*FIG. 13*

Data to be Finally Encoded: "101"

Macroblock Size=64 x 64    Maximum Partition Layer Value: 4

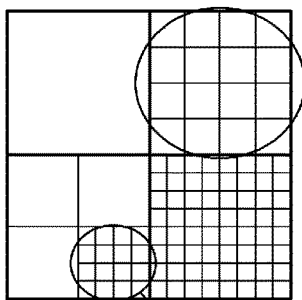

| Partition Number for Each Layer | Partition Number Value | Partition Flag (0: Do Not Split) (1: Split) |
|---|---|---|
| L0 - P0 | 1 | 1 |
| L1 - P0 | 0 | Unnecessary (Partition Type is 0) |
| L1 - P1 | 2 | 0 (Partition Types of L2-P0 to L2-P15 Do Not Have to be Transmitted) |
| L1 - P2 | 1 | 1 |
| L2 - P0 | 0 | Unnecessary (Partition Type is 0) |
| L2 - P1 | 0 | Unnecessary (Partition Type is 0) |
| L2 - P2 | 0 | Unnecessary (Partition Type is 0) |
| L2 - P3 | 2 | Unnecessary (Since Maximum Partition Layer Value is 4, Subblock Cannot be Split Any More) |
| L1 - P3 | 3 | Unnecessary (Subblock Cannot be Split Any More) |

*FIG. 20*

| Encoding Order | Layer Number | Partition Number | Partition Type Number |
|---|---|---|---|
| 1 | 0 | 0 | 1 |
| 2 | 1 | 0 | 1 |
| 3 | 2 | 0 | 0 |
| 4 | 2 | 1 | 0 |
| 5 | 1 | 1 | 2 |
| 6 | 2 | 0 | 0 |
| 7 | 2 | 1 | 0 |

Macroblock Size = 64x64
Maximum Partition Layer Value: 4

Layer 0 Flag: 1 (Use)
Layer 1 Flag: 0 (Not Use)
Layer 2 Flag: 0 (Not Use)
Layer 3 Flag: 1 (Use)

| Layer Number | Partition Type Number |
|---|---|
| – | 3 |
| L1 - P0 | 0 |
| L1 - P1 | 3 |
| L3 - P0 | 0 |
| ... | 0 |
| L3 - P16 | 0 |
| L1 - P2 | 3 |
| L3 - P0 | 2 |
| ... | ... |

METHOD AND APPARATUS FOR ENCODING/DECODING VIDEO USING SPLIT LAYER

CROSS REFERENCE TO RELATED APPLICATIONS

The present application is a continuation of U.S. patent application Ser. No. 14/663,428 filed Mar. 19, 2015, which is a continuation of U.S. patent application Ser. No. 13/499,375 filed Jul. 13, 2012, which is a the National Phase application of International Application No. PCT/KR2010/006735 filed Oct. 1, 2010, which is based upon and claims the benefit of priorities from Korean Patent Application No. 10-2009-0093982, filed on Oct. 1, 2009, Korean Patent Application No. 10-2009-0093987, filed on Oct. 1, 2009, and Korean Patent Application No. 10-2010-0096032, filed on Oct. 1, 2010 in the KIPO (Korean Intellectual Property Office). The disclosures of the above-listed applications are hereby incorporated by reference herein in their entirety.

TECHNICAL FIELD

The present disclosure relates to a method and an apparatus, which perform an encoding and a decoding by unit of subblocks after splitting a block into subblocks.

BACKGROUND ART

The statements in this section merely provide background information related to the present disclosure and do not constitute prior art.

Technologies for compressing video data include H.261, H.263, H.264, MPEG-2, MPEG-4, and so on. According to such video compression standards, each image is divided and encoded into fixedly sized macroblocks formed of rectangular areas having pixels sized 16×16 of luma component and pixels sized 8×8 of chroma component. All luma components and all chroma components of each macroblock are spatially or temporally predicted, and then a predicted residual undergoes a transform, a quantization, and an entropy coding and finally a transmission.

H.264/AVC standard prescribes an encoding apparatus to use a 16×16 pixel block for the fixed macroblock size and subdivide each macroblock into smaller blocks for which an intra prediction or an inter prediction is carried out. In carrying out the intra prediction encoding, each macroblock may be divided into 16×16, 8×8, or 4×4 sizes, and the block of size 16×16 is intra predicted in one of four prediction modes, 8×8 and 4×4 blocks are intra predicted in one of nine prediction modes. In the case of inter prediction, the macroblock may be subdivided into blocks of sizes 16×16, 16×8, 8×16, 8×8, 8×4, 4×8, or 4×4, and then used for the inter prediction through a motion compensation. The transform is performed by unit of 8×8 or 4×4 sized blocks, and the quantization used for the transform coefficients is scalar quantization.

However, the inventor(s) has experienced that since typical video compression technology uses a fixedly sized macroblock in encoding an image (even though H.264/AVC subdivides and encodes macroblock into smaller block units, the macroblock is of a fixed size), encoding the high resolution image hardly achieves a sufficient encoding efficiency.

Further, the inventor(s) has noted that since the macroblock size is fixed, sizes of subblocks within the macroblock, which are the prediction or transform units, also are limited.

SUMMARY

An exemplary embodiment of the present disclosure provides a method of decoding a video in the unit of blocks at a video decoding apparatus. The method comprises: extracting and decoding a first information corresponding to a minimum block size and a second information corresponding to a difference between the minimum block size and a maximum block size, from a bitstream encoded by a video encoding apparatus, wherein the first and second information are values of log scale; calculating the maximum block size based on the first information corresponding to the minimum block size and the second information corresponding to the difference; decoding, from the bitstream, partition information of a square current block having the derived maximum block size by a tree structure to thereby identify one or more subblocks in the current block which have sizes equal to or larger than the minimum block size; decoding a prediction mode information of each of the subblocks from the bitstream, the prediction mode information indicating whether a subblock is inter-predicted or intra-predicted; and reconstructing each of the subblocks in the current block by predicting each of the subblocks according to a corresponding prediction mode information.

An exemplary embodiment of the present disclosure provides a video decoding apparatus of decoding a video in the unit of blocks, comprises a size configuration unit and a video decoder. The size configuration unit is configured to extract and decode a first information corresponding to a minimum block size and a second information corresponding to a difference between the minimum block size and a maximum block size, from a bitstream encoded by a video encoding apparatus, wherein the first and second information are values of log scale, and calculate the maximum block size based on the first information corresponding to the minimum block size and the second information corresponding to the difference. And the video decoder configured to decode, from the bitstream, partition information of a square current block having the derived maximum block size by a tree structure to thereby identify one or more subblocks in the current block which have sizes equal to or larger than the minimum block size, decode a prediction mode information of each of the subblocks from the bitstream, the prediction mode information indicating whether a subblock is inter-predicted or intra-predicted, and reconstruct each of the subblocks in the current block by predicting each of the subblocks according to a corresponding prediction mode information.

DESCRIPTION OF DRAWINGS

FIG. 9 is an exemplary diagram for illustrating subblocks split from a macroblock for each layer according to another aspect of the present disclosure, FIG. 13 is an exemplary diagram for illustrating processes in which partition type indicating information of the macroblock for each layer is sequentially encoded according to a subblock order, FIG. 20 is an exemplary diagram for illustrating a process of encoding block partition information by using a partition layer value and a partition flag according to another aspect of the present disclosure.

DETAILED DESCRIPTION

Figure 1:
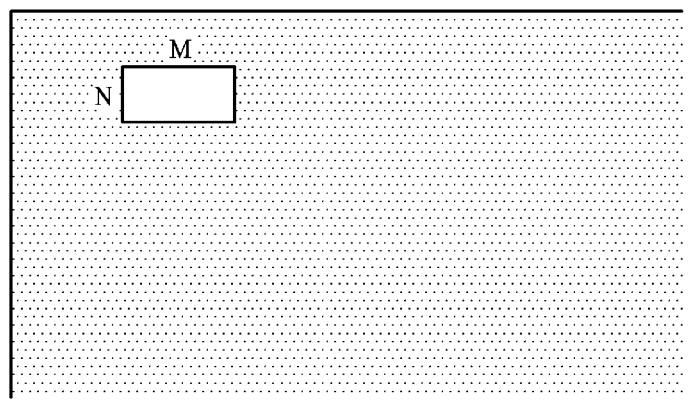
FIGS. 1 to 3 are exemplary diagrams for illustrating macroblocks by unit of M×N pixels according to an aspect of the present disclosure.

Some embodiments of the present provide encoding an image by using variable sized blocks and various sizes of subblocks when a high resolution image is encoded and improve the compression efficiency by efficiently encoding and decoding block partition information.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A video encoding apparatus and a video decoding apparatus, which will be discussed in the following description, may be a Personal Computer (PC), a notebook computer, a Personal Digital Assistant (PDA), a Portable Multimedia Player (PMP), a PlayStation Portable (PSP), and a mobile communication terminal, and refer to various apparatuses including a communication apparatus such as a communication modem for performing communication with various devices or a wired/wireless communication network, a memory for storing various programs and data for encoding or decoding a video, and a microprocessor for executing a program to perform an operation and a control.

Further, a video encoded into a bitstream by a video encoding apparatus is transmitted to a video decoding apparatus through a wired/wireless communication network such as an internet, a near field communication network, a wireless LAN (Local Area Network), a WiBro (Wireless Broadband) network, and a mobile communication network or through a communication interface such as a cable or a Universal Serial Bus (USB) in real-time or non-real time and decoded in the video decoding apparatus, and thus the decoded video may be reconstructed and reproduced as a video.

In general, a video includes a series of pictures and each picture is divided into predetermined areas such as macroblocks, which are the reference unit for encoding and decoding an image. The macroblocks are classified into an intra macroblock and an inter macroblock according to a macroblock decoding method. The intra macroblock refers to a macroblock encoded using an intra prediction coding. The intra prediction coding corresponds to a scheme of generating a predicted block by predicting a current block pixel by using pixels of reconstructed blocks previously encoded and decoded within a current picture, in which a current encoding is performed, and encoding a differential value between the generated predicted block and the current block pixel. The inter macroblock refers to a macroblock encoded using an inter prediction coding. The inter prediction coding corresponds to a scheme of generating a predicted block by predicting a current block within a current picture with reference to one or more past pictures or future pictures and encoding a differential value between the generated predicted block and the current block. Here, a picture referred to in encoding or decoding the current picture is called a reference picture.

A) Encoding and Decoding Using Macroblock or Block Having Arbitrary Size

Hereinafter, an apparatus for encoding and decoding an image by unit of blocks is described by way of an example. Here, the block may be a macroblock of size M×N (M and N may be integers equal to or larger than 16) or a subblock or lower block of size O×P (O and P may be integers equal to or smaller than M or N). Encoding and decoding the image by unit of blocks are only examples, and the image can be encoded and decoded by unit of defined areas like blocks or undefined areas. However, a video encoding/decoding apparatus, which will be described later, can use blocks having an arbitrary size, and the block size is a prearranged size between the video encoding apparatus and the video decoding apparatus.

A-1) Macroblock of Arbitrary Size

Figure 2:
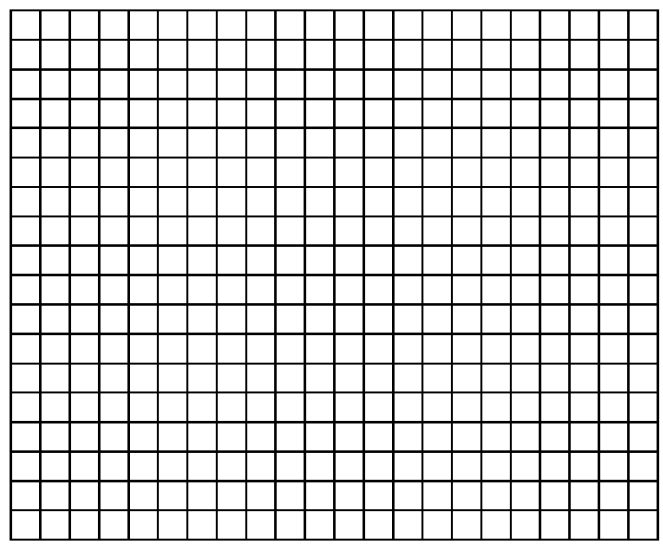
Figure 3:
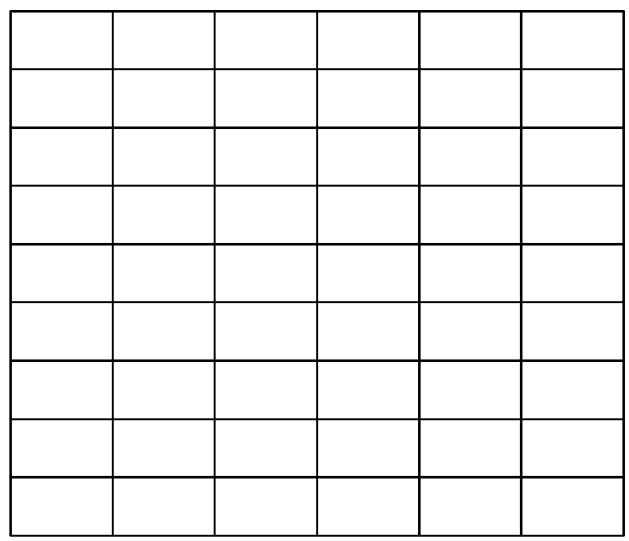

FIGS. 1 to 3 are exemplary diagrams for illustrating macroblocks by unit of M×N pixels according to an aspect of the present disclosure.

FIG. 1 shows macroblocks by unit of M×N pixels (hereinafter, referred to as macroblocks of size M×N) expressed in a part of an input image having a certain size as an example, FIG. 2 shows a CIF image including 396 macroblocks of size 16×16 as an example, and FIG. 3 shows a CIF image including 54 macroblocks of size 64×32 as an example.

In the conventional video compression technology, an image is split into macroblocks of fixed size 16×16 and then encoded and decoded as shown in FIG. 2. However, in an aspect of the present disclosure, the image may be encoded and decoded using macroblocks of size 64×32 (not only the size 64×32 but also size M×N (greater than a size 16×16) such as size 64×64 and size 32×64 are available) as shown in FIG. 3.

A-2) Example of Subblock Mode

Figure 4:
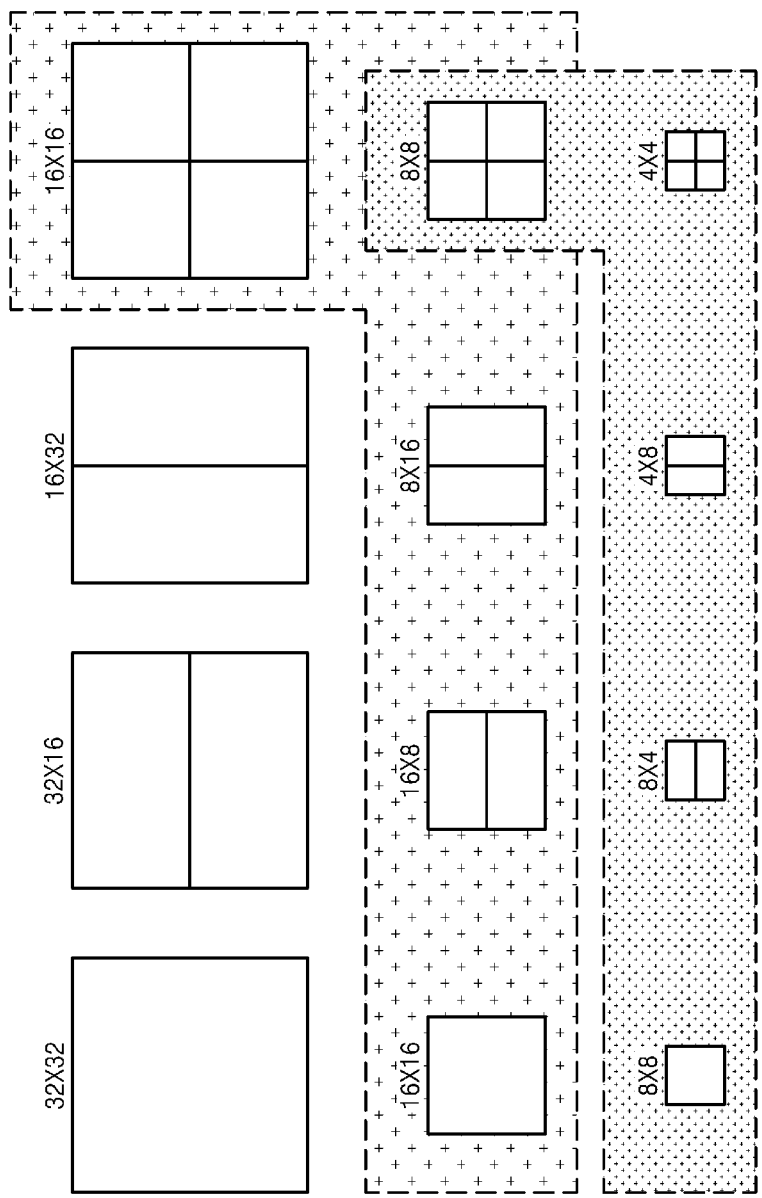
FIGS. 4 and 5 are exemplary diagrams for illustrating various subblock modes according to an aspect of the present disclosure.
Figure 5:
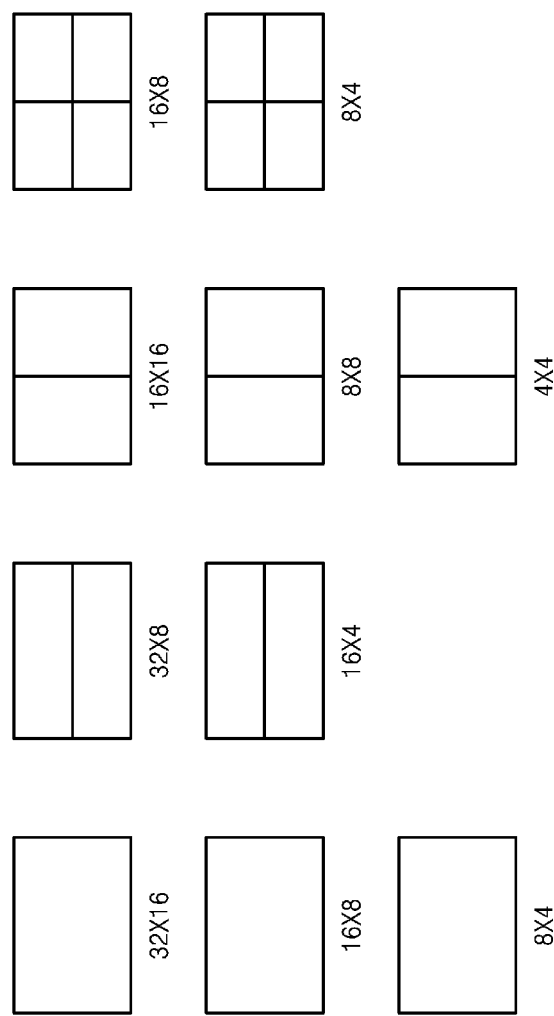

FIGS. 4 and 5 are exemplary diagrams for illustrating various subblock modes according to an aspect of the present disclosure.

FIG. 4 shows subblock modes available for a macroblock of size 32×32, and FIG. 5 shows subblock modes available for a macroblock of size 32×16.

According to an aspect of the present disclosure, the macroblock of size M×N may be split into smaller blocks, that is, subblocks as shown in FIGS. 4 and 5. Macroblocks of the image may be intra predictive-encoded or inter predictive-encoded by unit of subblocks.

A-3) Description of Video Encoding Apparatus

Figure 6:
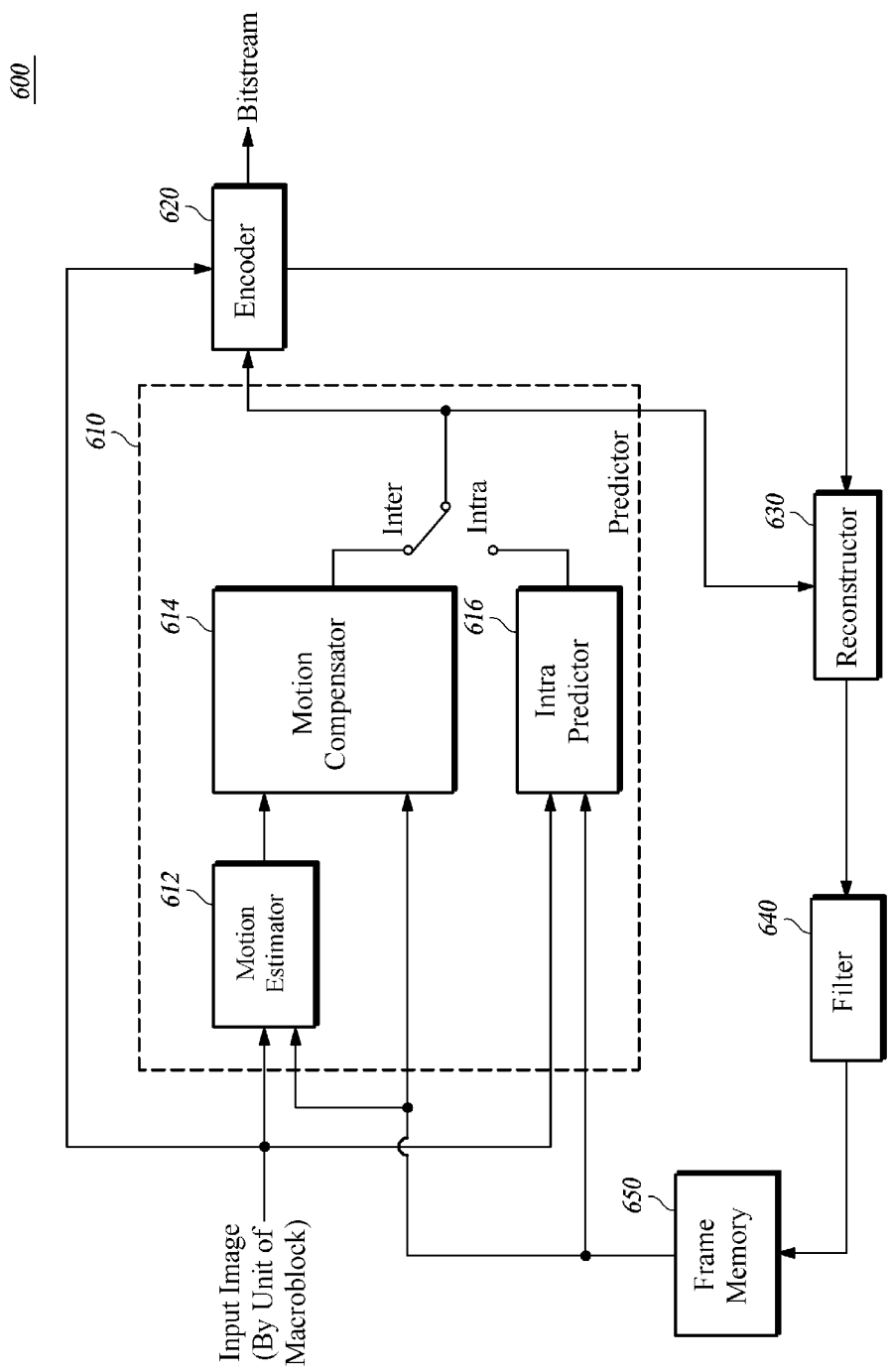
FIG. 6 is a schematic block diagram for illustrating a video encoding apparatus according to an aspect of the present disclosure.

FIG. 6 is a schematic block diagram for illustrating a video encoding apparatus according to an aspect of the present disclosure.

The video encoding apparatus according to the aspect of the present disclosure corresponds to an apparatus for encoding an image by using macroblocks having a size equal to or larger than an arbitrary size, and may include a predictor 610, an encoder 620, a reconstructor 630, a filter 640, and a frame memory 650. Here, the reconstructor 630, the filter 640, and the frame memory 650 may be omitted or included in another element selectively according to an implementation manner. Each of the predictor 610, the encoder 620, the reconstructor 630, and the filter 640 comprises one or more processors and/or application-specific integrated circuits (ASICs) specified for respectively corresponding operations and functions described hereinafter. The frame memory 650 includes at least one non-transitory computer readable medium. The video encoding apparatus further comprises input units (not shown in FIG. 6) such as one or more buttons, a touch screen, a mic and so on, and output units (not shown in FIG. 6) such as a display, an indicator and so on. The video encoding apparatus further comprises communication modem(s) to receive and/or communication signals to thereby communicate with a video decoding apparatus through wire or wireless networks (herein, the wire or wireless networks include, for example, one or more network interfaces including, but not limited to, cellular, Wi-Fi, LAN, WAN, CDMA, WCDMA, GSM, LTE and EPC networks, and cloud computing networks).

The predictor 610 may include a motion estimator 612, a motion compensator 614, and an intra predictor 616, and predicts macroblocks of an input image. Here, the macroblocks refer to macroblocks of size equal to or larger than a size 16×16 (that is, macroblocks of size M×N, where M and N are integers equal to or larger than 16).

The motion estimator 612 generates a motion vector by comparing a macroblock, which is desired to be predicted, with a reference picture stored in the frame memory 650 and estimating a motion of the corresponding macroblock.

The motion compensator 614 fetches a block corresponding to a size of the macroblock, which is desired to be predicted, from the reference picture stored in the frame memory 650 with reference to the motion vector generated by the motion estimator 612. The block having been fetched by the motion compensator 614 becomes a predicted macroblock having a predicted value of the macroblock, which is desired to be predicted.

The intra predictor 616 intra-predicts the block, which is desired to be predicted. For the intra prediction, the intra predictor 616 generates a reference block by using reconstructed neighboring pixel information already encoded and decoded, and compares the reference block with the target macroblock, which is to be encoded, to determine an intra prediction mode. And then, the intra predictor 606 intra-predicts the macroblock according to the determined intra prediction mode. The macroblock having been predicted by the intra predictor 616 becomes a predicted macroblock having a predicted value of the target macroblock.

The encoder 620 encodes a residual signal, which is a difference between pixel values of the target macroblock and the predicted macroblock. Specifically, the encoder 620 encodes the residual signal through a transform, a quantization, and an entropy coding. Further, when the encoder 620 inter-predicts the target macroblock to be encoded, the encoder 620 can encode motion information such as the motion vector generated by the motion estimator 612 and macroblock mode information such as a macroblock size. When the encoder 620 intra-predicts the target macroblock to be encoded, the encoder 620 can encode prediction mode information such as an intra prediction mode and macroblock mode information such as the macroblock size.

The reconstructor 630 inversely quantizes and inversely transforms a transformed and quantized residual signal and adds the residual signal and the predicted macroblock output from the predictor 610 to reconstruct the target macroblock.

The filter 640 filters the reconstructed target macroblock by using a filter such as a deblocking filter. The filtered reconstructed macroblock is stored in the frame memory 650 and used for inter predicting a next macroblock or a macroblock of a next picture in the predictor 610.

A-4) Description of Video Decoding Apparatus

Figure 7:
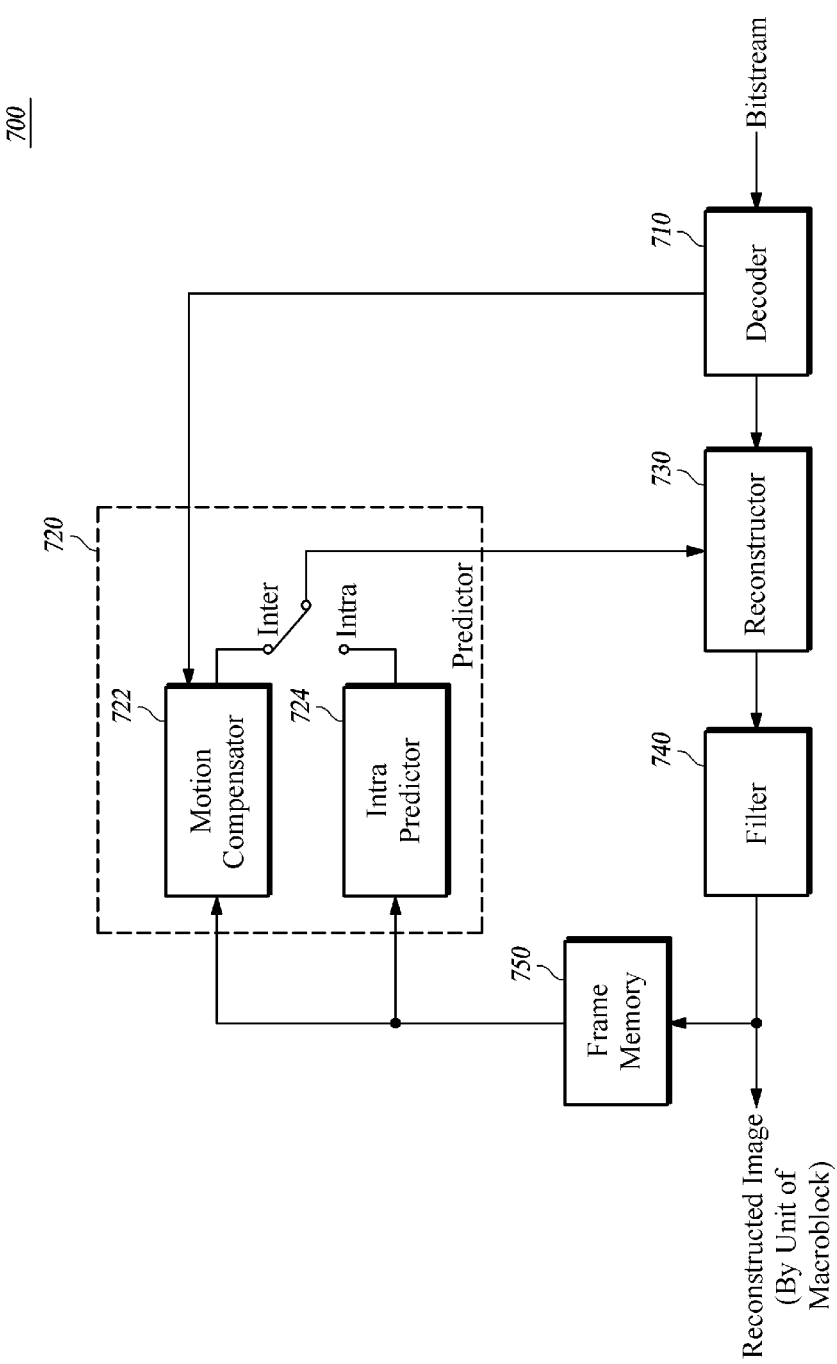
FIG. 7 is a schematic block diagram for illustrating a video decoding apparatus according to an aspect of the present disclosure.

FIG. 7 is a schematic block diagram for illustrating a video decoding apparatus according to an aspect of the present disclosure.

The video decoding apparatus according to the aspect of the present disclosure may include a decoder 710, a predictor 720, a reconstructor 730, a filter 740, and a frame memory 750. Each of the decoder 710, a predictor 720, the reconstructor 730, and the filter 740 comprises one or more processors and/or application-specific integrated circuits (ASICs) specified for respectively corresponding operations and functions described hereinafter. The frame memory 750 includes at least one non-transitory computer readable medium. The video decoding apparatus further comprises input units (not shown in FIG. 7) such as one or more buttons, a touch screen, a mic and so on, and output units (not shown in FIG. 7) such as a display, an indicator and so on. The video decoding apparatus further comprises communication modem(s) to receive and/or communication signals to thereby communicate with the video encoding apparatus through wire or wireless networks (herein, the wire or wireless networks include, for example, one or more network interfaces including, but not limited to, cellular, Wi-Fi, LAN, WAN, CDMA, WCDMA, GSM, LTE and EPC networks, and cloud computing networks).

The decoder 710 extracts three types of information required for a macroblock decoding from an input bitstream.

First, the decoder 710 entropy decodes and extracts macroblock type information on whether a macroblock, which is desired to be currently decoded, is an intra macroblock or an inter macroblock and subblock mode information indicating subblock modes of the macroblock.

Second, the decoder 710 extracts information required for the prediction through an entropy decoding. In this event, a method of decoding a type of prediction data to be decoded and the prediction data is different depending on whether each block is an intra block or an inter block. When the block to be reconstructed is the inter block, reference picture information required for a motion compensation of each subblock and information on a motion such as a motion vector are extracted from the bitstream and decoded. When the block to be reconstructed is the inter block, information on intra prediction modes of a luma component and a chroma component is extracted from the bitstream and decoded.

Lastly, the decoder 710 decodes information required for a residual signal decoding. Information indicating whether there is a transform coefficient which is not 0, in each subblock (e.g. CBP) is first decoded, and transform information indicating a transform type and a quantized transform coefficient are decoded for blocks having the transform coefficient which is not 0.

The predictor 720 predicts a current block to be currently decoded, and may include a motion compensator 722 and an intra predictor 724. When the current block is the inter block, the motion compensator 722 generates a predicted macroblock by fetching pixels corresponding to a size of the current macroblock from the reference picture stored in the frame memory 750 by using a reconstructed motion vector decoded by the decoder 710. When the current block is the intra block, the intra predictor 724 generates a predicted macroblock by predicting the current macroblock according to a reconstructed intra prediction mode decoded by the decoder 710. After generating a residual signal by inversely quantizing a quantized transform coefficient decoded by the decoder 710 and inversely transforming the inversely quantized transform coefficient by using a reconstructed transform type extracted from the decoder 710, the reconstructor 730 generates a reconstructed macroblock by adding the generated residual signal and the predicted macroblock generated by the predictor 720. The generated reconstructed macroblock is filtered in the filter 740 and stored in the frame memory 750, and the filtered and stored macroblock is used for reconstructing a next block or a next picture.

As described above, the video encoding apparatus 600 and the video decoding apparatus 700 according to an aspect of the present disclosure can encode and decode the image by using blocks having an arbitrary size.

B) Block Partition, and Partition Information Encoding and Decoding

Hereinafter, as another aspect of the present disclosure, an apparatus and a method for splitting a macroblock having an arbitrary size into a plurality of subblocks through a partition (or split) layer for the prediction or the transform and efficiently encoding and decoding partition information indicating shapes and sizes of the split subblocks will be described. However, while the video encoding/decoding apparatus, which will be discussed in the following description, may use macroblocks having an arbitrary size, alternatively, the video encoding apparatus and the video decoding apparatus may perform an encoding/decoding by using a prearranged macroblock size and a prearranged minimum subblock size between the video encoding apparatus and the video decoding apparatus.

The partition information may be information indicating sizes and shapes of subblocks split for the prediction or the transform. The video encoding apparatus includes the partition information and encoded image data in a bitstream and transmits the bitstream to the video decoding apparatus.

Further, the video encoding apparatus can encode partition information for the prediction and partition information for the transform, respectively.

In a decoding, the video decoding apparatus extracts and decodes the partition information from the bitstream, and splits the macroblock into a plurality of subblocks for the prediction or the transform. Then, the video decoding apparatus performs the prediction or the transform in the unit of subblocks to reconstruct an image.

B-1) Video Encoding Apparatus

B-1-1) Encoding Apparatus

Figure 8:
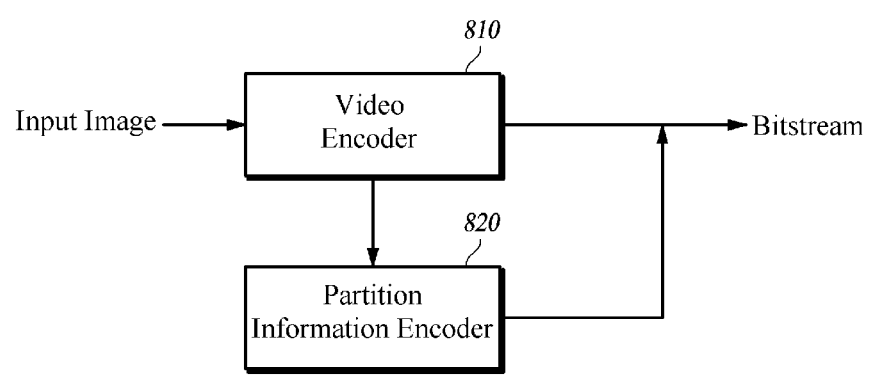
FIG. 8 is a block diagram for illustrating a first implementation of a video encoding apparatus according to another aspect of the present disclosure.

FIG. 8 is a schematic block diagram for illustrating a video encoding apparatus according to another aspect of the present disclosure.

The video encoding apparatus 800 according to another aspect of the present disclosure may include a video encoder 810 and a partition information encoder 820. Each of the video encoder 810 and the partition information encoder 820 comprises one or more processors and/or application-specific integrated circuits (ASICs) specified for respectively corresponding operations and functions described hereinafter.

The video encoding apparatus 800 of FIG. 8 encodes partition information in the partition information encoder 820 and then encodes predicted data and/or image data including data required for a residual signal decoding such as a transform type, CBP, and a transform coefficient. Here, the predicted data corresponds to data indicating whether each subblock is an intra block or an inter block, and corresponds to an intra prediction mode for the intra block and motion information for the inter block. The video encoder 810 may be implemented as the video encoding apparatus 600 according to an aspect of the present disclosure described with reference to FIG. 6. That is, the video encoder 810 splits a macroblock having an arbitrary size into various sizes of subblocks for the prediction or the transform, performs a predictive encoding on respective subblocks, and then determines prediction modes of the respective subblocks and a macroblock partition type having a smallest encoding cost. Partition information indicating the determined macroblock partition type is encoded into the bitstream through the encoder 820, and a predictive-encoded image data of the plurality of split subblocks within the macroblock is generated.

The partition information encoder 820 encodes the partition information input by the video encoder 810 to generate partition information data. Here, the partition information may be information on sizes and block shapes of a plurality of subblocks split from the macroblock for the prediction or the transform.

According to the typical video compression technology, since a macroblock size is fixed to a size 16×16, subblocks having a small size such as subblocks of sizes 8×8, 4×4, etc. can be used. However, according to an aspect of the present disclosure, since a macroblock size can be variously determined to have size equal to or larger than a size 16×16, sizes and shapes of subblocks can be also variously determined and thus the macroblock can be split into various shapes of subblocks. Therefore, according to another aspect of the present disclosure, a predictive encoding should be performed by transmitting information on sizes and shapes of subblocks split from a macroblock to a video decoding apparatus and splitting the macroblock in the same way as that performed in a video encoding apparatus in the video decoding apparatus. It is described with reference to FIGS. 9 to 22 that the partition information encoder 820 encodes block information.

B-1-2) Subblock Mode

According to another aspect of the present disclosure, a macroblock is split into various sizes of subblocks for each layer, and a predictive encoding and a predictive decoding can be performed for each of the split subblocks.

FIG. 9 is an exemplary diagram for illustrating subblocks split from a macroblock for each layer according to another aspect of the present disclosure.

In FIG. 9, a macroblock size is N×N and N is an integer equal to or larger than 16. FIG. 9 shows subblocks which can be split based on an assumption that a minimum subblock size of subblock sizes is 4×4. However, this assumption is only for describing embodiments of the present disclosure. A horizontal size and a vertical size of the macroblock may not be equal to each other and the minimum subblock size may be set to another size instead of the size 4×4.

As shown in FIG. 9, according to another aspect of the present disclosure, the macroblock can be split into various sizes of subblocks for each layer. The macroblock may be split into four types of subblocks for each of layers from a layer 0 to a layer $\log_2(N/4)$. In this event, subblocks of a K+1 layer can be used only when a subblock of a layer K ($0 \le K \le \log 2(N/4)$) is split into 4 subblocks.

For example, in a case of a macroblock of size 64×64, the macroblock may be split into 4 layers from a layer 0 to a layer 3, and respective layers may include subblocks having 4 different block sizes. Accordingly, the layer 0 includes a subblock having a block size of 64×64, subblocks having a block size of 64×32, subblocks having a block size of 32×64, and subblocks having a block size of 32×32. A layer 1 includes a subblock having a block size of 32×32, subblocks having a block size of 32×16, subblocks having a block size of 16×32, and subblocks having a block size of 16×16. A layer 2 includes a subblock having a block size of 16×16, subblocks having a block size of 16×8, subblocks having a block size of 8×16, and subblocks having a block size of 8×8. The layer 3 includes a subblock having a block size of 8×8, subblocks having a block size of 8×4, subblocks having a block size of 4×8, and subblocks having a block size of 4×4. Here, subblocks included in the layer 1 can be used only when the macroblock having a block size of 64×64 is split into subblocks having a block size of 32×32 in the layer 0, and subblocks included in the layer 2 can be used only when the subblock having the block size 32×32 in the layer 1 is split into subblocks having a block size of 16×16. Further, subblocks included in the layer 3 can be used only when the subblock having the block size of 16×16 of the layer 2 is split into subblocks having a block size of 8×8.

Here, when a N×N block in a layer K is split into 4 subblocks having a size of $$\frac{N}{2} \times \frac{N}{2},$$

the split subblock $$\frac{N}{2} \times \frac{N}{2}$$

may be included in both the layer K and the layer K+1. That is, in the macroblock of size 64×64, a subblock having a size of 32×32 may be determined as a subblock type included in the layer 0 or a subblock type included in the layer 1.

In this event, a method of allocating a layer number to the split subblock may be different depending on the availability of each layer. If the layer K+1 is available, a layer number K+1 is allocated to a subblock. If the layer K+1 is not available, a layer number K is allocated to the subblock.

For example, in a case where a macroblock size is 64×64 and the number of maximum partition layers is 4, when the 64×64 macroblock is split into 4 subblocks of size 32×32, the 32×32 subblock is included in a layer 1. When one 32×32 subblock within the macroblock is split into 4 subblocks of size 16×16, each 16×16 subblock is included in a layer 2. When each 16×16 subblock is split into 4 subblock of size 8×8, the 8×8 subblock is included in a layer 3. When each 8×8 subblock is split into 4 subblocks of size 4×4, the 4×4 subblock is included in the layer 3 because a layer 4 is not available.

Further, when a N×N block of the layer K is split into 4 subblocks of size $$\frac{N}{2} \times \frac{N}{2},$$

a layer number of the split $$\frac{N}{2} \times \frac{N}{2}$$

subblock may be allocated K. In this event, when the $$\frac{N}{2} \times \frac{N}{2}$$

subblock is split into smaller subblocks, the layer number of the split $$\frac{N}{2} \times \frac{N}{2}$$

subblock is allocated K+1.

For example, in a case where a macroblock size is 64×64 and the number of maximum partition layers is 4, when the 64×64 macroblock is split into 4 subblocks of size 32×32, the 32×32 subblock is included in a layer 0. When one 32×32 subblock within the macroblock is split into 4 subblocks of size 16×16, each 16×16 subblock is included in a layer 1. When each 16×16 subblock is split into 4 subblocks of size 8×8, the 8×8 subblock is included in a layer 2. Further, when each 8×8 subblock is split into 4 subblocks of size 4×4, the 4×4 subblock is included in a layer 3.

B-1-3) Partition Type

Figure 10:
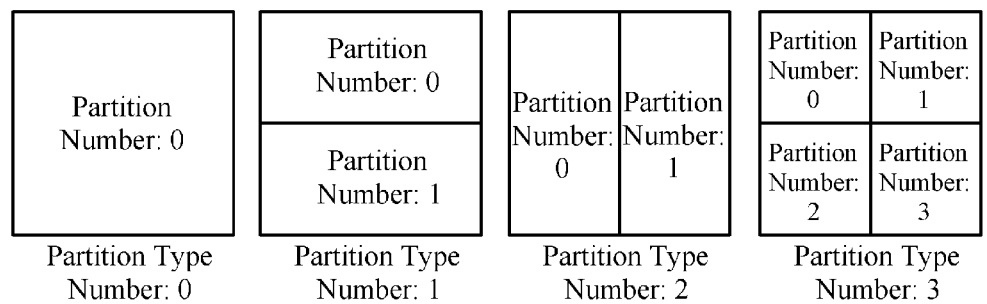
FIG. 10 is an exemplary diagram for illustrating partition types according to another aspect of the present disclosure.
Figure 34:
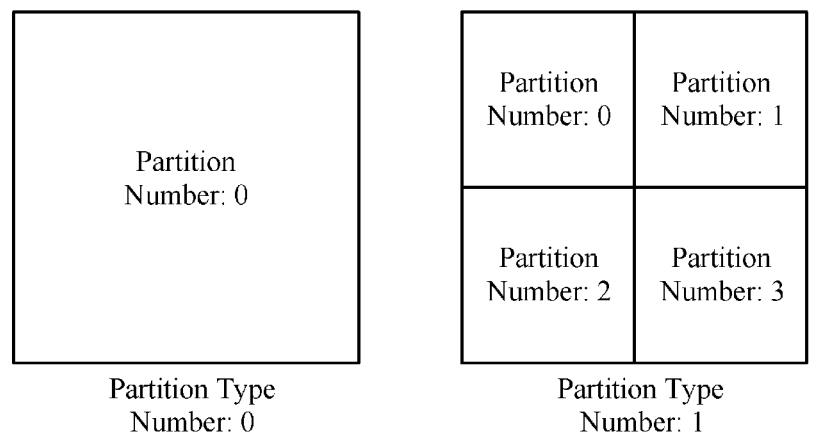
FIG. 34 is an exemplary diagram for illustrating partition types according to another aspect of the present disclosure.

Further, the macroblock can be split by using various partition types shown in FIGS. 10 and 34.

FIGS. 10 and 34 are exemplary diagrams for illustrating partition types according to another aspect of the present disclosure.

B-1-3-1) Example 1 of Partition Types

FIG. 10 is an exemplary diagram for illustrating partition types according to another aspect of the present disclosure.

FIG. 10 shows an example of partition type indicating information (partition type numbers) for identifying block sizes of subblocks split for each layer.

As shown in FIG. 10, when a subblock $$\frac{N}{2^K} \times \frac{N}{2^K}$$

included in a layer K of a macroblock is not split, partition type indicating information is allocated "0". When the subblock $$\frac{N}{2^K} \times \frac{N}{2^K}$$

is split into two subblocks of size $$\frac{N}{2^K} \times \frac{N}{2^{K+1}},$$

partition type indicating information is allocated "1". When the subblock $$\frac{N}{2^K} \times \frac{N}{2^K}$$

is split into two subblocks of size $$\frac{N}{2^{K+1}} \times \frac{N}{2^K},$$

partition type indicating information is allocated "2". When the subblock $$\frac{N}{2^K} \times \frac{N}{2^K}$$

is split into four subblocks of size $$\frac{N}{2^{K+1}} \times \frac{N}{2^{K+1}},$$

partition type indicating information is allocated "3". A partition number refers to a number allocated to for an identification of each subblock split based on a partition type. For example, when the subblock $$\frac{N}{2^K} \times \frac{N}{2^K}$$

of the layer K is not split, a partition number of the unsplit subblock $$\frac{N}{2^K} \times \frac{N}{2^K}$$

is allocated "0". Further, when the subblock $$\frac{N}{2^K} \times \frac{N}{2^K}$$

of the layer K is split into four subblocks of size $$\frac{N}{2^{K+1}} \times \frac{N}{2^{K+1}},$$

the respective $$\frac{N}{2^{K+1}} \times \frac{N}{2^{K+1}}$$

subblocks may be sequentially allocated partition numbers 0, 1, 2, and 3 from a subblock located in a left upper part of the macroblock in a raster scan direction.

B-1-3-2) Example 2 of Partition Types

FIG. 34 is an exemplary diagram for illustrating partition types according to another aspect of the present disclosure.

FIG. 34 shows an example of partition type indicating information (partition type number) for identifying block sizes of subblocks split for each layer.

As shown in FIG. 34, when a subblock $$\frac{N}{2^K} \times \frac{N}{2^K}$$

included in a layer K of a macroblock is not split, partition type indicating information is allocated "0". When the subblock $$\frac{N}{2^K} \times \frac{N}{2^K}$$

is split into four subblocks of size $$\frac{N}{2^{K+1}} \times \frac{N}{2^{K+1}},$$

partition type indicating information is allocated "1". A partition number refers to a number allocated for an identification of each subblock split based on a partition type. For example, when the subblock $$\frac{N}{2^K} \times \frac{N}{2^K}$$

of the layer K is not split, a partition number of the unsplit subblock $$\frac{N}{2^K} \times \frac{N}{2^K}$$

is allocated "0". Further, when the subblock $$\frac{N}{2^K} \times \frac{N}{2^K}$$

of the layer K is split into four subblocks of size $$\frac{N}{2^{K+1}} \times \frac{N}{2^{K+1}},$$

the respective $$\frac{N}{2^{K+1}} \times \frac{N}{2^{K+1}}$$

subblocks may be sequentially allocated partition numbers 0, 1, 2, and 3 from a subblock located in a left upper part of the macroblock in a raster scan direction.

Further, various partition types may be combined and used for each layer. For example, the layer 0 and the layer 1 can use the partition type shown in FIG. 34 and lower layers of the layer 1 can also use the partition type shown in FIG. 10.

B-1-4) Partition Information Encoding Method

Hereinafter, various methods of encoding partition information, which is information indicating sizes and shapes of subblocks used for the prediction or the transform within the macroblock, according to an aspect of the present disclosure will be described.

B-1-4-1) Partition Information Decoding Method 1

A first method of encoding partition information is first described.

According to the first method, partition information indicating a type of a macroblock split into various sizes of subblocks may be represented using partition type indicating information (partition type numbers) for each layer. Accordingly, a plurality of subblocks included in a macroblock can be identified by the partition type indicating information for each layer. The partition information encoder 810 can encode partition information of a block by using the partition type indicating information for each layer through various methods, which will be described later.

For example, the partition information encoder 810 can encode partition information of a current block by sequentially encoding partition type indicating information for each partition layer of a macroblock based on a partition type indicating information encoding order.

Hereinafter, a method of encoding partition information of a current block through a sequential encoding of partition type indicating information for each partition layer of a macroblock based on a partition type indicating information encoding order will be described with reference to FIGS. 11 to 13.

Figure 11:
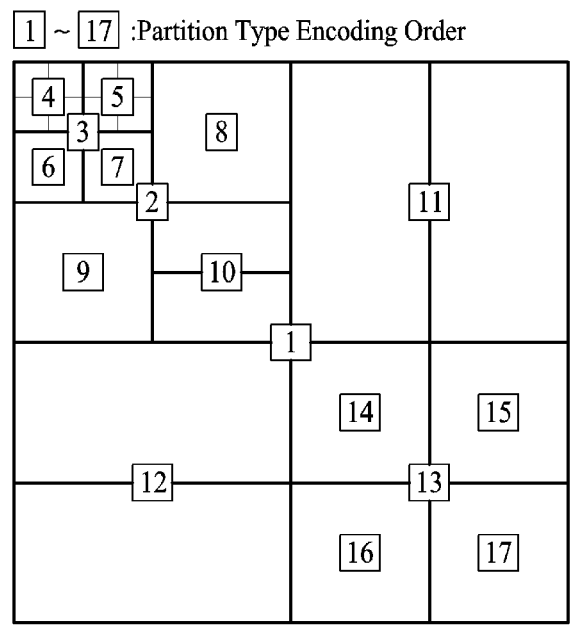
FIG. 11 is an exemplary diagram for illustrating a macroblock split into subblocks of various block sizes according to another aspect of the present disclosure.

FIG. 11 is an exemplary diagram for illustrating a macroblock split into subblocks having various block sizes according to another aspect of the present disclosure.

FIG. 11 shows the macroblock split into subblocks having various block sizes based on the subblock types shown in FIG. 10, wherein the macroblock has a block size of 64×64 and the number of maximum partition layers is 4.

According to another aspect of the present invention, when the macroblock is split as shown in FIG. 11, partition information of the macroblock can be encoded by sequentially encoding partition type indicating information for each partition layer based on the partition type indicating information encoding order.

Figure 12:
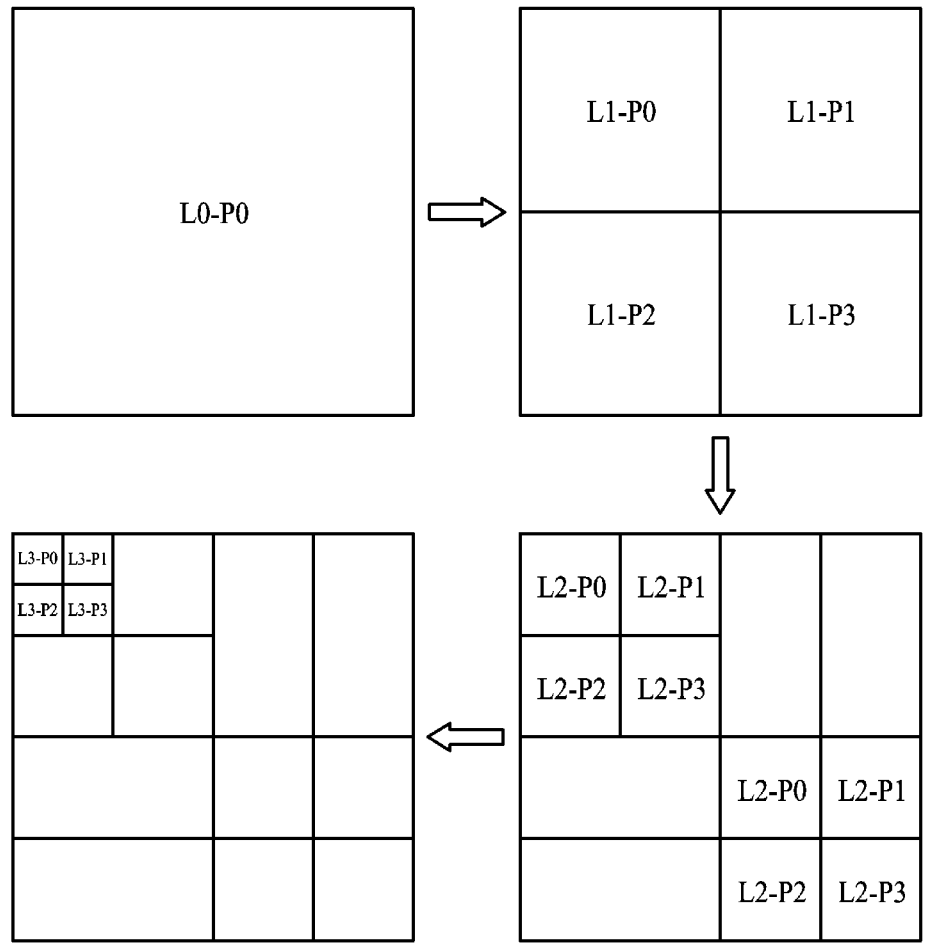
FIG. 12 is an exemplary diagram for sequentially illustrating processes in which a macroblock is split for each partition layer.

FIG. 12 shows processes of sequentially splitting the macroblock shown in FIG. 11 for each partition layer. Referring to FIG. 12, a subblock having a block size of 64×64 is split into 4 subblocks having a block size of 32×32 in a layer 0 (L0), an L1-P0 subblock (having a partition number 0 of a layer 1) and an L1-P3 subblock (having a partition number 3 of the layer 1) are split into 4 subblocks having a block size of 16×16, respectively (L1), and an L1-P1 subblock (having a partition number 1 of the layer 1) and an L1-P2 subblock (having a partition number 2 of the layer 1) are split into 2 subblocks having a block size of 16×32 and 2 subblocks having a block size of 32×16 in the layer 1, respectively. After the L1-P1 and L1-P2 subblocks are split into 2 subblocks, respectively, the subblocks are not split any more, so that partition numbers of the subblocks are not illustrated in FIG. 15. An L2-P0 subblock (having a partition number 0 of a layer 2) is split into 4 subblocks having a block size of 8×8 and an L2-P subblock (having a partition number 3 of the layer 2) is split into 2 subblocks having a block size of 16×2 in the layer 2 (L2). An L3-P0 subblock (having a partition number 0 of a layer 3) and an L3-P1 subblock (having a partition number 1 of the layer 3) are split into 4 subblocks having a block size of 4×4 in the layer 3 (L3), respectively.

An order of encoding partition type indicating information is as follows.

Partition type indicating information on a macroblock partition type is first encoded. Then, if the macroblock is split into 4 subblocks, partition type indicating information on the respective split subblocks is successively encoded. For example, when a N×N block is split into 4 subblocks, partition type indicating information on a first (N/2)×(N/2) subblock is encoded. When the first (N/2)×(N/2) subblock is split into 4 subblocks, partition type indicating information on the split (N/4)×(N/4) subblocks is encoded. When a size of the split (N/4)×(N/4) subblock corresponds to a minimum subblock size or when the split (N/4)×(N/4) subblock is not split into 4 smaller subblocks any more, partition type indicating information on a next (N/4)×(N/4) subblock is encoded in a raster scan order. When the size of the (N/4)×(N/4) subblock does not correspond to the minimum subblock size and the (N/4)×(N/4) subblock is split into 4 subblocks having a block size of (N/8)×(N/8), an encoding is performed from partition type indicating information on a first (N/8)×(N/8) subblock. The encoding on the partition type indicating information is continuously performed until partition type indicating information on all subblocks within the macroblock is encoded.

FIG. 13 is an exemplary diagram for illustrating a process of sequentially encoding partition type indicating information for each layer of a macroblock.

The table shown in FIG. 13 is generated when the partition type indicating information on respective subblocks within the macroblock shown in FIG. 11 is encoded. Numbers written in "☐" of FIG. 11 refer to orders of encoding partition type indicating information of respective subblocks. If partition type indicating information for each layer of the macroblock is sequentially encoded according to a partition type indicating information encoding order, the partition type indicating information for each layer may be encoded according to the order shown in FIG. 11.

First, since the subblock (L0-P0) having the block size of 64×64 is split into 4 subblocks having a block size of 32×32, partition type indicating information 3 is encoded. Since the first subblock (L1-P0) having the block size of 32×32 among 4 subblocks having the block size 32×32 within the subblock having the block size of 64×64 is split into 4 subblocks having the block size of 16×16, partition type indicating information 3 is encoded. The first subblock (L2-P0) having the block size of 16×16 among 4 subblocks having the block size of 16×16 within the first subblock (L1-P0) having the block size of 32×32 is split into 4 subblocks having the block size of 8×8, a partition type 3 is encoded. Since 4 subblocks (L3-P0, L3-P1, L3-P2, and L3-P3) having the block size of 8×8 within the subblock (L2-P0) having the block size of 16×16 are not split into smaller subblocks any more, partition type indicating information {3, 3, 0, 0} is encoded, respectively. Since subblocks in the layer 3 cannot be split into smaller subblocks, partition type indicating information on the subblocks included in the layer 3 is not encoded.

Since partition type indicating information on subblocks included in the layer 3 has been fully encoded, partition type indicating information on a second subblock (L2-P1) having the block size of 16×16 and a third subblock (L2-P2) having the block size of 16×16 in the layer 2 encoded. However, in this event, they all are not split into smaller subblocks any more, so that partition type indicating information 0 is encoded. Since partition type indicating information is not 3 although a fourth subblock (L2-P3) having the block size of 16×16 is split into subblocks having the block size of 16×8, only partition type indicating information 1 is encoded. Since partition type indicating information on 4 subblocks included in the layer 2 has been fully encoded, partition type indicating information on a second subblock (L1-P1) having the block size of 32×32 in the layer 1 is encoded. In this event, since the second subblock (L1-P1) having the block size of 32×32 in the layer 1 is split into subblocks having the block size of 16×32 and the respective split subblocks are not split into smaller subblocks any more, partition type indicating information 2 is encoded. In the same way, partition type indicating information on a second subblock (L1-P2) having the block size of 32×32 and a fourth subblock (L1-P3) having the block size of 32×32 in the layer 1, and 4 lower subblocks (L2-P0, L2-P1, L2-P2, and L3-P3) having the block size of 16×16 are sequentially encoded, and thus {1, 3, 0, 0, 0, 0} is encoded.

If information on partition types of the macroblock shown in FIG. 11 is encoded according to such an encoding method, partition type indicating information {3, 3, 3, 3, 3, 0, 0, 0, 0, 1, 2, 1, 3, 0, 0, 0, 0} is encoded as shown in FIG. 13.

Further, it is possible to encode the partition type indicating information according to the following order.

Partition type indicating information {3} of the layer 0 is encoded, partition type indicating information {3, 2, 1, 3} on 4 subblocks (L1-P0, L1-P1, L1 -P2, and L1-P3) of the layer 1 is encoded, partition type indicating information {3, 0, 0, 1, 0, 0, 0, 0} on 8 subblocks (4 subblocks included in L1-P0 and 4 subblocks included in L1-P3) of the layer 2 is encoded, and partition type indicating information {3, 3, 0, 0} on 4 subblocks (4 subblocks included in L2-P0 within L1-P0) of the layer 3 is encoded. In this event, partition type indicating information {3, 3, 2, 1, 3, 3, 0, 0, 1, 0, 0, 0, 0, 3, 3, 0, 0} is encoded.

In this event, the partition type indicating information may be encoded into a binary bit string by using a lossless compression coding such as a binary arithmetic coding, a Huffman coding, etc.

For example, in a case of using the binary arithmetic coding, each of the partition type indicating information can use different binary values depending on layer numbers of partition type indicating information to be currently encoded. The partition type indicating information can be encoded by using Table 1 if the layer number is equal to or smaller than $$\log_2\left(\frac{N}{16}\right),$$

and the partition type indicating information can be encoded by using Table 2 if the layer number is larger than $$\log_2\left(\frac{N}{16}\right).$$

For example, since partition type indicating information 3 of the subblock (L1-P0) of FIG. 11 can be expressed by the binary number "01" with reference to Table 1, the partition type indicating information 3 can be encoded by performing an arithmetic encoding on the binary numbers "0" and "1". Further, since partition type indicating information 0 of the subblock (L3-P2) included in the subblock (L2-P0) can be expressed by the binary number "1", the partition type indicating information 3 can be encoded by performing an arithmetic encoding on the binary number "1".

TABLE 1

| Partition Type Indicating Information | Binary String | |
|---|---|---|
| 0 | 0 | 0 |
| 1 | 1 | 1 |
| 2 | 1 | 0 |
| 3 | 0 | 1 |

TABLE 2

| Partition Type Indicating Information | Binary String | | |
|---|---|---|---|
| 0 | 1 | | |
| 1 | 0 | 0 | |
| 2 | 0 | 1 | 1 |
| 3 | 0 | 1 | 0 |

In addition, an actual partition type indicating information value can be encoded using various binary coding methods such as a unary code, a truncated unary code, Exp-Golomb code, etc.

Furthermore, when a macroblock is split by using partition types shown in FIG. 34 according to another aspect of the present disclosure, partition type indicating information may be a flag having a 1 bit length indicating whether a current block is split into 4 subblocks.

B-1-4-2) Partition Information Encoding Method 2

As another aspect of encoding block partition information by using a partition type for each macroblock layer, the partition information encoder 810 can encode block partition information by using a tree structure. That is, the partition information encoder 810 first encodes a layer number by using the tree structure and then encodes block partition information by encoding partition type indicating information.

Hereinafter, a second method of encoding block partition information using a tree structure will be described with reference to FIGS. 14 to 18.

Figure 14A:
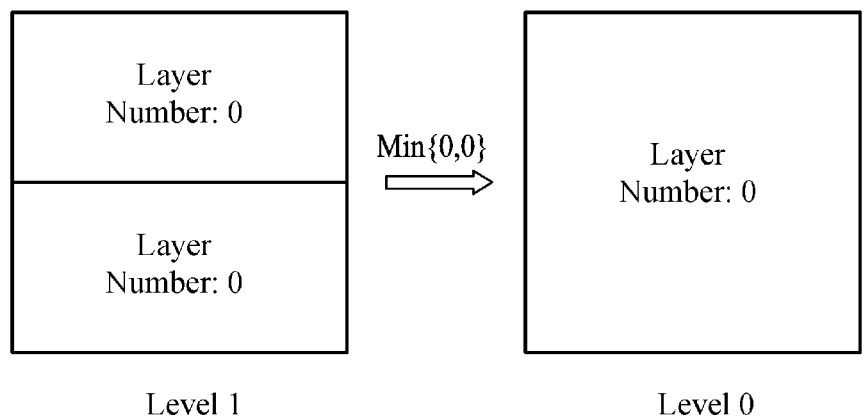
FIGS. 14A and 14B are exemplary diagram for illustrating a method of encoding block partition information by using a tree structure according to another aspect of the present disclosure.
Figure 14B:
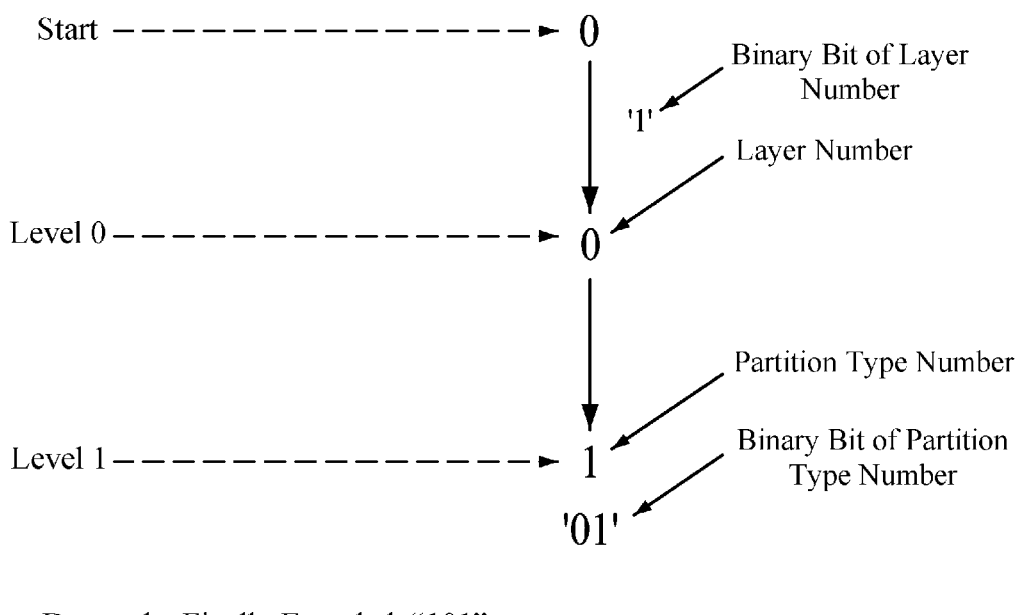

FIGS. 14A and 14B are exemplary diagrams for illustrating a method of encoding block partition information by using a tree structure according to another aspect of the present disclosure.

FIG. 14A shows layer numbers of respective subblocks of the macroblock for each level, and FIG. 14B shows layer numbers of respective subblocks for each level in a tree structure.

In FIG. 14A, a macroblock size is N×N and the macroblock is split into subblocks by partition types shown in FIG. 10. FIG. 14A illustrates a case where the macroblock is split into subblocks having a block size of N×(N/2) as an example. The macroblock having the block size of N×N is split into 2 subblocks having the block size of N×(N/2), and partition type indicating information is 1. Here, since each N×(N/2) subblock is included in a layer 0, a minimum value of the layer number of the 2 subblocks in a tree level 1 is 0. Accordingly, a layer number of a tree level 0 becomes 0. Meanwhile, numbers indicated in " " such as "01", "1", and "001" represent binary bits in FIGS. 14 to 18.

FIG. 14B illustrates layer numbers of respective subblocks for each level shown in FIG. 14A in a tree structure type.

After the number of "0 (1 bit)" corresponding to a difference value between a layer number of a higher node and a layer number of a current node, which is desired to be encoded, is encoded, "1" is lastly encoded. For example, when the difference value between the layer number of the higher node and the layer number of the current node is 3, a binary number "0001" is encoded. When the difference value is 0, a binary number "1" is encoded. Since there is no higher node of a level 0, it is assumed that a layer number of the higher node is 0. Accordingly, a difference value between the layer number 0 of the level 0 and the assumed layer number 0 of the higher node is 0, so that a binary bit of the layer number 0 of the level 0 becomes "1".

Since the layer number of the level 1 and the layer number of the level 0 are equal to each other, the layer number may not be encoded any more and partition type indicating information 1 of the level 1 is encoded.

The partition type indicating information can be encoded into the binary bit string by using a lossless compression coding such as a binary arithmetic coding, a Huffman coding, etc. as described above.

Further, the partition type indicating information can be encoded by using various binary coding methods such as a unary code, a truncated unary code, an Exp-Golomb code, etc.

In addition, different binary values can be used depending on layer numbers.

Furthermore, when the macroblock is split by using partition types according to another aspect of the present disclosure shown in FIG. 34, partition type indicating information may be a flag having a 1 bit length indicating whether the current block is split into 4 subblocks.

The partition type indicating information 1 according to the above aspect can represent the partition type indicating information value with the binary bit as described above. For example, since partition type indicating values "0", "1", "2", and "3" correspond to 4 types, they can be represented by "00", "01", "10", and "11" by allocating 2 bits. In this event, the partition type indicating information 1 can be represented by "01".

Accordingly, when macroblock partition information shown in FIG. 14A is finally encoded by using the tree structure, data to be encoded becomes "101".

Figure 15:
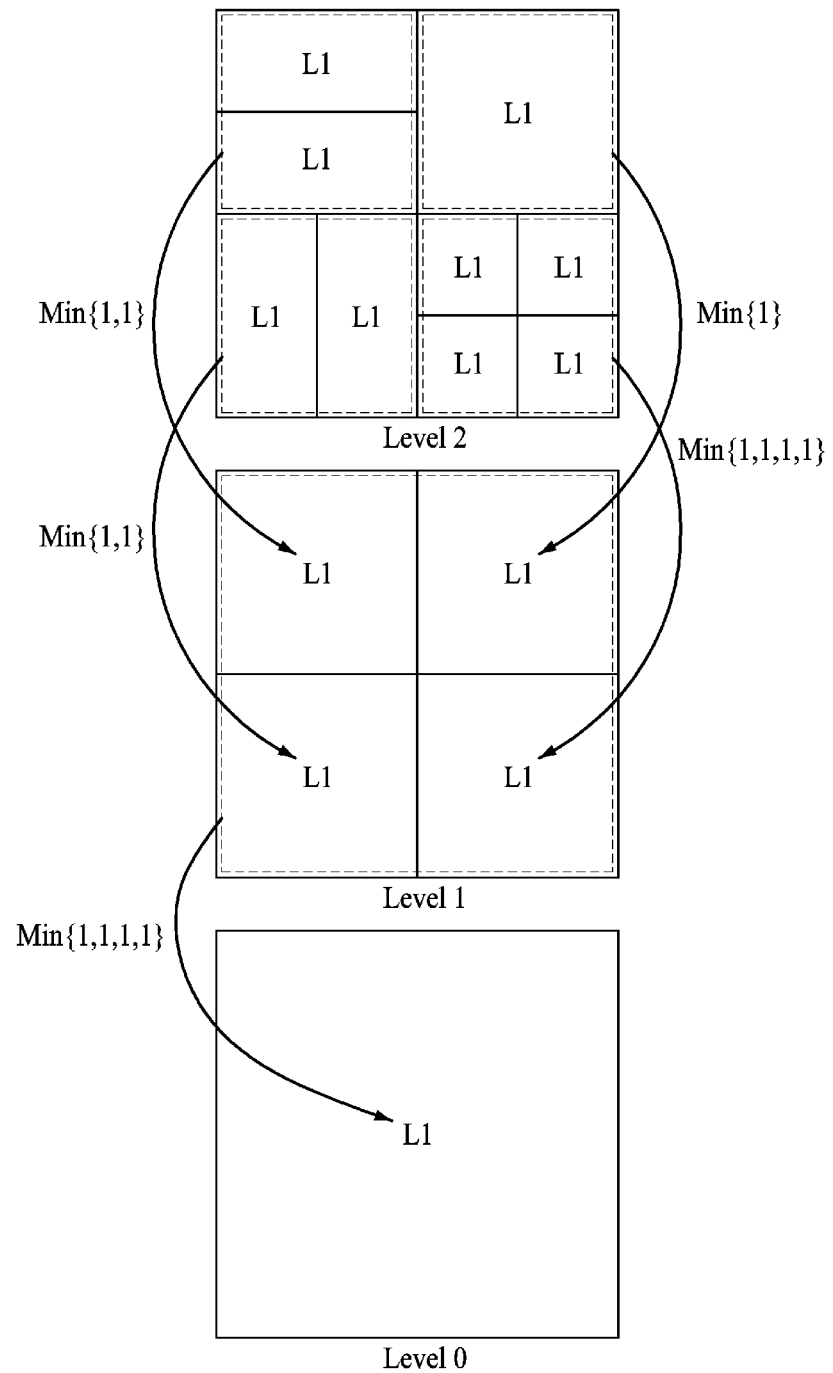
FIGS. 15 and 16 are exemplary diagrams for illustrating an example of a method of encoding block partition information by using a tree structure according to another aspect of the present disclosure.
Figure 16:
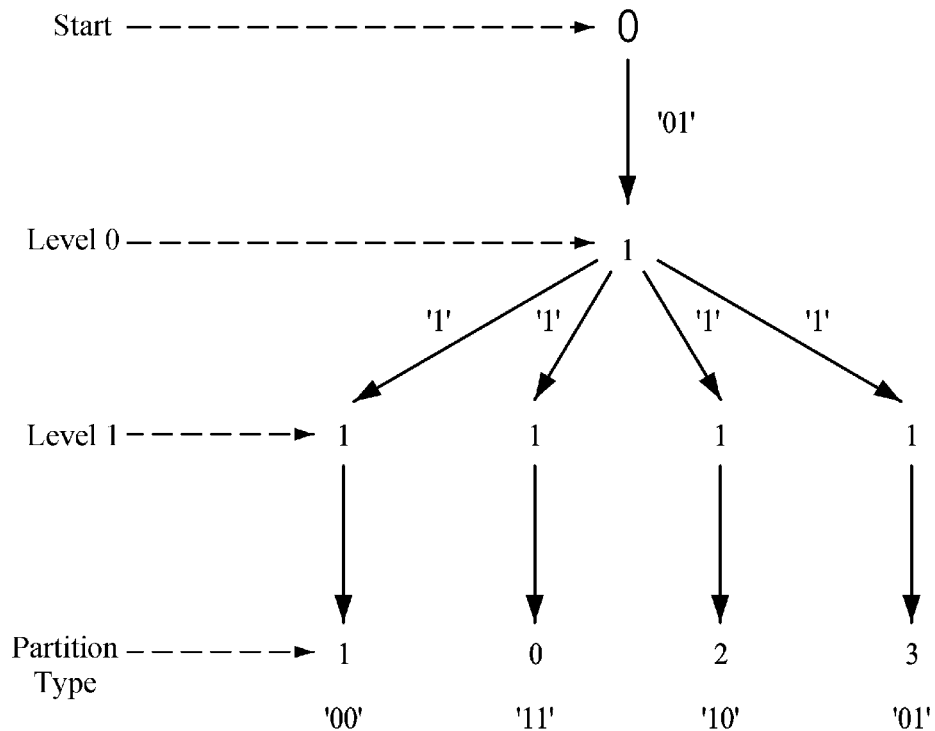

FIGS. 15 and 16 are exemplary diagrams for illustrating an example of a method of encoding block partition information by using the tree structure according to another aspect of the present disclosure.

FIG. 15 shows an example of a process of determining a layer number of each subblock for each level in order to encode block partition information by using the tree structure when a macroblock having a block size of N×N is split into 2 subblocks having a block size of (N/2)×(N/4), 1 subblock having a block size of (N/2)×(N/2), 2 subblocks having a blocks size of (N/4)×(N/2), and 4 subblocks having a block size of (N/4)×(N/4).

First, a level 2 is constructed by the macroblock having the block size of N×N, and a level 1 is constructed together by a minimum value of a layer number of the 2 subblocks included in a first subblock having the block size of (N/2)×(N/2) within a macroblock of the level 2, a minimum value of a layer number of the 1 subblock included in a second subblock having the block size of (N/2)×(N/2) within the macroblock of the level 2, a minimum value of a layer number of the 2 subblocks included in a third subblock having the block size of (N/2)×(N/2) within the macroblock of the level 2, and a minimum value of a layer number of the 4 subblocks included in a fourth subblock having the block size of (N/2)×(N/2) within the macroblock of the level 2.

FIG. 16 shows a process of constructing the tree structure according to the layer number for each level constructed in FIG. 15 and encoding the layer number and a partition type.

A layer number of the level 0 to be encoded is 1 and there is no higher node of the level 0. Since a difference value between a layer number of a higher node and the layer number of the level 0 is 1 based on an assumption that the layer number of the higher node is "0", a binary bit of the layer number of the level 0 becomes "01". Since layer numbers of the level 1 to be encoded are 1, 1, 1, 1, respectively and the layer number of the higher node (level 0) is 1, a difference value between the layer numbers is 1 and thus binary bits of respective layer numbers are "1", "1", "1", and "1". Since layer numbers of the level 2 to be encoded are all included in the level 1, the layer numbers do not have to be encoded any more. Accordingly, partition type indicating information 1, 0, 2, and 3 are encoded. Since the partition type indicating information is binary arithmetic-encoded or Huffman-encoded by using different tables depending on the layer number as described above, binary bits of the partition type indicating information 1, 0, 2, and 3 can become, for example, "00", "11", "10", and "01". Therefore, a layer number and partition type indicating information to be finally encoded become "01"→"1"→"1"→"1"→"1"→"00"→"11"→"10"→"01". As a result, "01111100111001" is encoded and becomes encoded partition information data.

Figure 17:
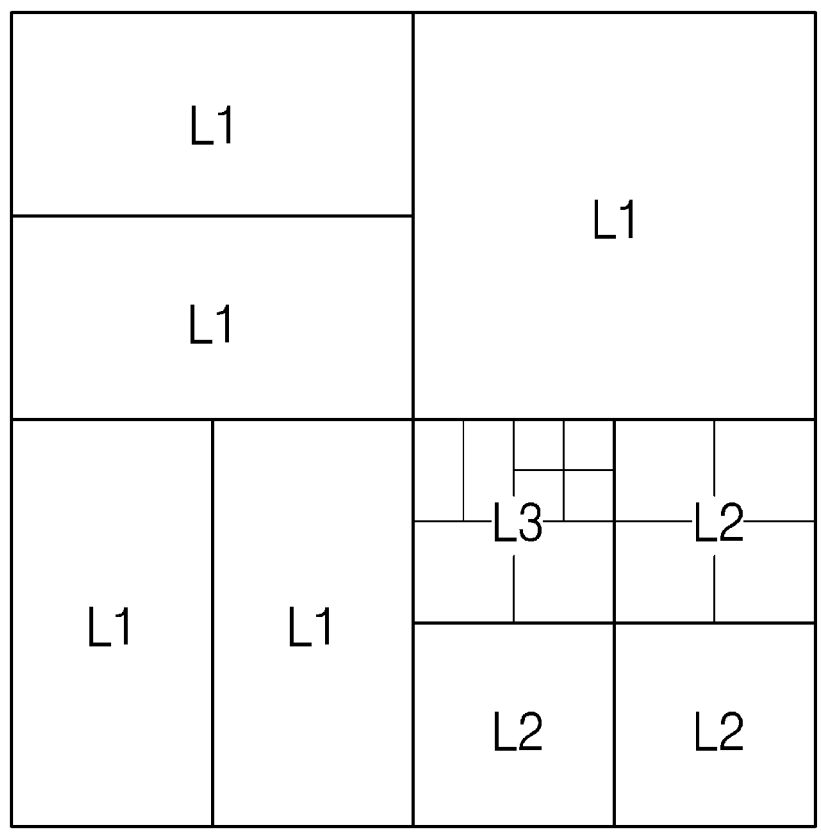
FIGS. 17 and 18 are exemplary diagrams for illustrating another example of a method of encoding block partition information by using a tree structure according to another aspect of the present disclosure.
Figure 18:
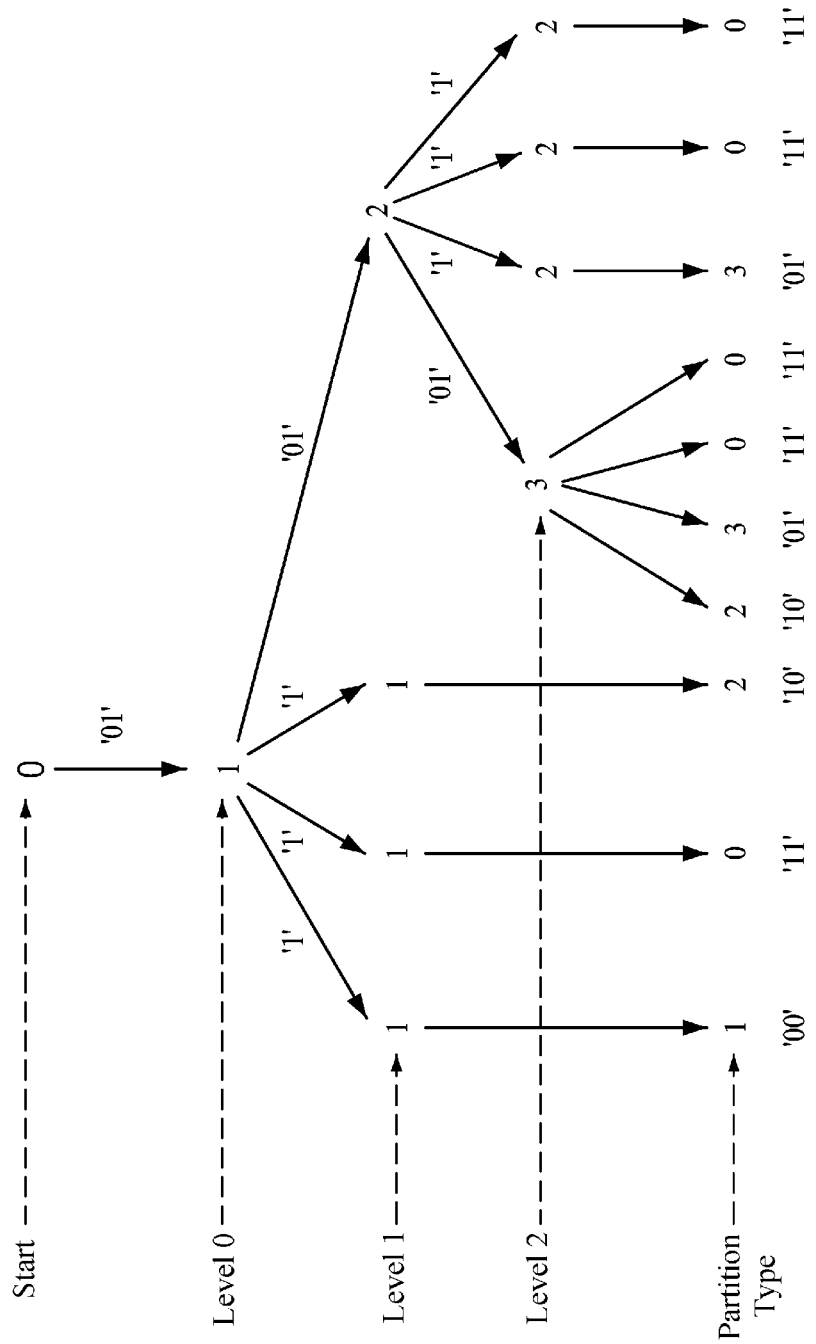

FIGS. 17 and 18 are exemplary diagrams for illustrating another example of the method of encoding the block partition information by using the tree structure according to another aspect of the present disclosure.

FIG. 17 shows an example of a case where a macroblock having a block size of N×N is split into 2 subblocks having a block size of (N/2)×(N/4), 1 subblock having a block size of (N/2)×(N/2), 2 subblocks having a blocks size of (N/4)×(N/2), 2 subblocks having a block size of (N/32)×(N/16), 4 subblocks having a block size of (N/32)×(N/32), 6 subblocks having a block size of (N/16)×(N/16), and 2 subblocks having a block size of (N/4)×(N/4). A fourth subblock having the block size of (N/2)×(N/2) of the macroblock is split into 4 subblocks having the block size of (N/4)×(N/4), and a first subblock and a second subblock having the block size of (N/4)×(N/4) among the 4 subblocks having the block size of (N/4)×(N/4) are split into 4 subblocks having the block size of (N/16)×(N/16), respectively. Here, since a first subblock and a second subblock having the block size of (N/16)×(N/16) among the subblocks having the block size of (N/16)×(N/16) split from the first subblock having the block size of (N/4)×(N/4) are split into smaller blocks, layer numbers 2 and 3 are allocated as shown in FIG. 17.

FIG. 18 can be created if the macroblock shown in FIG. 17 is constructed according to a layer number for each level in a tree structure type in the same way described in FIG. 15.

FIG. 18 shows a process of constructing the tree structure according to the layer number for each level constructed in FIG. 17 and encoding layer numbers and partition types.

If layer numbers and partition type indicating information are encoded in the same way described in FIG. 16, data to be finally encoded becomes "011110101111001110100111111011111".

B-1-4-3) Partition Information Encoding Method 3

Hereinafter, a third method of encoding block partition information will be described with reference to FIGS. 19 and 20.

According to the third method, the partition information encoder 810 can encode block partition information by using a partition layer value and a partition flag. That is, the partition information encoder 810 splits the macroblock by using only subblocks having a square shape such as N×N, (N/2)×(N/2), and (N/4)×(N/4) when a block type of a block, which encodes partition information, is an intra block type, and can encode the block partition information by encoding partition layer values of respective subblocks and the partition flags. Hereinafter, a method of encoding block partition information by using the partition layer value and the partition flag is described with reference to FIGS. 19 and 20.

Figure 19:
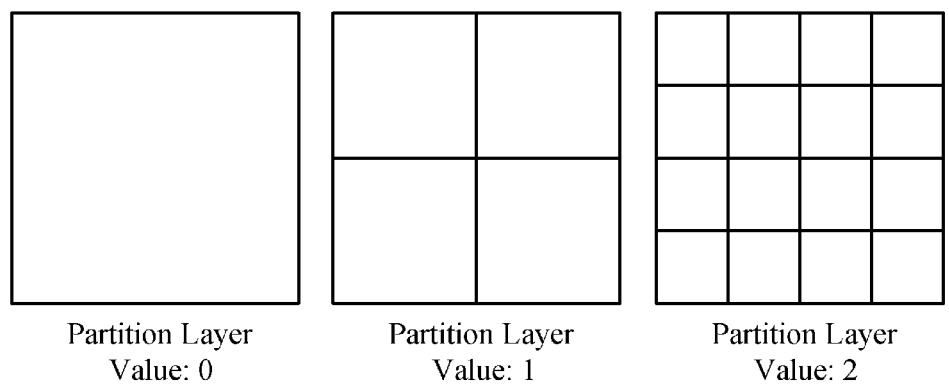
FIG. 19 illustrates subblocks split based on a partition layer value according to another aspect of the present disclosure.

FIG. 19 is an exemplary diagram for illustrating subblocks split based on partition layer values according to another aspect of the present disclosure.

When a macroblock having a block size of N×N (N is an integer equal to or larger than 16) is split according to partition layer values 0, 1, and 2, sizes and shapes of subblocks can be determined as shown in FIG. 19. When the macroblock having the block size of N×N is split according to the partition layer value 0, the macroblock is split into only 1 subblock having the block size of N×N. When the macroblock is split according to the partition layer value 1, the macroblock is split into 4 subblocks having a block size of (N/2)×(N/2). When the macroblock is split according to the partition layer value 2, the macroblock is split into 8 subblock having a block size of (N/4)×(N/4).

Accordingly, when it is assumed that a partition layer value of any block is x, a block size of a subblock of the corresponding block can become $$\frac{N}{2^x} \times \frac{N}{2^x}.$$

For example, when a partition layer value is 3, a macroblock having a block size of 64×64 is split into subblocks having a block size of 8×8. Further, when a partition layer value of the subblock having the block size of 8×8 is 1, the subblock having the block size of 8×8 is split into subblocks having a block size of 4×4.

A partition flag is a flag indicating that, when a N×N block is split into $$\frac{N}{2^x} \times \frac{N}{2^x}$$

subblocks, one or more $$\frac{N}{2^x} \times \frac{N}{2^x}$$

subblocks are split into smaller subblocks.

For example, when the N×N block is split into $$\frac{N}{2^x} \times \frac{N}{2^x}$$

subblocks and all $$\frac{N}{2^x} \times \frac{N}{2^x}$$

subblocks within the N×N block are not split into smaller subblocks, the partition flag has a value (e.g. 0) indicating that all $$\frac{N}{2^x} \times \frac{N}{2^x}$$

subblocks with the N×N block are not split into smaller subblocks.

When the N×N block is split into $$\frac{N}{2^x} \times \frac{N}{2^x}$$

subblocks and one or more $$\frac{N}{2^x} \times \frac{N}{2^x}$$

subblocks within the N×N block are split into smaller subblocks, the partition flag has a value (e.g. 1) indicating that all $$\frac{N}{2^x} \times \frac{N}{2^x}$$

subblocks within the N×N block are split into smaller subblocks.

When the partition flag has the value indicating that a subblock is split into smaller subblocks, partition layer values and partition flags for all $$\frac{N}{2^x} \times \frac{N}{2^x}$$

subblocks within the N×N block are encoded and subblock types of respective $$\frac{N}{2^x} \times \frac{N}{2^x}$$

subblocks are transmitted to the video decoding apparatus.

However, when a subblock size split according to a partition layer value corresponds to a minimum block size (that is, the subblock cannot be split into smaller subblocks), the partition flag is not encoded.

The aforementioned partition layer value and partition flag are included in the bitstream, and encoded and transmitted to the video decoding apparatus. In a method of encoding the partition layer value, a macroblock size to be transmitted can be encoded by using various binary coding methods such as a unary code, a truncated unary code, an Exp-Golomb code, etc.

Alternatively, the macroblock size can be encoded by using a binary arithmetic coding, a Huffman coding, etc.

Alternatively, an index value of a prearranged table between the video encoding and the video decoding apparatus can be encoded by using the aforementioned various binary coding methods.

The partition flag can be included in the bitstream by using 1 bit indicating whether a block is split or not.

FIG. 20 is an exemplary diagram for illustrating a process of encoding block partition information by using a partition layer value and a partition flag according to another aspect of the present disclosure.

FIG. 20 shows an example of encoding block partition information by using the partition layer value and the partition flag when a block size of a macroblock is 64×64 and a maximum partition layer value is 4.

When the macroblock is split as shown in FIG. 20, partition layer values and partition flags of respective subblocks are generated in every partition number for each layer for identifying the respective subblocks as shown in a table of FIG. 20, and partition layer values and partition flags are sequentially encoded from an L0-P0 subblock to an L1-P3 subblock. Since the L0-P0 subblock having a block size of 64×64 is split into 4 subblocks having a block size of 32×32, a partition layer value is 1. A partition flag value of each 32×32 subblock is set to a value indicating that the subblock is split into smaller subblocks, and a partition layer value and a partition flag are encoded.

Since the L1-P0 subblock having the block size of 32×32 is not split into smaller subblocks, a partition layer value is 0 and a partition flag does not need to be encoded. Since an L1-P1 subblock having the block size of 32×32 is split into subblocks having a block size of 8×8, a partition layer value is 2. Since the subblocks having the block size of 8×8 are not split any more, a partition flag is encoded into 0 indicating that the subblock is not split. In this event, sizes and shapes of subblocks L2-P0 to L2-P15, which are lower subblocks of the L1-P1 subblock, can be identified in the video decoding apparatus by encoding only partition layer values and partition flags of the subblocks L2-P0 to L2-P15 without separately encoding partition types of the subblocks L2-P0 to L2-P15. Since an L1-P2 subblock having the block size of 32×32 is split into 4 subblocks having a block size of 16×16, a partition layer value is 1 and a partition flag is encoded into 1 indicating that the subblock is split into smaller subblocks. Since it has been indicated that the L1-P2 subblock is split into smaller subblocks by indicating the partition flag of the L1-P2 subblock as 1, partition types of respective split subblocks of L2-P0 to L2-P3 are encoded. Accordingly, partition layer values of the L2-P0, L2-P1, and L2-P2 subblocks are 0, and thus partition flags do not need to be encoded due to the partition layer values of 0. Since the L2-P3 subblock is split into subblocks having a block size of 4×4 and the split subblocks are not split into smaller subblocks, a partition layer 2 and a partition flag 0 indicating that the subblock is not split should be encoded. However, a maximum partition layer value and a sum of total layer values of the L1-P1 and L2-P3 subblocks are equal to each other, wherein the maximum partition layer value is 4 and each of the partition layer values of the L1-P1 and L2-P3 subblocks is 2. Accordingly, it can be derived that the subblock cannot be split any more, which means that the partition flag does not need to be encoded. Lastly, since an L1-P3 subblock having the block size of 32×32 is split into 64 subblocks having a block size of 4×4, a partition layer value is 3 and its partition layer value is equal to the maximum partition layer value like the L2-P3 subblock.

Accordingly, it can be derived that the subblock cannot be split any more, which means that the partition flag does not need to be encoded.

In the above described way, block partition information can be encoded by encoding the partition layer value and the partition flag for the partition number for each layer for identifying respective subblocks of the macroblock.

Figures 21, 22:
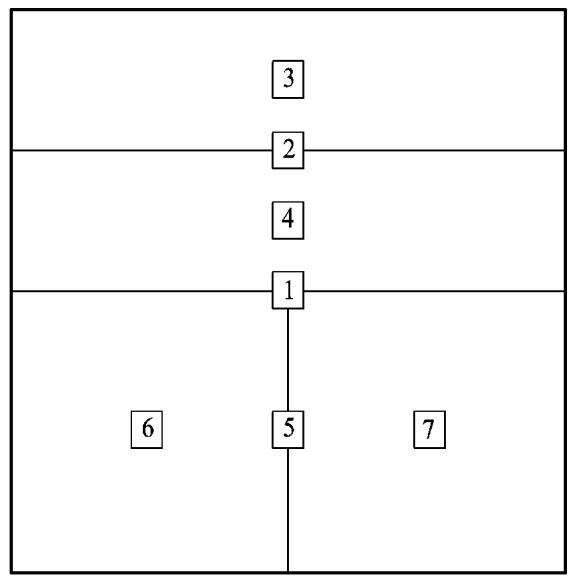
FIG. 21 is an exemplary diagram for illustrating a macroblock split into subblocks of various block sizes according to another aspect of the present disclosure.
FIG. 22 is an exemplary diagram for illustrating a process of sequentially encoding partition type indicating information for each layer of the macroblock according to a subblock order.

Meanwhile, the method of encoding block partition information by sequentially encoding the partition type indicating information for each layer of the macroblock according to the subblock order and generating encoded partition information data has been described through FIGS. 11 to 13, but it is not necessary to split the macroblock into subblocks as shown in FIGS. 11 to 13 and the block partition information can be encoded by sequentially encoding the partition type indicating information for each layer of the macroblock according to the subblock order even when the macroblock is split as shown in FIG. 21.

B-1-4-4) Partition Information Encoding Method 4

Hereinafter, a fourth method of encoding block partition information is described with reference to FIGS. 21 and 22.

FIG. 21 is an exemplary diagram for illustrating another example of a macroblock split into subblocks having various block sizes according to another aspect of the present disclosure.

Meanwhile, it has been described that subblocks of the layer K+1 are available only when the subblock of the layer K ($0 \leq K \leq \log_2(N/4)$) is split into 4 subblocks in the layer K in FIG. 9, but subblocks of the layer K+1 are available when the subblock of the layer K is split into one or more subblocks in the layer K in FIG. 21 (that is, when partition type indicating information is 1, 2, or 3).

FIG. 21 shows an example in which a macroblock having a block size of 64×64 is split into 2 subblocks having a block size of 64×16 and 2 subblocks having a block size of 32×32. Numbers written in "□" represent an order of encoding partition type indicating information of respective subblocks. If partition type indicating information of respective layers of the macroblock is sequentially encoded according to the subblock order, the partition type indicating information for respective layers can be encoded according to the order shown in FIG. 11.

FIG. 22 is another exemplary diagram for illustrating a process of sequentially encoding partition type indicating information for respective layers of the macroblock according to the subblock order.

A table shown in FIG. 22 is generated if partition type information of respective subblocks of the macroblock shown in FIG. 21 is encoded. If partition type indicating information of respective layers of the macroblock is sequentially encoded according to the subblock order, the partition type indicating information for respective layers can be encoded according to the order shown in FIG. 11.

In this event, the partition type indicating information can be encoded into the binary bit string by using a lossless compression coding such as a binary arithmetic coding, a Huffman coding, etc.

Alternatively, an actual partition type indicating information value can be encoded using various binary coding methods such as a unary code, a truncated unary code, Exp-Golomb code, etc.

Further, when the macroblock is split by using partition types according to another aspect of the present disclosure shown in FIG. 34, the partition type indicating information may be a flag having a 1 bit length indicating that the current block is split into 4 subblocks or not.

B-1-5) Description of Encoding Flowchart

Figure 23:
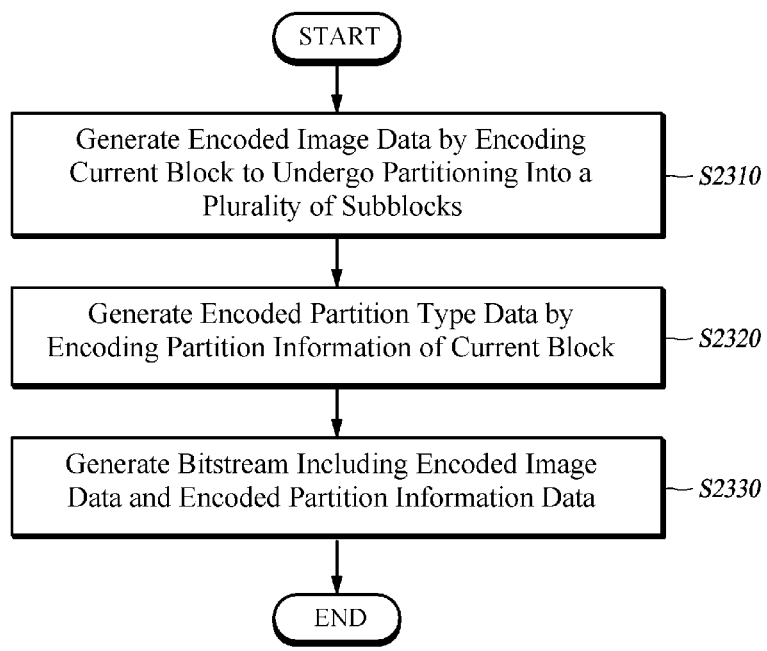
FIG. 23 is a flowchart for illustrating a video encoding method according to another aspect of the present disclosure.

FIG. 23 is a flowchart for illustrating a video encoding method according to another aspect of the present disclosure.

According to the video encoding method according to another aspect of the present disclosure, the video encoding apparatus 800 generates encoded image data by performing a predictive-encoding on a current block split into a plurality of subblocks in step S2310, generates encoded partition information data by encoding partition information of the current block in step S2320, and generates a bitstream including the encoded image data and the encoded partition information data in step S2330.

Here, the current block may be a macroblock having a size larger than a block size of 16×16, and the partition information may contain block sizes and arrangements of a plurality of subblocks within the current block.

A plurality of subblocks can be identified by partition type indicating information for each partition layer. In this event, the video encoding apparatus 800 can encode partition information of the current block by sequentially encoding the partition type indicating information for each partition layer according to a partition type indicating information encoding order or encode the partition information of the current block by encoding layer numbers and the partition type indicating information by using a tree structure in step S2320.

Further, the video encoding apparatus 800 can encode the partition information of the current block by using partition layer values and partition flags. More specifically, the video encoding apparatus 800 can encode the partition information of the current block by using partition layer values and partition flags only when a block type of the current block is an intra block type. Since the method of encoding the partition information of the current block by the video encoding apparatus 800 has been described through FIGS. 8 to 22, its detailed description will be omitted here.

B-2) Video Decoding Apparatus of Embodiment 2

B-2-1) Block Diagram and Description of Decoding Apparatus

Figure 24:
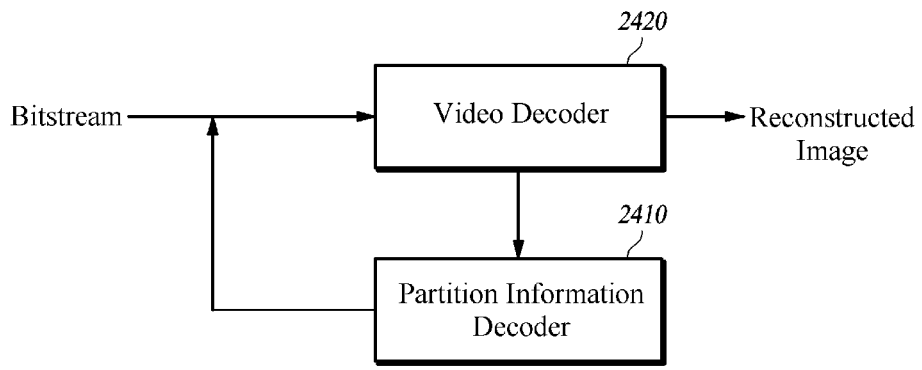
FIG. 24 is a schematic block diagram for illustrating a video decoding apparatus according to another aspect of the present disclosure.

FIG. 24 is a schematic block diagram for illustrating a video decoding apparatus according to another aspect of the present disclosure.

The video decoding apparatus 2400 according to another aspect of the present disclosure may include a partition information decoder 2410 and a video decoder 2420. Each of the partition information decoder 2410 and the video decoder 2420 comprises one or more processors and/or application-specific integrated circuits (ASICs) specified for respectively corresponding operations and functions described hereinafter.

The partition information decoder 2410 extracts and decodes encoded partition information data from the bitstream, and reconstructs partition information of the current block. Here, the partition information of the current block may be partition type indicating information for each partition layer, layer numbers and partition type indicating information using a tree structure, or partition layer values and partition flags. When the partition information of the current block is the partition type indicating information according to a partition type indicating information encoding order, the partition information decoder 2410 can obtain partition type indicating information for each layer shown in FIG. 13 by decoding encoded partition information data, and can obtain a current block split into a plurality of subblocks shown in FIG. 11 by splitting the current block into the plurality of subblocks according to partition type indicating information for each layer based on the partition type indicating information and the encoding order shown in the table of FIG. 3.

When the partition information of the current block corresponds to layer numbers and partition type indicating information using the tree structure, the partition information decoder 2410 can obtain layer numbers and partition type indicating information expressed in the tree structure as shown in FIG. 16 by decoding encoded partition information data, and can obtain a current block split into a plurality of subblocks shown in FIG. 15 by inversely performing the method described in FIGS. 15 and 16 by using the layer numbers and the partition type indicating information expressed in the tree structure as shown in FIG. 16.

When the partition information of the current block corresponds to partition layer values and partition flags, the partition information decoder 2410 can obtain partition layer values and partition flags shown in FIG. 20 by decoding encoded partition information data, and can obtain a current block split into a plurality of subblocks shown in FIG. 20 by inversely performing the method described in FIG. 20.

The video decoder 2420 may be equally or similarly constructed to the video decoding apparatus according to an aspect of the present disclosure described with reference to FIG. 7. However, the video decoder 2420 according to another aspect of the present disclosure extracts and decodes encoded image data of subblocks split according to partition information of the current block reconstructed by the partition information decoder 2410, and then reconstructs respective subblocks through a predictive encoding. In this event, image data extracted from the bitstream by the video decoder 2420 may be predicted data and/or data required for a residual signal decoding such as a transform type, CBP, and a transform coefficient. Here, the predicted data corresponds to data indicating whether each subblock is an intra block or an inter block, and corresponds to an intra prediction mode for the intra block and motion information for the inter block.

B-2-2) Partition Information Decoding Method

Hereinafter, various methods of decoding partition information, which is information indicating sizes and shapes of subblocks used for the prediction or the transform within the macroblock, according to aspects of the present invention will be described.

B-2-2-1) Partition Information Decoding Method 1

A decoding method according to the first method of encoding the partition information is first described.

Partition type indicating information is decoded by using a prearranged subblock type available for each layer between the video encoding apparatus and the video decoding apparatus according to a prearranged order between the video encoding apparatus and the video decoding apparatus. For example, available subblock types for respective layers may be subblock types shown in FIGS. 10 and 34, and the partition type indicating information can be sequentially decoded according to the orders shown in FIGS. 11 and 13.

Hereinafter, a decoding method under the same conditions as the examples used for describing the first method of encoding the partition information is described. The partition information is decoded based on subblock types shown in FIG. 10 according to the order shown in FIG. 11.

The partition information decoder 2410 extracts and decodes first partition type indicating information from the bitstream, and reconstructs partition type indicating information of a macroblock layer 0. When a reconstructed partition type indicating information value is 0, it means that the macroblock is not split into subblocks, so that a partition type indicating information decoding of the current macroblock is terminated. Thereafter, the prediction or the transform is performed by unit of N×N macroblocks.

When the reconstructed partition type indicating information value of the layer 0 is 1, the macroblock is split into 2 subblocks of size $$N \times \frac{N}{2}$$

and a partition type indicating decoding of the current macroblock is terminated. Thereafter, the prediction or the transform is performed by unit of $$N \times \frac{N}{2}$$

macroblocks.

When the reconstructed partition type indicating information value of the layer 0 is 2, the macroblock is split into 2 subblocks of size $$\frac{N}{2} \times N$$

and a partition type indicating decoding of the current macroblock is terminated. Thereafter, the prediction or the inverse transform is performed by unit of $$\frac{N}{2} \times N$$

macroblocks.

When the reconstructed partition type indicating information value of the layer 0 is 3, the macroblock is split into 4 subblocks of size $$\frac{N}{2} \times \frac{N}{2}$$

and partition type indicating information of a first subblock (having a partition number 0 of a layer 1) is decoded. Here, a layer number of the $$\frac{N}{2} \times \frac{N}{2}$$

subblocks is 1, which is a value increased from a higher layer number.

When partition type indicating information of the subblock having the partition number 0 of the layer 1 extracted and decoded from the bitstream is not 3, partition type indicating information of a second subblock of size $$\frac{N}{2} \times \frac{N}{2}$$

(having a partition 1 of the layer 1) is encoded.

When the partition type indicating information of the subblock having the partition number 0 of the layer 1 extracted and decoded from the bitstream is 3, the current subblock is split into 4 subblocks and the layer number is 2. Thereafter, partition type indicating information of a subblock corresponding to a partition number 0 of a layer 1 is extracted and decoded from the bitstream.

In a case where a layer number K of the current subblock having a partition number Y corresponds to a maximum value which can be allocated to layer numbers, if decoded partition type indicating information of the current subblock (having the partition number Y of the layer number K) is 3, the current subblock is split into 4 subblocks and then partition type indicating information of a subsequent subblock (having a partition number Y+1 of the layer number K) is decoded in a raster scan order.

When the partition number of the current subblock corresponds to a maximum value of partition numbers included in the current layer, partition type indicating information of subblocks of a higher layer, which have not been decoded yet, is decoded.

Hereinafter, the decoding method according to the aspect of FIG. 11 is described based on a case where a macroblock size is 64×64 and the number of maximum partition layers is 4. In the aspect of FIG. 11, a value encoded with partition type indicating information in the video encoding apparatus is {3, 3, 3, 3, 3, 0, 0, 0, 0, 1, 2, 1, 3, 0, 0, 0, 0}.

First, partition type indicating information of a layer 0 is decoded.

Since the decoded partition type indicating information is 3, the 64×64 macroblock is split into 4 subblocks of size 32×32 (L1-P0, L1-P1, L1-P2, and L1-P3).

Since each 32×32 subblock can be split into smaller subblocks, partition type indicating information of a first 32×32 subblock (L1-P0) within the 64×64 macroblock is decoded.

Since secondly decoded partition type indicating information is 3, the L1-P0 subblock is split into 4 subblocks of size 16×16 (L2-P0, L2-P1, L2-P2, and L2-P3) and partition type indicating information of the L2-P0 subblock is extracted and decoded from the bitstream.

Since thirdly decoded partition type indicating information is 3, the L2-P0 subblock of size 16×16 is split into 4 subblocks of size 8×8 (L3-P0, L3-P1, L3-P2, and L3-P3) and partition type indicating information of the L3-P0 subblock is extracted and decoded from the bitstream.

Since fourthly decoded partition type indicating information is 3, the L3-P0 subblock of size 8×8 is split into 4 subblocks of size 4×4. Here, since the number of maximum partition layers is 4, the subblock cannot be split into smaller subblocks and thus partition type indicating information of the L3-P1 subblock is extracted and decoded from the bitstream.

Since fifthly decoded partition type indicating information is 3, the L3-P1 subblock of size 8×8 is split into 4 subblocks of size 4×4 and partition type indicating information of the L3-P2 subblock is extracted and decoded from the bitstream.

Since sixthly decoded partition type indicating information is 0, the L3-P2 subblock of size 8×8 is not split any more and partition type indicating information of the L3-P2 subblock, which is the sequent subblock, is extracted and decoded from the bitstream.

Since seventhly decoded partition type indicating information is 0, the L3-P3 subblock of size 8×8 is also not split. Here, since a partition number of the current subblock corresponds to a maximum value of partition numbers included in the current layer, partition type indicating information of subblock L2-P1 of a higher layer is extracted and decoded from the bitstream.

Since eighthly decoded partition type indicating information is 0, a block size of the subblock L2-P1 is 16×16.

In the same way, partition type indicating information of the subblocks L2-P2 and L2-P3 is extracted and decoded from the bitstream, and respective subblock types are determined.

Since ninthly decoded partition type indicating information is also 0, a block size of the subblock L2-P2 is 16×16. Since tenthly decoded partition type indicating information is 1, the L2-P3 subblock is split into 2 subblocks of size 16×8.

Since all partition type indicating information of subblocks included in the layer 2 have been decoded, partition type indicating information of a second subblock L1-P1 of size 32×32 of the layer 1, which is a higher layer, is decoded.

Since eleventhly decoded partition type indicating information is 2, the 32×32 block corresponding to the L1-P1 subblock is split into 2 subblocks of size 16×32 and partition type indicating information of the subblock L1-P2 is decoded.

Since twelfthly decoded partition type indicating information is 1, the 32×32 block corresponding to the L1-P2 subblock is split into 2 subblocks of size 32×16 and partition type indicating information of the subblock L1-P3 is decoded.

Since thirteenthly decoded partition type indicating information is 3, the 32×32 block corresponding to the L1-P3 subblock is split into 4 subblocks of size 16×16 (L2-P0, L2-P1, L2-P3, and L2-P3 ) and partition type indicating information of respective subblocks are decoded in the same way.

Since fourteenthly decoded partition type indicating information is 0, a subblock type of the L2-P0 subblock is 16×16 and partition type indicating information of the L2-P1 subblock, which is a subsequent subblock, is decoded because the L2-P0 subblock is not split any more.

Since fifteenthly decoded partition type indicating information is 0, a subblock type of the L2-P1 subblock is 16×16 and partition type indicating information of the L2-P2 subblock, which is a subsequent subblock, is decoded because the L2-P1 subblock is not split any more.

Since sixteenthly decoded partition type indicating information is 0, a subblock type of the L2-P2 subblock is 16×16 and partition type indicating information of the L2-P3 subblock, which is a subsequent subblock, is decoded because the L2-P2 subblock is not split any more.

Since seventeenthly decoded partition type indicating information is 0, a subblock type of the L2-P3 subblock is 16×16 and a partition type indicating information decoding for a current macroblock decoding is terminated because subblock types of all subblocks within the macroblock have been determined.

Hereinafter, a method of decoding partition type indicating information when all partition type indicating information of higher layers is encoded and then partition type indicating information of lower layers is encoded according to the partition type indicating information encoding order will be described.

In the aspect of FIG. 11, a value encoded with partition type indicating information in the video encoding apparatus is {3, 3, 2, 1, 3, 3, 0, 0, 1, 0, 0, 0, 0, 3, 3, 0, 0}.

First, partition type indicating information of a layer 0 is decoded.

Since the decoded partition type indicating information is 3, the 64×64 macroblock is split into 4 subblocks of size 32×32 (L1-P0, L1-P1, L1-P2, and L1-P3).

Since the number of subblocks included in a layer 1 is 4, 4 partition type indicating information pieces are decoded. Since partition type indicating information of subblocks (L1-P0, L1-P1, L1-P2, and L1-P3) reconstructed from the bitstream are {3, 2, 1, 3}, the L1-P0 and L1-P3 subblocks are split into 4 subblocks of size 16×16, the L1-P1 subblock is split into 2 subblocks of size 16×32, and the L1-P2 subblock is split into 2 subblocks of size 32×16.

Partition type indicating information of 8 subblocks of size 8×8 of a layer 2 included in the L1-P0 and L1-P3 subblocks is extracted and decoded from the bitstream.

Since partition type indicating information of 4 subblocks (L2-P0, L2-P1, L2-P2, and L2-P3) included in the reconstructed L1-P0 is {3, 0, 0, 1} and partition type indicating information of 4 subblocks (L2-P0, L2-P1, L2-P2, and L2-P3) included in the reconstructed L1-P3 is {0, 0, 0, 0}, the L2-P0 subblock included in the L1-P0 subblock is split into 4 subblocks of size 4×4 and the L2-P3 subblock is split into 2 subblocks of size 8×4.

Since partition type indicating information of the L2-P1 and L2-P2 subblocks included in the L1-P0 subblock and 4 subblocks included in the L1-P3 subblock is all 0, the subblocks are not split.

Since the L2-P0 subblock included in the L1-P0 subblock is split into 4 subblocks and they cannot split into smaller subblocks any more, a partition type indicating information decoding for a current macroblock decoding is terminated.

In this event, the partition type indicating information is entropy-decoded by using a prearranged method between the video encoding apparatus and the video decoding apparatus among lossless compression encoding/decoding methods such as a binary arithmetic coding, a Huffman coding, etc.

Further, an actual partition type indicating information value can be decoded by using various binary coding methods such as a unary code, a truncated unary code, an Exp-Golomb code, etc.

In addition, the video decoding apparatus performs an entropy decoding by using Tables 1 and 2 according to layer numbers of partition type indicating information when the video encoding apparatus uses a binary arithmetic coding, uses Table 1 in a case where a layer number is equal to or smaller than $$\log_2\left(\frac{N}{16}\right),$$

and uses Table 2 in a case where the layer number is larger than $$\log_2\left(\frac{N}{16}\right),$$

as the partition type indicating information encoding method.

For example, when partition type indicating information included in a layer 1 is entropy-decoded for a 64×64 macroblock, 2 bits are entropy-decoded and then partition type indicating information is obtained using Table 1.

When partition type indicating information included in a layer 3 is entropy-decoded for the 64×64 macroblock, Table 2 is used. First, 1 bit is entropy-decoded. Then, when a decoded binary bit is 1, partition type indicating information is set to 0 and a partition type indicating information entropy decoding of the current subblock is terminated. When the decoded binary bit is not 1, 1 bit is further entropy-decoded from the bitstream. When a secondly decoded bit is 0, partition type indicating information of the current subblock is set to 1 and an entropy decoding for partition type indicating information of the current subblock is terminated. When the secondly decoded bit is 1, 1 bit is further entropy-decoded from the bitstream and it is determined whether partition type indicating information of the current subblock is 2 or 3 by using Table 2.

Further, when it is prearranged between the video encoding apparatus and the video decoding apparatus that partition types according to another aspect of the present disclosure shown in FIG. 34 are used, it can be determined whether the current subblock is split into 4 subblocks by entropy-decoding 1 bit for the partition type indicating information decoding.

B-2-2-2) Partition Information Decoding Method 2

Hereinafter, a decoding method according to the second method of encoding the partition information is described.

According to the second method, block partition information can be decoded by first decoding layer numbers by using the tree structure and then decoding partition type indicating information.

In a method of decoding layer numbers, a difference value between a layer number of a current level and a layer number of a higher level is reconstructed by decoding binary bits 0 and 1. In this event, 1 bit is read and decoded from the bitstream in order to reconstruct the difference value. When a decoded binary bit is 0, 1 bit is further read and decoded from the bitstream. In the same way, the binary bit 0 is continuously reconstructed until the binary bit 1 is reconstructed. When the reconstructed binary bit is 1, no bits are further read and decoded, and the difference value becomes the number of reconstructed 0.

A decoding of the layer number of the level 0 is started and a difference value between the layer number of the level 0 and a number 0 is reconstructed from the bitstream by using the aforementioned method for a layer number reconstruction. When the reconstructed layer number of the level 0 is larger than a number 0, a tree is constructed by generating child nodes in the current node. The number of newly generated child nodes is different depending on a prearranged subblock splitting method between the video encoding apparatus and the video decoding apparatus. According to a subblock splitting method shown in FIG. 9, since subblocks included in a lower layer can be used only when the current subblock is split into 4 subblocks, 4 child nodes are generated. The newly generated nodes have level values increased from level values of higher layers by 1.

That is, when the reconstructed layer number of the level 0 is larger than a level value 0, the tree structure is constructed by generating 4 child nodes included in a level 1.

Next, 4 difference values for reconstructing layer numbers of the newly generated nodes are extracted and reconstructed from the bitstream, and layer numbers of respective nodes are reconstructed by adding the difference values and layer numbers of higher nodes.

In the same way, when the reconstructed layer number of each node and a level value of the node are equal to each other, a child node included in a lower level is not constructed for a corresponding node. When the reconstructed layer number of each node is larger than the level value of the node, 4 child nodes are generated for the corresponding node, and a decoding of layer numbers of the newly constructed nodes is performed.

However, when the reconstructed layer number is a maximum value, which can be allocated to layer numbers (that is, when a layer number starts from 0, a maximum value, which can be allocated to the layer number, corresponds to "a maximum partition layer value −1"), 4 child nodes are generated for the current node, but the decoding of layer numbers of respective nodes is not performed.

The tree is constructed until a layer number of the lowest nodes is equal to a level number of each node or the layer number has a maximum value, which can be allocated to the layer number, and each node layer number reconstruction is continuously performed.

Thereafter, the partition type indicating information decoding for the lowest nodes is performed. Partition type indicating information of respective nodes is entropy-decoded by using a method prearrange between the video encoding apparatus and the video decoding apparatus among lossless compression encoding/decoding methods such as a binary arithmetic coding, a Huffman coding, etc.

Further, an actual partition type indicating information value can be decoded by using various binary coding methods such as a unary code, a truncated unary code, Exp-Golomb code, etc.

In addition, the video decoding apparatus performs an entropy decoding by using Tables 1 and 2 according to layer numbers of partition type indicating information when the video encoding apparatus uses a binary arithmetic coding, uses Table 1 in a case where a layer number is equal to or smaller than $$\log_2\left(\frac{N}{16}\right),$$

and uses Table 2 in a case where the layer number is larger than $$\log_2\left(\frac{N}{16}\right)$$

as the partition type indicating information encoding method. For example, when partition type indicating information included in a layer 1 is entropy-decoded, 2 bits are entropy-decoded and then partition type indicating information is obtained using Table 1. When partition type indicating information included in a layer 3 is entropy-decoded, Table 2 is used. For example, 1 bit is first entropy-decoded. Then, when a decoded binary bit is 1, partition type indicating information is set to 0 and a partition type indicating information entropy decoding of the current subblock is terminated. When the decoded binary bit is not 1, 1 bit is further entropy-decoded from the bitstream. When a secondly decoded bit is 0, partition type indicating information of the current subblock is set to 1 and an entropy decoding for partition type indicating information of the current subblock is terminated. When the secondly decoded bit is 1, 1 bit is further entropy-decoded from the bitstream and it is determined whether partition type indicating information of the current subblock is 2 or 3 by using Table 2.

Further, when it is prearranged between the video encoding apparatus and the video decoding apparatus that partition types according to another aspect of the present disclosure shown in FIG. 34 are used, it can be determined whether the current subblock is split into 4 subblocks by entropy-decoding 1 bit for the partition type indicating information decoding.

Hereinafter, the decoding method according to the aspect of FIGS. 14A and 14B will be described. A binary bit value encoded with partition information in the video encoding apparatus is "101" in the aspect of FIGS. 14A and 14B.

First, 1 bit is extracted and reconstructed from the bitstream for reconstructing a layer number of a level 0. Since the bit extracted from the bitstream is 1, a difference value for reconstructing the layer number of the level 0 is 0. In a case of the level 0, since there is no higher node, a layer value is reconstructed by adding a prearranged value 0 between the video encoding apparatus and the video decoding apparatus and the reconstructed difference value. In this event, the difference value is 0 and thus the reconstructed layer value becomes 0.

Since both the reconstructed layer value and the level value are 0, a process of decoding the layer number is terminated and partition type indicating information is decoded.

Since a method of directly expressing a partition type indicating information value with a binary bit when partition type indicating information is encoded in the aspect of FIGS. 14A and 14B, the video decoding apparatus also extracts 2 bits from the bitstream and reconstructs a value in the same way. Since a binary bit "01" is expressed by an integer "1", reconstructed partition type indicating information becomes 1.

When shapes of subblocks of a macroblock are determined using the reconstructed layer value and partition type indicating information, all subblocks within the macroblock are included in a layer 0, so that the subblock has one of subblock types 64×64, 64×32, 32×64, and 32×32. Further, it can be derived that the macroblock is split into 2 subblocks of size 64×32 because partition type indicating information is 0.

Hereinafter, a decoding method according to the aspect of FIGS. 15 and 16 is described. In the aspect of FIG. 16, a binary bit value encoded with partition information in the video encoding apparatus is "01111100111001".

First, 1 bit is extracted and reconstructed from the bitstream for reconstructing a layer number of a level 0. Since the bit extracted from the bitstream is 0, 1 bit is further extracted and reconstructed from the bitstream. Since the secondly reconstructed bit is 1, a difference value reconstruction for the layer number of the level 0 is terminated. Since the bitstream extracted for the difference value reconstruction is "01", the difference value becomes 1, which corresponds to the number of 0, and a value of 1 generated by adding the reconstructed difference value 0 and 0 is allocated as the layer number.

Since the reconstructed layer number 0 of the level 0 is larger than the level value 0, 4 child nodes included in a level 1 are generated in the current node.

1 bit is extracted from the bitstream for reconstructing a layer number of a first node of the level 1. Since the thirdly extracted bit is 1, the difference value becomes 0. The layer number 1 of the first node is reconstructed by adding the reconstructed difference value and the layer number of the level 0, which is a higher node of the first node of the level 1. Since the reconstructed layer number 1 of the level 1 and the level value 1 are equal to each other, a difference value decoding for a second node of the level 1 is started.

1 bit is extracted from the bitstream for reconstructing a layer number of the second node of the level 1. Since the fourthly extracted bit is 1, the difference value becomes 0. The layer number 1 of the second node is reconstructed by adding the reconstructed difference value and the layer number of the level 0, which is a higher node of the second node of the level 1. Since the reconstructed layer number 1 of the level 1 and the level value 1 are equal to each other, a difference value decoding for a third node of the level 1 is started.

1 bit is extracted from the bitstream for reconstructing a layer number of the third node of the level 1. Since the fifthly extracted bit is 1, the difference value becomes 0. The layer number 1 of the third node is reconstructed by adding the reconstructed difference value and the layer number of the level 0, which is a higher node of the third node of the level 1. Since the reconstructed layer number 1 of the level 1 and the level value 1 are equal to each other, a difference value decoding for a fourth node of the level 1 is started.

1 bit is extracted from the bitstream for reconstructing a layer number of the fourth node of the level 1. Since the sixthly extracted bit is 1, the difference value becomes 0. The layer number 1 of the fourth node is reconstructed by adding the reconstructed difference value and the layer number of the level 0, which is a higher node of the fourth node of the level 1.

Since layer numbers of all nodes included in the level 1 are reconstructed and there is no node included in a level 2, the layer number decoding is terminated and the partition type indicating information decoding for respective nodes of the lowest level is performed.

In the aspect of FIGS. 15 and 16, since partition type indicating information is encoded by allocating binary bits "11", "00", "10", and "01" to the partition type indicating information, the video decoding apparatus also reconstructs partition type indicating information by extracting 2 bits for respective nodes from the bitstream in the same way.

Since there are 4 nodes included in the level 1 as nodes included in the lowest level in the aspect of FIGS. 15 and 16, partition type indicating information is reconstructed by extracting 2 bits for respective nodes from the bitstream.

Since seventh and eighth bits extracted from the bitstream correspond to "00", partition type indicating information for a first node is 1. Since ninth and tenth bits extracted from the bitstream correspond to "11", partition type indicating information for a second node is 0. Since eleventh and twelfth bits extracted from the bitstream correspond to "10", partition type indicating information for a third node is 2. Since thirteenth and fourteenth bits extracted from the bitstream correspond to "01", partition type indicating information for a fourth node is 3.

When shapes of subblocks of a macroblock is determined using the reconstructed layer value and partition type indicating information, all subblocks within the macroblock are included in a layer 1, so that a 64×64 macroblock is split into 4 subblocks of size 32×32 and respective 32×32 subblocks have one of subblock types 32×32, 32×16, 16×32, and 16×16, which are included in the layer 1.

Since reconstructed partition type indicating information of a first subblock is 1, a first 32×32 subblock is split into 2 subblocks of size 32×16. Since reconstructed partition type indicating information of a second subblock is 0, a second 32×32 subblock is split into 1 subblock of size 32×32. In the same way, since reconstructed partition type indicating information of a third subblock is 2, a third 32×32 subblock is split into 2 subblocks of size 16×32. Since reconstructed partition type indicating information of a fourth subblock is 3, a fourth 32×32 subblock is split into 4 subblocks of size 16×16. The split subblocks are illustrated in FIG. 15.

Hereinafter, a decoding method according to the aspect of FIGS. 17 and 18 is described. In the aspect of FIG. 18, a binary bit value encoded with partition information in the video encoding apparatus is "01111010111100111010011111011111".

First, 1 bit is extracted and reconstructed from the bitstream for reconstructing a layer number of a level 0. Since the bit extracted from the bitstream is 0, 1 bit is further extracted and reconstructed from the bitstream. Since the secondly reconstructed bit is 1, a difference value reconstruction for the layer number of the level 0 is terminated. Since the bitstream extracted for the difference value reconstruction is "01", the difference value becomes 1, which corresponds to the number of 0, and a value of 1 generated by adding the reconstructed difference value 0 and 0 is allocated as the layer number.

Since the reconstructed layer number 0 of the level 0 is larger than the level value 0, 4 child nodes included in a level 1 are generated in the current node.

1 bit is extracted from the bitstream for reconstructing a layer number of a first node of the level 1. Since the thirdly extracted bit is 1, the difference value becomes 0. The layer number 1 of the first node is reconstructed by adding the reconstructed difference value and the layer number of the level 0, which is a higher node of the first node of the level 1. Since the reconstructed layer number 1 of the level 1 and the level value 1 are equal to each other, a difference value decoding for a second node of the level 1 is started.

1 bit is extracted from the bitstream for reconstructing a layer number of the second node of the level 1. Since the fourthly extracted bit is 1, the difference value becomes 0. The layer number 1 of the second node is reconstructed by adding the reconstructed difference value and the layer number of the level 0, which is a higher node of the second node of the level 1. Since the reconstructed layer number 1 of the level 1 and the level value 1 are equal to each other, a difference value decoding for a third node of the level 1 is started.

1 bit is extracted from the bitstream for reconstructing a layer number of the third node of the level 1. Since the fifthly extracted bit is 1, the difference value becomes 0. The layer number 1 of the third node is reconstructed by adding the reconstructed difference value and the layer number of the level 0, which is a higher node of the third node of the level 1. Since the reconstructed layer number 1 of the level 1 and the level value 1 are equal to each other, a difference value decoding for a fourth node of the level 1 is started.

1 bit is extracted from the bitstream for reconstructing a layer number of the fourth node of the level 1. Since the sixthly extracted bit is 0, 1 bit is further extracted and reconstructed from the bitstream. Since the seventhly extracted bit is 1, the difference value reconstruction for the fourth node of the level 1 is terminated. Since the bitstream extracted for the difference value reconstruction is "01", the difference value becomes 1, which is the number of 0, and a layer number 2 is reconstructed by adding the reconstructed difference value and a layer number 1 of a higher node. Since the reconstructed layer number 2 has a value larger than a level value 1, in which the current node is included, 4 child nodes are generated for the fourth node of the level 1. The generated child nodes are included in a level 2.

Since layer numbers of all nodes included in the level 1 are reconstructed, layer numbers of nodes included in the level 2 are decoded in the same way.

The nodes included in the level 2 are child nodes of the fourth node of the level 1, and bits extracted for reconstructing a first node of the level 2 are "01", which is an eighth bit and a ninth bit. Since a difference value between the first node of the level 2 and a layer number 2 of a higher node is 1, a layer number of the current node is 3. In this event, since the reconstructed layer number 3 is larger than a level value 2, 4 child nodes are generated. However, since the reconstructed layer value 3 has a maximum value, which can be allocated to partition layer numbers, as described above, layer numbers are not decoded for 4 newly generated nodes of a level 3.

Bits extracted for reconstructing a second node to a fourth node of the level 2 are "111", which corresponds to a tenth bit to a twelfth bit. Since difference values of the 3 nodes are all 0, layer numbers of second, third, fourth nodes of the level 2 are 2.

Since layer numbers of all nodes included in the level 2 have been reconstructed and layer numbers of nodes included in the level 3 are not reconstructed, the layer number decoding is terminated and the partition type indicating information decoding for respective nodes of the lowest level is performed.

In the aspect of FIGS. 17 and 18, since partition type indicating information is encoded by allocating binary bits "11", "00", "10", and "01" to the partition type indicating information, the video decoding apparatus also reconstructs partition type indicating information by extracting 2 bits for respective nodes from the bitstream in the same way.

Since there are 3 nodes included in the level 1, 4 nodes included in the level 3, and 3 nodes included in the level 2 as nodes included in the lowest level in the aspect of FIGS. 17 and 18, partition type indicating information is reconstructed by extracting 2 bits for respective nodes from the bitstream.

When partition type indicating information is decoded in the same way as that described through FIG. 16, bits extracted for decoding partition types of 3 nodes included in the level 1 are sequentially "00", "11", and "10", so that partition type indicating information of a first node of the level 1 is 1, partition type indicating information of a second node of the level 1 is 0, and partition type indicating information of a third node of the level 1 is 2.

Since bits extracted for decoding partition types of 4 nodes included in the level 3 are sequentially "10", "01", "11", and "11", partition type indicating information of a first node of the level 3 is 2, partition type indicating information of a second node of the level 3 is 3, and partition type indicating information of a third node and a fourth node of the level 3 is 0, respectively.

Since bits extracted for decoding partition types of second to fourth nodes are sequentially "01", "11", and "11", partition type indicating information of a second node of the level 2 is 3, and partition type indicating information of a third node and a fourth node of the level 2 is 0, respectively.

When shapes of subblocks of a macroblock are determined by using the reconstructed layer value and partition type indicating information, layer numbers of subblocks within the macroblock have values equal to or larger than 1, so that a 64×64 macroblock is split into 4 subblocks of size 32×32. Since layer numbers of first to third nodes of the level 1 are 1, first to third 32×32 subblocks within the macroblock have one of subblock types 32×32, 32×16, 16×32, and 16×16, which are included in the layer 1, respectively. Since reconstructed partition type indicating information of the first 32×32 subblock is 1, the first 32×32 subblock is split into 2 subblocks of size 32×16. Since reconstructed partition type indicating information of the second 32×32 subblock is 0, the second 32×32 subblock is split into 1 subblock of size 32×32. In the same way, since reconstructed partition type indicating information of the third 32×32 subblock is 2, the third 32×32 subblock is split into 2 subblocks of size 16×32.

Since a reconstructed layer number of a fourth node of the level 1 corresponding to a fourth 32×32 subblock is 2, the fourth 32×32 subblock is split into 4 subblocks of size 16×16, and 16×16 subblocks having a layer number larger than 2 among the split 16×16 subblocks corresponding to 4 nodes of the level 2 are split one more time to have a higher layer. Here, since a reconstructed layer number of a first node of the level 2 is 3, the first 16×16 subblock is split into 4 subblocks of size 8×8 again.

Thereafter, subblock types of respective subblocks are determined according to partition type indicating information of the respective subblocks, which illustrated in FIG. 17.

B-2-2-3) Partition Information Decoding Method 3

Hereinafter, a decoding method according to the third method of encoding the partition information is described.

According to the third method, block partition information can be decoded by decoding partition layer values and partition flags.

Partition layer values are first extracted and reconstructed from the bitstream and then a macroblock is split according to the partition layer value. For example, when a macroblock size is N×N and the reconstructed partition layer value is x, the macroblock is split into $$\frac{N}{2^x} \times \frac{N}{2^x}$$

subblocks.

Thereafter, when a partition flag reconstructed by extracting and reconstructing the partition flag from the bitstream has a value (e.g. 0) indicating that all $$\frac{N}{2^x} \times \frac{N}{2^x}$$

subblocks within the macroblock are not split into smaller subblocks, a macroblock partition information decoding is terminated.

When the partition flag has a value (e.g. 1) indicating that one or more $$\frac{N}{2^x} \times \frac{N}{2^x}$$

subblocks within the macroblock are split into smaller subblocks, partition layer value and partition flags of respective subblocks are extracted and reconstructed from the bitstream according to a raster scan order in the same way.

Hereinafter, a decoding method of the aspect of FIG. 20 is described. In the aspect of FIG. 20, the partition layer value and partition flag encoded with partition information in the video encoding apparatus are {1, 1, 0, 2, 0, 1, 1, 0, 0, 0, 2, 3}.

A partition layer value is first extracted from the bitstream, and a partition layer value 1 and a partition flag 1 are decoded. Since the partition layer value is 1, a 64×64 macroblock is split into 4 subblocks of size 32×32.

Since the decoded partition flag is 1, a partition layer value and a partition flag are continuously decoded for each 32×32 subblock.

Since a partition layer value of a first 32×32 subblock is 0, it can be derived that the first 32×32 subblock is not split into smaller subblocks. In this event, a partition flag is not decoded from the bitstream.

A partition layer value of a second 32×32 subblock is extracted and decoded from the bitstream. Since the reconstructed partition layer value is 2, the 32×32 subblock is split into 16 subblocks of size 8×8 and a partition flag is subsequently extracted and decoded from the bitstream. Since the reconstructed partition flag is 0, it can be derived that the 16 subblocks within the second 32×32 subblock are not split into smaller subblocks and a partition layer value of a third 32×32 subblock is extracted and decoded from the bitstream.

Since the reconstructed partition layer value is 1, the 32×32 subblock is split into 4 subblocks of size 16×16 and a partition flag is decoded from the bitstream. Since the decoded partition flag is 1, it can be derived that one or more 16×16 subblocks are split into smaller subblocks and a partition layer value and a partition flag are decoded for each 16×16 subblock.

In the same way, the partition layer value is extracted and reconstructed from the bitstream for each 16×16 subblock. Then, when the partition layer value is not 0, a partition flag is extracted and reconstructed from the bitstream.

It can be derived from the above described aspect that partition layer values of first to third 16×16 subblocks are all 0 and the partition layer value of the fourth 16×16 subblock is 2.

Since the partition layer value of the fourth 16×16 subblock is 2, the 16×16 subblock is split into 16 subblocks of size 4×4. However, in this event, a partition flag is not decoded because each 4×4 subblock cannot be split into smaller subblocks although the reconstructed layer value is not 0.

Thereafter, the partition layer value of the fourth 32×32 subblock is extracted and decoded from the bitstream. In this event, since the reconstructed partition layer value is 3, the 32×32 subblock is split into 64 subblocks of size 4×4, and the partition information decoding is terminated because a split subblock size is a minimum block size.

The aforementioned partition layer value and partition flag are extracted and decoded from the bitstream, and the partition layer value is decoded by using a prearranged method between the video encoding apparatus and the video decoding apparatus among various binary coding methods such as a unary code, a truncated unary code, an Exp-Golomb code, etc.

Alternatively, the partition layer value can be decoded by using methods such as a binary arithmetic coding, a Huffman coding, etc.

Alternatively, an index value of a prearranged table between the video encoding apparatus and the video decoding apparatus can be decoded by using the aforementioned various binary encoding/decoding methods.

The partition flag is used for determining whether the current subblock is split into smaller subblocks by extracting and decoding 1 bit from the bitstream.

B-2-2-4) Partition Information Decoding Method 4

Hereinafter, a decoding method according to the fourth method of encoding the partition information is described.

The fourth method of decoding the partition information is similar to the first method of decoding the partition information. However, partition type indicating information is continuously extracted and decoded from the bitstream until partition type indicating information of all subblocks has a value (e.g. 0) indicating that the subblock is not split into smaller subblocks or a size of a subblock split from the current block according to partition type indicating information is a minimum subblock size.

Hereinafter, a decoding method according to the aspect of FIGS. 21 and 22 is described. According to the aspect of FIG. 22, partition type indicating information encoded with partition information in the video encoding apparatus is {1, 1, 0, 0, 2, 0, 0}.

Since firstly reconstructed partition type indicating information is 1, a 64×64 macroblock is split into 2 subblocks of size 64×32 (L1-P0 and L1-P1), and partition type indicating information of a first 64×32 subblock is extracted and reconstructed from the bitstream.

Since secondly reconstructed partition type indicating information is 1, the 64×32 subblock is split into 2 subblocks of size 64×16 (L2-P0 and L2-P1), and partition type indicating information of a first 64×16 subblock (L2-P0) is extracted and reconstructed from the bitstream.

Since thirdly reconstructed partition type indicating information is 0, the 64×16 subblock corresponding to the L2-P0 subblock is not split into smaller subblocks, and partition type indicating information of the subblock L2-P1, which is a subsequent subblock of the L2-P0 subblock, is extracted and reconstructed from the bitstream.

Since fourthly reconstructed partition type indicating information is 0, the 64×16 subblock is not split into smaller subblocks. Since partition information of subblocks included in the L2 has been all reconstructed, partition type indicating information of the L1-P1 subblock is extracted and reconstructed from the bitstream.

Since fifthly reconstructed partition type indicating information is 2, the 64×32 subblock corresponding to the L1-P1 subblock is split into 2 subblocks of size 32×32 (L2-P0 and L2-P1), and partition type indicating information of a first 32×32 subblock (L2-P0) is extracted and reconstructed from the bitstream.

Since sixthly reconstructed partition type indicating information is 0, the 32×32 subblock corresponding to the L2-P0 subblock is not split into smaller subblocks, and partition type indicating information of the subblock L2-P1, which is a subsequent subblock of the L2-P0 subblock, is extracted and reconstructed from the bitstream.

Since seventhly reconstructed partition type indicating information is 0, the 32×32 subblock corresponding to the L2-P1 subblock is not split into smaller subblocks. Since block types of all subblocks within the macroblock have been determined, the partition information decoding is terminated.

In this event, the partition type indicating information is entropy-decoded by a method prearrange between the video encoding apparatus and the video decoding apparatus among lossless compression encoding/decoding methods such as a binary arithmetic coding, a Huffman coding, etc.

Further, an actual partition type indicating information value can be decoded by using various binary coding methods such as a unary code, a truncated unary code, Exp-Golomb code, etc.

In addition, the video decoding apparatus performs an entropy decoding by using Tables 1 and 2 according to layer numbers of partition type indicating information when the video encoding apparatus uses a binary arithmetic coding, uses Table 1 in a case where a layer number is equal to or smaller than $$\log_2\left(\frac{N}{16}\right),$$

and uses Table 2 in a case where the layer number is larger than $$\log_2\left(\frac{N}{16}\right)$$

as the partition type indicating information encoding method.

For example, when partition type indicating information included in a layer 1 is entropy-decoded for a 64×64 macroblock, 2 bits are entropy-decoded and then partition type indicating information is obtained using Table 1.

When partition type indicating information included in a layer 3 is entropy-decoded for the 64×64 macroblock, Table 2 is used. First, 1 bit is entropy-decoded. Then, when a decoded binary bit is 1, partition type indicating information is set to 0 and a partition type indicating information entropy decoding of the current subblock is terminated. When the decoded binary bit is not 1, 1 bit is further entropy-decoded from the bitstream. When a secondly decoded bit is 0, partition type indicating information of the current subblock is set to 1 and an entropy decoding for partition type indicating information of the current subblock is terminated. When the secondly decoded bit is 1, 1 bit is further entropy-decoded from the bitstream and it is determined whether partition type indicating information of the current subblock is 2 or 3 by using Table 2.

Further, when it is prearranged between the video encoding apparatus and the video decoding apparatus that partition types according to another aspect of the present disclosure shown in FIG. 34 are used, it can be determined whether the current subblock is split into 4 subblocks by entropy-decoding 1 bit for the partition type indicating information decoding.

B-2-3) Decoding Flowchart

Figure 25:
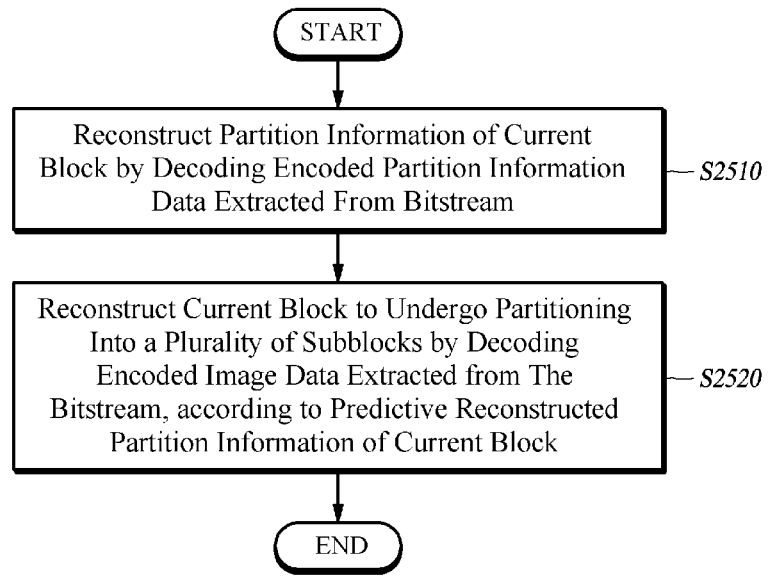
FIG. 25 is a flowchart for illustrating a video encoding method according to another aspect of the present disclosure.

FIG. 25 is a flowchart for illustrating a video decoding method according to another aspect of the present disclosure.

According to the video decoding method according to another aspect of the present disclosure, the video decoding apparatus 2400 reconstructs partition information of a current block by decoding partition information data from the bitstream by using the decoding methods according to the aforementioned aspects in step S2510, and reconstructs the current block split into a plurality of subblocks by performing a predictive encoding on encoded image data extracted from the bitstream according to partition information of the reconstructed current block in step S2520.

As described above, according to another aspect of the present disclosure, even when a macroblock having a block size equal to or larger than a size 16×16 is split into various sizes of subblocks, the compression efficiency can be improved by encoding macroblock partition information with the small number of bits by using a partition type for each layer or a partition layer value.

C) Maximum Partition Layer Information Encoding and Decoding

Hereinafter, as another aspect of the present disclosure, an apparatus and a method for determining a maximum partition layer indicating the number of layers by which a macroblock having an arbitrary size can be maximally split in order to efficiently partition information, splitting the macroblock into a plurality of subblocks for the prediction or the transform by using the determined maximum partition layer, and then efficiently encoding and decoding partition information by using the maximum partition layer are described. Here, an available minimum subblock size within the macroblock can be determined by the maximum partition layer, and an image is encoded by using only subblocks having a size equal to or larger than a corresponding size in encoding the macroblock.

The maximum partition layer may be information indicating a minimum subblock size which can be used for the prediction or the transform and encoded in the sequence header, the header of each picture, the slice header, or the macroblock header. Further, maximum partition layer information for the prediction and maximum partition layer information for the transform may be encoded, respectively.

In addition, partition information may be information indicating sizes and shapes of subblocks split for the prediction or the transform. The partition information and encoded image data are included in the bitstream and encoded, and then transmitted to the video decoding apparatus. Furthermore, partition information for the prediction and partition information for the transform may be encoded, respectively.

In the decoding, sizes and shapes of subblocks are reconstructed by extracting and decoding maximum partition layer data from the bitstream and then extracting and decoding partition information of the subblocks for the prediction or the transform by using the reconstructed maximum partition layer. Thereafter, an image is reconstructed through the prediction or the inverse transform by extracting and reconstructing encoded data of respective subblocks from the bitstream.

C-1) Video Encoding Apparatus

C-1-1) Encoding Apparatus

Figure 26:
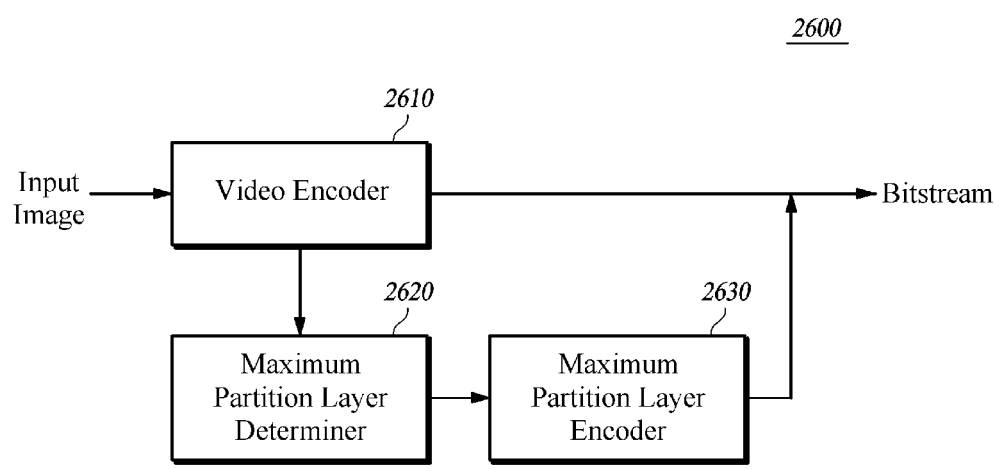
FIG. 26 is a schematic block diagram for illustrating a video encoding apparatus according to yet another aspect of the present disclosure.

FIG. 26 is a schematic block diagram for illustrating a video encoding apparatus according to yet another aspect of the present disclosure.

The video encoding apparatus 2600 according to yet another aspect of the present disclosure may include a video encoder 2610, a maximum partition layer determiner 2620, and a maximum partition layer encoder 2630. Each of the video encoder 2610, the maximum partition layer determiner 2620, and the maximum partition layer encoder 2630 comprises one or more processors and/or application-specific integrated circuits (ASICs) specified for respectively corresponding operations and functions described hereinafter.

The video encoder 2610 can be implemented as the video encoding apparatus 800 according to an aspect of the present disclosure described through FIG. 8. That is, the video encoder 2610 generates encoded partition information and image data by performing a predictive encoding by using subblocks according to predetermined partition types of a macroblock. In this event, the video encoder 2610 can determine partition types by using a minimum subblock size according to a maximum partition layer value determined by the maximum partition layer determiner 2620 in determining partition types of the macroblock. Further, the video encoder 2610 encodes partition information by using a maximum partition layer in encoding partition information.

The maximum partition layer determiner 2620 determines a partition type of a current block by using a minimum subblock size according to maximum partition layer value candidates, and determines a maximum partition layer value of the current block by using an encoding cost generated in an encoding. In this event, a partition type of the current block is determined by using the minimum subblock size according to the maximum partition layer value candidates, and the encoding cost generated in the encoding can be calculated by the maximum partition layer determiner 2620 itself. However, if the maximum partition layer determiner 2620 designates the maximum partition layer value candidates, the video encoder 2610 determines the partition type of the current block by using the minimum subblock size according to a corresponding partition layer value candidate, calculates encoding costs generated in the encoding to transmit the encoding costs to the maximum partition layer determiner 2620. Then, the maximum partition layer detemirner 2620 can determine the maximum partition layer value of the current block by using the transmitted encoding costs. Once the maximum partition layer value of the current block is determined, the video encoder 2610 includes an image already encoded into the corresponding maximum partition layer value in the bitstream. A method in which the maximum partition layer determiner 2620 determines the maximum partition layer value and accordingly determines the minimum subblock size will be discussed in the following description in detail.

The maximum partition layer encoder 2630 generates encoded maximum partition layer data by encoding the maximum partition layer value, and includes the generated data in the bitstream.

C-1-2) Relation Between Partition Layer and Minimum Subblock Size

The macroblock size, the minimum subblock size, and maximum partition layer (MaxLayer) corresponding to a layer value, which can be maximally used, can be set by using each other.

That is, the macroblock size can be obtained using the maximum partition layer (MaxLayer) and the minimum block size, and the minimum subblock size can be obtained using the macroblock size and the maximum partition layer.

When the minimum subblock size is N×N, the maximum block size (N×2MaxLayer)×(N×2MaxLayer). In a case of the macroblock of a N×N pixel, the minimum block size is (N/(2MaxLayer))×(N/(2MaxLayer)).

Figure 27:
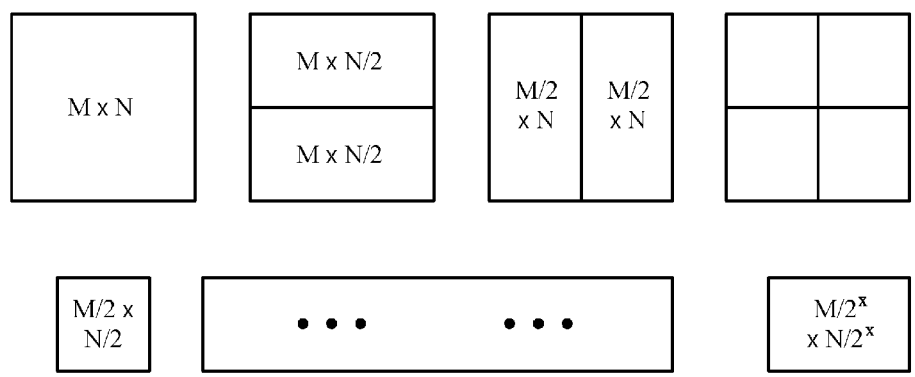
FIG. 27 is an exemplary diagram for illustrating the relation between a partition layer and a minimum subblock size according to yet another aspect of the present disclosure.

FIG. 27 is an exemplary diagram for illustrating the relation between the partition layer and the minimum subblock size according to yet another aspect of the present disclosure.

Referring to FIG. 27, when a macroblock size is M×N and a partition layer value is x, an available minimum subblock size is $$\frac{N}{2^x} \times \frac{N}{2^x}.$$

For example, when a partition layer value of a macroblock having a block size of 64×64, an available minimum subblock size is 4×4. Here, the partition layer value is differently applied for a width and a height, that is, M and N of the macroblock having the block size of M×N.

Accordingly, the maximum partition layer determiner 2620 can determine a minimum subblock size by determining a maximum partition layer value for the macroblock. For this purpose, the maximum partition layer determiner 2620 calculates encoding costs for candidate partition layer values and can determine a maximum layer value by using the encoding costs for the candidate partition layer values. Hereinafter, a method of determining a maximum partition layer value for the macroblock is described based on an assumption that a macroblock size is M×N (M is an integer equal to or larger than 16).

C-1-3) Maximum Partition Layer Determining Method

Figure 28:
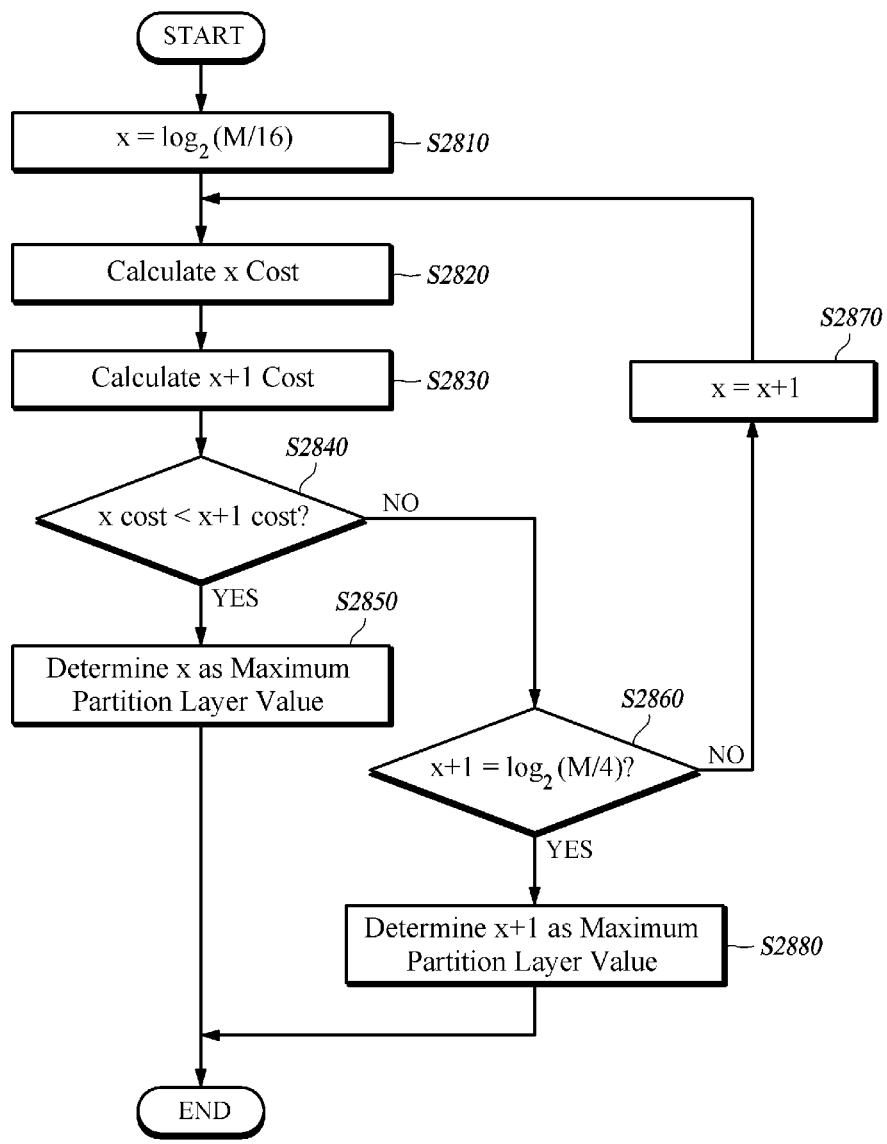
FIG. 28 is a flowchart for illustrating an example of a method of determining a maximum partition layer value according to yet another aspect of the present disclosure.

FIG. 28 is a flowchart for illustrating an example of a method of determining a maximum partition layer value according to yet another aspect of the present disclosure.

The maximum partition layer determiner 2620 sets an initial value of x, which is a maximum partition layer value candidate, to $\log_2(M/16)$ in step S2810, determines a partition type of the macroblock by using a minimum subblock size $(M/2^x) \times (M/2^x)$ when the maximum partition layer value candidate is x and calculates encoding costs (hereinafter, referred to as "xcost") when one frame (arbitrary frame) of an image is encoded according to the determined partition type in step S2820, determines a partition type of the macroblock by using a minimum subblock size $(M/2^{x+1}) \times (M/2^{x+1})$ when the maximum partition layer value candidate is x+1 and calculates encoding costs (hereinafter, referred to as "x+1 cost") when the arbitrary frame is encoded in step S2830, and compares xcost and x+1 cost to determine whether xcost is smaller than x+1 cost in step S2840.

As a result of the determination of step S2840, when xcost is smaller than x+1 cost, the maximum partition layer determiner 2620 determines x as the maximum partition layer value in step S2850. As a result of the determination of step S2840, when xcost is equal to or larger than x+1 cost, the maximum partition layer determiner 2620 determines whether x+1 is $\log_2(M/4)$ in step S2860. When x+1 is not $\log_2(M/4)$, the maximum partition layer determiner 2620 sets x to x+1 in step S2870 and proceeds to step S2820. When x+1 is $\log_2(M/4)$, the maximum partition layer determiner 2620 determines x+1 as the maximum partition layer value in step S2880.

Figure 29:
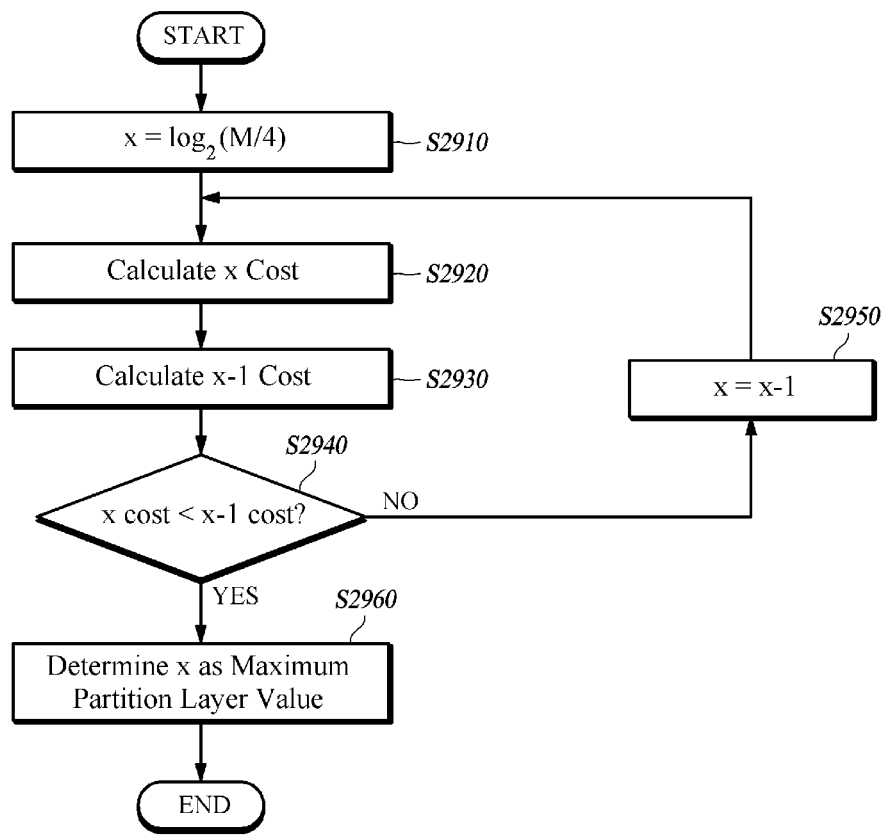
FIG. 29 is a flowchart for illustrating another example of a method of determining a maximum partition layer value according to yet another aspect of the present disclosure.

FIG. 29 is a flowchart for illustrating another example of the method of determining the maximum partition layer value according to another aspect of the present disclosure.

The maximum partition layer determiner 2620 sets an initial value of x, which is a maximum partition layer value candidate, to $\log_2(M/16)$ in step S2910, determines a partition type of the macroblock by using a minimum subblock size $(M/2^x) \times (M/2^x)$ when the maximum partition layer value candidate is x and calculates encoding costs (hereinafter, referred to as "xcost") when one frame (arbitrary frame) of an image is encoded according to the determined partition type in step S2920, determines a partition type of the macroblock by using a minimum subblock size $(M/2^{x+1}) \times (M/2^{x+1})$ when the maximum partition layer value candidate is x+1 and calculates encoding costs (hereinafter, referred to as "x+1 cost") when the arbitrary frame is encoded in step S2930, and compares xcost and x+1 cost to determine whether xcost is smaller than x+1 cost in step S2940.

As a result of the determination of step S2940, when xcost is equal to or larger than x-1 cost, the maximum partition layer determiner 2620 sets x to x-1 in step S2950 and proceeds to step S2920. When xcost is smaller than x-1 cost, the maximum partition layer determiner 2620 determines x as the maximum partition layer value in step S2960.

The maximum partition layer determiner 2620 can determine the maximum partition layer value by using not only the methods described through FIGS. 28 and 29 but also other methods. That is, as yet another example of determining the maximum partition layer value, the maximum partition layer determiner 2620 calculates an encoding cost for each maximum partition layer value candidate available for the macroblock and can determine a maximum partition layer value candidate having a smallest encoding cost as the maximum partition layer value by comparing calculated encoding costs with each other.

C-1-4) Partition Information Encoding Method

Hereinafter, a method of encoding partition information by using the maximum partition layer value according to yet another aspect of the present disclosure is described.

As described above, once the maximum partition layer value, which indicates the total number of layers, is determined, partition layers available in the macroblock are determined. However, layers, which are not used, may exist in the determined available partition layers. In this event, it may be unnecessary to encode partition type indicating information for the layers, which are not used.

Therefore, according to yet another aspect of the present disclosure, information on partition layers selected to be used among available partition layers determined by the maximum partition layer value can be included in the bitstream, and partition information of the current block can be encoded using only the selected partition layers when information on whether respective layers are available is transmitted to the bitstream. In the method of encoding block partition information, the aforementioned various partition information encoding methods can be used.

When a macroblock size is 64×64 and a maximum partition layer value is 2, layers 0 and 1 are available layers and layers 2 and 3 are not available layers. Accordingly, the macroblock can be split into subblocks of sizes 64×64, 64×32, 32×64, and 32×32, which correspond to a subblock type included in the layer 0, and subblocks of sizes 32×32, 32×16, 16×32, and 16×16, which correspond to a subblock type included in the layer 1. However, the macroblock cannot be split into subblocks of sizes 16×8, 8×16, 8×8, 8×4, 4×8, and 4×4, which correspond to subblock types included in the layers 2 and 3. That is, respective 16×16 subblocks cannot be split into smaller subblocks.

In this event, the number of bits required for a partition information encoding can be reduced by transmitting the maximum partition layer value to the bitstream and using the maximum partition layer value. The video decoding apparatus extracts and reconstructs the maximum partition layer value form the bitstream, sets all higher layers of the reconstructed maximum partition layer as available layers, and sets lower layers of the reconstructed maximum partition layer as unavailable layers. Then, the video decoding apparatus decodes partition information by using the set information.

Alternatively, when types of subblocks included in a specific layer are not used, a macroblock of, for example, size 64×64 is split into 4 subblocks of size 32×32. When respective 32×32 subblocks are all split into subblocks having a size equal to or smaller than a size 16×16, it can be derived that subblock types of subblocks included in the layer 1 are not used, and the layer 1 can be selected as the unavailable layer.

In this event, it is possible to reduce the number of bits required for the partition information encoding by encoding information on whether respective layers are available into the bitstream. The video decoding apparatus extracts and reconstructs the information on whether respective layers are available from the bitstream, and then decodes partition information by using the reconstructed information on whether the respective layers are available.

As described above, according to yet another aspect of the present disclosure, partition information can be encoded by encoding a the maximum partition layer value into the bitstream and using only available partition layers determined by the maximum partition layer value.

Alternativley, the partition information can be encoded by including and encoding information on whether respective layers are available among available partition layers determined by the maximum partition layer value into the bitstream and using only available partition layers.

The maximum partition layer value and/or flag information on whether respective partition layers are available can be included and encoded in the sequence header, the header of each picture, or the slice header.

In this event, the maximum partition layer value can be encoded by using a lossless compression coding such as a binary arithmetic coding, a Huffman coding, etc., and various binary coding methods such as a unary code, a truncated unary code, an Exp-Golomb code, etc.

In the method of encoding the information indicating whether respective layers are available, a flag having a 1 bit length indicating whether each layer is available can be encoded by using methods such as a binary arithmetic coding, a Huffman coding, etc.

Alternativley, an index of a table in which information indicating whether respective layers are available is arranged can be encoded. In this event, the index of the table can be encoded by using various binary coding methods such as a unary code, a truncated uary code, an Exp-Golomb code, etc.

Alternativley, a layer flag for a used layer is set to 1, a layer flag for a not-used layer is set to 0, and an integer value allowing a Least Significant Bit (LSB) to indicate whether a highest layer is available. Then, the generated integer value can be encoded by using various binary coding methods such as a unary code, a truncated unary code, an Exp-Golomb code, etc.

Further, the integer value can be generated by setting a layer flag for a used layer to 0, a layer flag for a not-used layer to 1, and allowing the Least Significant Bit (LSB) to indicate whether the highest layer is available.

Figure 30:
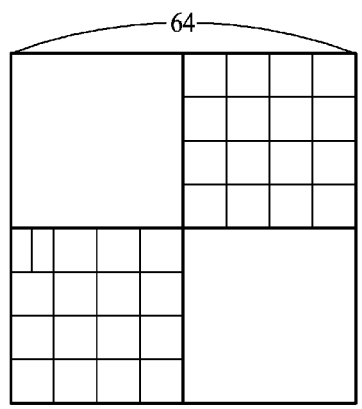
FIG. 30 is an exemplary diagram for illustrating a process of encoding partition information of a current block by using only selected partition layers according to yet another aspect of the present disclosure.

FIG. 30 is an exemplary diagram for illustrating a process of encoding partition information of the current block by using only selected partition layers according to yet another aspect of the present disclosure. FIG. 30 illustrates an example of encoding partition information of the block by encoding the maximum partition layer and/or information indicating whether respective layers are available, encoding the maximum partition layer value and data (Layer Flag) indicating whether respective layers are available by using the information through various methods of encoding partition information, and then encoding partition type indicating information by using the information.

In FIG. 30, when it is assumed that a macroblock size is 64×64, a maximum partition layer is 4, layers 0 and 3 are available, and layers 1 and 2 are not available, the macroblock can be split into subblocks of sizes 64×64, 64×32, 32×64, and 32×32, which correspond to a subblock type included in the layer 1. When the macroblock is split into subblocks of size 32×32, each 32×32 subblock can be split into subblocks of sizes 8×8, 8×4, 4×8, and 4×4, which correspond to a subblock type included in the layer 3. That is, when the 32×32 subblock is split according to partition type indicating information shown in FIG. 10, the 32×32 subblock is split into 16 subblocks of size 8×8.

After a maximum partition layer value 4 is first encoded by using the aforementioned method of encoding the maximum partition layer value, a layer flag for a used layer is set to 1, a layer flag for a not-used layer is set to 0, and a 1 bit flag indicating whether each layer is available is encoded. According to the aspect of FIG. 30, an available layer flag is encoded into "1001" from a higher layer to a lower layer.

Thereafter, macroblock partition information is encoded by using the aforementioned various partition information encoding methods. The aspect of FIG. 30 shows a method using the partition type indicating information encoding method, which is the first method among partition information encoding methods, based on subblock types shown in FIG. 10.

Here, when a N×N block of a layer number K is split into 4 subblocks, a method of allocating a layer number to the split subblocks is different depending on whether respective layers are available. If a layer K+1 is available, a layer number K+1 is allocated to the subblocks. If the layer K+1 is not available, the layer number K is allocated to the subblocks.

For example when a macroblock size is 64×64, a 32×32 subblock can be determined as a subblock type included in a layer 0 or determined as a subblock type included in a layer 1. In this event, when the layer 1 is an available layer, the 32×32 subblock is allocated a layer number 1. When the layer 1 is not available, the 32×32 subblock is allocated a layer number 0.

Since the macroblock is split into 4 subblocks, partition type indicating information 3 is first encoded and partition type indicating information of the 4 subblocks of size 32×32 is encoded.

Since a first 32×32 subblock (L0-P0) is not split, partition type indicating information 0 is encoded, and partition type indicating information of a second 32×32 subblock (L0-P1) is encoded.

Since the second 32×32 subblock (L0-P1) is split into 16 subblocks of size 8×8 (L2-P0 to L2-P14), partition type indicating information 3 is encoded. Here, the 8×8 subblock may be a 8×8 block included in a layer 2 and or may be a subblock included in layer 3, and a layer number 3 is allocated because the layer 2 is not available.

Thereafter, partition type indicating information of 16 subblocks of size 8×8 within the L0-P0 subblock is all encoded, and partition type indicating information of a third 32×32 subblock (L0-P2) is encoded.

Since the third 32×32 subblock (L0-P2) is split into 16 subblocks of size 8×8 (L2-P0 to L2-P15), partition type indicating information 3 is encoded, partition type indicating information of 16 subblocks of size 8×8 within the L0-P2 subblock is all encoded, and partition type indicating information 0 of a fourth 32×32 subblock (L0-P2) is encoded.

Accordingly, the video encoding apparatus 2600 according to yet another aspect of the present disclosure can encode partition information of a corresponding macroblock by encoding layer flags and partition type indicating information for partition numbers for respective layers.

C-1-5) Encoding Flowchart

Figure 31:
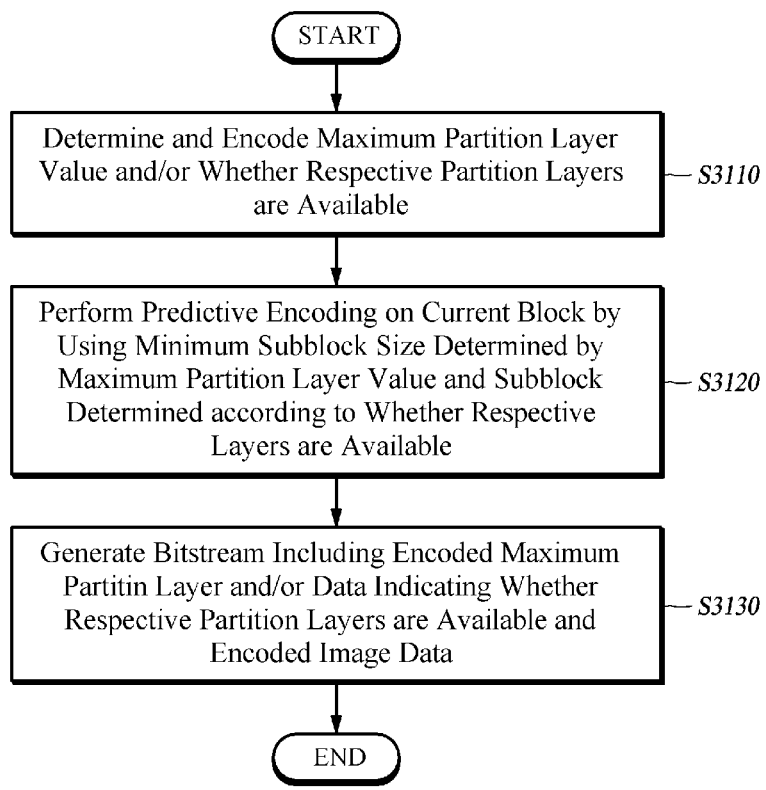
FIG. 31 is a flowchart for illustrating a video encoding method according to yet another aspect of the present disclosure.

FIG. 31 is a flowchart for illustrating a video encoding method according to yet another aspect of the present disclosure.

According to the video encoding method according to yet another aspect of the present disclosure, the video encoding apparatus 2600 generates a maximum partition layer and/or data indicating whether respective partition layers are available by determining and encoding a maximum partition layer value and/or information indicating whether the respective partition layers are available in step S3110, performing a predictive encoding on a current block by using a minimum subblock size determined according to a maximum partition layer value and subblocks determined according to whether respective layers are available in step S3120, and generates an encoded maximum partition layer and/or a bitstream including data indicating whether respective layers are available and encoded image data in step S3130. The bitstream generated as described above is transmitted to the video decoding apparatus and decoded.

The video encoding apparatus 2600 can determine a maximum partition layer value by using encoding costs for maximum partition layer value candidates in step S3110. The video encoding apparatus 2600 can determine the maximum partition layer value by increasing or decreasing values of the maximum partition layer value candidates. Further, the video encoding apparatus 2600 can determine a maximum partition layer value candidate having the smallest encoding cost as the maximum partition layer value by comparing encoding costs of respective maximum partition layer value candidates.

C-2) Decoder

C-2-1) Block Diagram and Description of Video Decoding Apparatus

Figure 32:
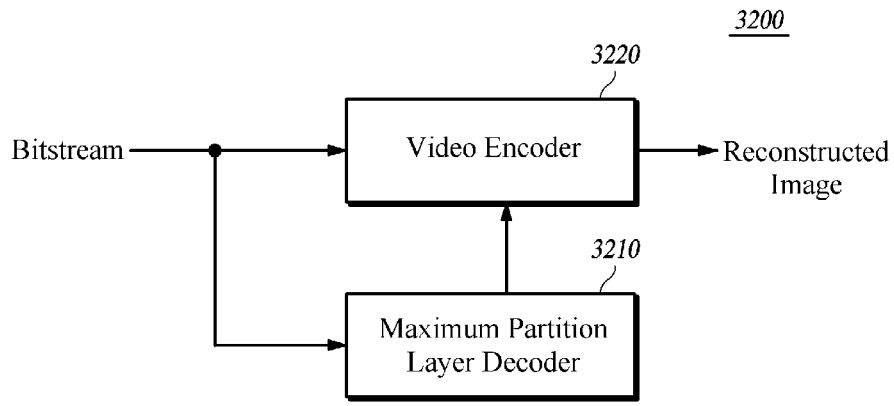
FIG. 32 is a schematic block diagram for illustrating a video decoding apparatus according to yet another aspect of the present disclosure.

FIG. 32 is a schematic block diagram for illustrating a video decoding apparatus according to yet another aspect of the present disclosure.

The video decoding apparatus 3200 according to yet another aspect of the present disclosure may include a maximum partition layer decoder 3210 and a video decoder 3220. Each of the maximum partition layer decoder 3210 and the video decoder 3220 comprises one or more processors and/or application-specific integrated circuits (ASICs) specified for respectively corresponding operations and functions described hereinafter.

The maximum partition layer decoder 3210 decodes encoded maximum partition layer data extracted from the bitstream to reconstruct a maximum partition layer value.

The video decoder 2420 may be equally or similarly constructed to the video decoding apparatus according to an aspect of the present disclosure described with reference to FIG. 7. However, the video decoder 3220 according to yet another aspect of the present disclosure performs a predictive decoding on encoded image data extracted from the bistream by using a minimum subblock size based on the maximum partition layer value reconstructed by the maximum partition layer decoder 3210, to reconstruct a current block.

C-2-2) Partition Information Decoding Method

Hereinafter, a method of decoding partition information by using a maximum partition layer value according to yet another aspect of the present disclosure is described.

The video decoding apparatus extracts a maximum partition layer representing the total number of layers and/or data indicating whether each layer is available from a prearranged position between the video decoding apparatus and the video encoding apparatus among a sequence header, a header of each picture, or a slice header of the bitstream, and then decodes partition information of each block by using the extracted information through the aforementioned various partition information decoding methods.

In a method of decoding the maximum partition layer and/or information on available layers, maximum partition layer data is first extracted and decoded from the bitstream, and data indicating whether each layer is available, available subblock types, and a minimum subblock size according to the data indicating whether each layer is available are extracted by using the decoded maximum partition layer value. For example, when a macroblock size is 64×64 and a maximum partition layer value extracted and reconstructed from the bitstream is 3, layers 0, 1, and 2 are set as available layers and a layer 3 is set as an unavailable layer. The macroblock can be split into subblocks of sizes 64×64, 64×32, 32×64, and 32×32, which correspond to a subblock type included in the layer 0, subblocks of sizes 32×32, 32×16, 16×32, and 16×16, which correspond to a subblock type included in the layer 1, and subblocks of sizes 16×16, 16×8, 8×16, and 8×8, which correspond to a subblock type included in the layer 2. However, the macroblock cannot be split into subblocks of sizes 8×4, 4×8, and 4×4, which corresponds to a subblock type included in the layer 3. That is, respective 8×8 blocks cannot be split into smaller subblocks. In this event, an available minimum subblock size is determined as a size 8×8.

Alternatively, after the maximum partition layer data is extracted and reconstructed from the bistream, the data indicating whether each layer is available, which corresponds to the number of layers determined by the reconstructed maximum partition layer value, is extracted and decoded from the bitstream. Then, available subblock types and a minimum subblock size are extracted according to the reconstructed maximum partition layer value and the availability of each layer.

For example, when a macroblock size is 64×64 and a maximum partition layer value extracted and reconstructed from the bitstream is 3, data indicating whether 3 layers are available is extracted and decoded from the bitstream. When the reconstructed data indicating whether each layer is available means that the layers 0 and 2 are available and the layer 1 is not available, the macroblock can be split into subblocks of sizes 64×64, 64×32, 32×64, and 32×32, which correspond to a subblock type included in the layer 0, and subblocks of sizes 16×16, 16×8, 8×16, and 8×8, which correspond to a subblock type included in the layer 2. However, the macroblock cannot be split into subblocks of sizes 32×32, 32×16, 16×32, and 16×16, which correspond to a subblock type included in the layer 1, and subblocks of sizes 8×4, 4×8, and 4×4, which corresponds to a subblock type included in the layer 3.

Alternatively, the video decoding apparatus determines a maximum partition layer value by using a minimum subblock size and a prearranged macroblock size between the video decoding apparatus and the video encoding apparatus and extracts and decodes data indicating whether respective layers are available, which corresponds to the number of layers determined by the maximum partition layer value, from the bitstream, to determine available subblock types according to the reconstructed data indicating whether the respective layers are available. For example, when the prearranged macroblock size between the video encoding apparatus and the video decoding apparatus is 32×32 and the minimum subblock size is 8×8, the number of maximum partition layers is 2. Accordingly, data indicating whether the 2 layers are available is extracted and decoded from the bitstream. When the reconstructed data indicating whether the respective layers are available means that the layer 0 is not available and the layer 1 is available, the macroblock can have only block types of 16×16, 16×8, 8×16, and 8×8, which correspond to subblock types included in the layer 1. Therefore, in decoding partition information of the macroblock, the macroblock is split into 4 subblocks of size 16×16 and only each 16×16 partition information is extracted and decoded from the bitstream.

In this event, the maximum partition layer value can be decoded by using a prearranged method between the video encoding apparatus and the video decoding apparatus among methods such as a binary arithmetic coding, a Huffman coding, etc.

Alternatively, the maximum partition layer value can be decoded by using methods such as a unary code, a truncated unary code, an Exp-Golomb code, etc.

In a method of decoding information indicating whether each layer is available, data indicating whether each layer is available can be decoded by using a prearranged method between the video encoding apparatus and the video decoding apparatus among methods such as a binary arithmetic coding, a Huffman coding, etc.

Alternatively, an index of a table showing whether respective layers are used is decoded by using methods such as a unary code, truncated unary code, an Exp-Golomb code, etc., and a fact indicating whether the respective layers are used can be extracted by using a prearranged table between the video encoding apparatus and the video decoding apparatus.

Alternatively, an integer value is decoded by using methods such as a unary code, truncated unary code, an Exp-Golomb code, etc., and the decoded integer value can be decoded by representing the integer value into a binary bit having a maximum partition layer value as the number of bits.

Hereinafter, a decoding method according to an aspect of FIG. 30 is described.

According to the aforementioned aspect of FIG. 30, in data encoded with partition information in the video encoding apparatus, maximum partition information is 4, a layer flag indicating whether respective layers are used is "1001", and partition type indicating information is {3, 0, 3, 0, 0, 0, 0, 0, 0, 0, 0, 0, 0, 0, 0, 0, 0, 0, 0, 3, 2, 0, 0, 0, 0, 0, 0, 0, 0, 0, 0, 0, 0, 0, 0, 0}.

The video decoding apparatus extracts and decodes maximum partition layer data from the bitstream, and reconstructs a maximum partition layer value 4. Since the maximum partition layer is 4, a flag (layer flag) indicating whether 4 layers are available is reconstructed. Layer_Flag of the layer 0 is decoded by extracting and decoding 1 bit from the bitstream. After a flag indicating whether the layer 0 is available is reconstructed, Layer_Flag of the layers 1, 2, and 3 is extracted and decoded from the bitstream in the same way. Since the reconstructed Layer_Flag of the layer 0 is 1, the reconstructed Layer_Flag of the layer 1 is 0, the reconstructed Layer_Flag of the layer 2 is 0, and the reconstructed Layer_Flag of the layer 3 is 1, the layers 0 and 3 are set as available layers and the layers 1 and 2 are set as unavailable layers. Then, the information is used for decoding partition information of the macroblock.

Since firstly reconstructed partition type indicating information is 3, the macroblock is split into 4 subblocks of size 32×32, and partition type indicating information of each 32×32 subblock is extracted and decoded from the bitstream.

Here, when a N×N block of a layer number K is split into 4 subblocks, a method of allocating a layer number to the split subblocks is different depending on whether respective layers are available. If a layer K+1 is available, a layer number K+1 is allocated to the subblocks. If the layer K+1 is not available, the layer number K is allocated to the subblocks.

According to the aspect of FIG. 30, 32×32 subblocks split from the macroblock correspond to a subblock type which can be included both the layer 0 and the layer 1, but a layer number of the 32×32 subblock is 0 because the layer 1 is not available.

Since secondly reconstructed partition type indicating information is 0, a subblock type of a first 32×32 subblock (L0-P0) within the macroblock is 32×32. Since partition type indicating information of the first 32×32 subblock is not 3, partition type indicating information of a second 32×32 subblock (L0-P1) is decoded.

Since thirdly reconstructed partition type indicating information is 3 and the layers 1 and 2 are not available, the L0-P1 subblock is split into 16 subblocks (L3-P0 to L3-P15) of size 8×8, and partition type indicating information of each 8×8 subblock is extracted and decoded from the bitstream because the 8×8 subblock can be split into smaller subblocks.

Since fourthly to nineteenthly reconstructed partition type indicating information are all 0, it can be derived that all subblock types of subblocks L3-P0 to L3-P15 split from the subblock L0-P1 are 8×8.

Since twentiethly reconstructed partition type indicating information is 3 and the layers 1 and 2 are not available, the L0-P2 subblock is split into 16 subblocks (L3-P0 to L3-P15) of size 8×8, and partition type indicating information of each 8×8 subblock is extracted and decoded from the bitstream because the 8×8 subblock can be split into smaller subblocks.

Since subsequently reconstructed partition type indicating information is 2, the L3-P0 subblock included in the L0-P2 subblock is split into 2 subblocks of size 4×8, and subblock types of subblocks L3-P1 to L3-P15 are all set to 8×8 because 15 partition type indicating information pieces reconstructed since then are all 0.

Since lastly reconstructed partition type indicating information is 0, a subblock type of the L0-P3 subblock is 32×32, and the partition information decoding process is terminated because partition types of all subblocks within the macroblock have been determined.

C-2-1) Decoding Flowchart

Figure 33:
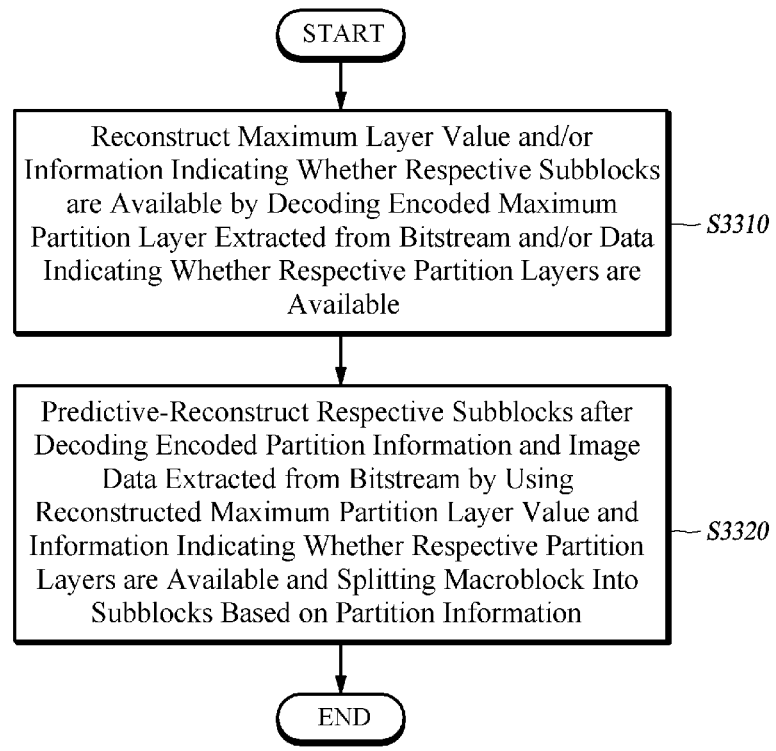
FIG. 33 is a flowchart for illustrating a video decoding method according to yet another aspect of the present disclosure.

FIG. 33 is a flowchart for illustrating a video decoding method according to yet another aspect of the present disclosure.

Based on the video decoding method according to yet another aspect of the present disclosure, the video decoding apparatus 3200 decodes encoded maximum partition layer data extracted from the bitstream to reconstruct a maximum partition layer value in step S3310, and performs a predictive decoding on encoded image data extracted from the bitstream by using a minimum subblock size according to the reconstructed maximum partition layer value to reconstruct a current block in step S3320.

According to yet another aspect of the present disclosure as described above, even when the macroblock having a size equal to or larger than a size 16×16 is split into various sizes of subblocks, a minimum subblock size can be set by using a maximum partition layer value. Accordingly, it is not required to decode partition information for layers, which are not used. As a result, partition information of the macroblock can be encoded with the smaller number of bits and thus the compression efficiency can be improved.

Further, the video encoding apparatus according to yet another aspect of the present disclosure determines available partition layers of a current block, selects a partition layer, which generates a smallest encoding cost of the current block, among the available partition layers, generates image data encoded by performing a predictive encoding on the current block by using only the selected partition layer, and can generate a bitstream including encoded partition layer data created by encoding information on the selected partition layer, encoded partition information data created by encoding partition information of the current block based on the selected partition layer, and encoded image data. Here, one or more partition layers can be selected as the partition layer generating the smallest encoding cost of the current block. Accordingly, the video encoding apparatus can generate encoded image data by determining available partition layers for the current block, selecting one or more partition layers, which generate the smallest encoding cost of the current block, among the available partition layers, and splitting and predictive-encoding the current block by using only the one or more selected partition layers. Therefore, the video encoding apparatus can encode macroblock partition information with a smaller number of bits and thus improve the compression efficiency.

In addition, the video decoding apparatus according to yet another aspect of the present disclosure can reconstruct information on partition layers and partition information by decoding encoded partition information data and encoded partition layer data extracted from the bitstream, and reconstruct the current block by performing a predictive decoding on the encoded image data extracted from the bitstream by using the reconstructed information on the partition layers and the reconstructed partition information.

D) Macroblock Size Encoding and Decoding

According to the aforementioned aspects, it has been assumed that the macroblock has a prearranged size between the video encoding apparatus and the video decoding apparatus. Further, based on this assumption, then macroblock splitting method, and the partition information encoding and decoding have been described.

Hereinafter, a method of determining a size of a macroblock having a variable size, and an encoding and a decoding for signaling the determined macroblock size to the decoding apparatus will be described.

In general, a high resolution image may be efficiently encoded by unit of large blocks. However, the encoding efficiency is not always improved whenever all areas of the image are encoded using the largest blocks. For example, in a case of a monotonous image, it may be efficient to encode the image by unit of macroblocks such as a large macroblock of size 128×128. However, when a complex image is encoded by unit of macroblocks of size 128×128, most macroblocks are split into smaller subblocks and most subblocks may be predicted or transformed by unit of blocks having a size equal to or smaller than a size 16×16. In this event, since partition information indicating that each macroblock has been split into subblocks having a size equal to or smaller than the size 16×16 should be encoded, it is efficient to encode the image through the selection of a macroblock size, which corresponds to the size 16×16.

According to another aspect of the present disclosure, a maximum block size, which can be used for the prediction or the transform to further improve the efficiency of the aforementioned partition information encoding method, is determined, the image is encoded by unit of selected block sizes, and the image is reconstructed by decoding the image in a maximum block size identified by information included in the bitstream.

Hereinafter, although it is not described that a maximum block size (e.g. macroblock), which can be used for the prediction, and a maximum block size, which can be used for the transform, are separately set for the convenience of the description, it is applicable to separately set the maximum block size for the prediction and the maximum block size for the transform.

Further, each of the information can be encoded in the sequence header, the picture header, the slice header, or the macroblock header.

After the macroblock size is determined according to aspects of the present disclosure, which will be discussed in the following description, the macroblock can be split into subblocks based on the macroblock splitting method according to aforementioned aspects of the present disclosure.

Further, the prediction or the transform can be performed in the unit of subblocks. In this event, the video encoding apparatus according to aspects of the present disclosure encodes information on the macroblock size and/or partition information on the macroblock split and then can transmit the encoded information to the video decoding apparatus according to aspects of the present disclosure. The video decoding apparatus according to aspects of the present disclosure can grasp the macroblock size to be currently decoded and/or information on subblocks within the macroblock by decoding information on the macroblock size and/or macroblock partition information. As described above, the partition information can be variously implemented. The partition information of the macroblock according to aspects of the present disclosure, which contains information on whether the macroblock is split into subblocks and/or information on subblock types split from the macroblock, is signaled to the video decoding apparatus according to aspects of the present disclosure.

D-1) Video Encoding Apparatus

D-1-1) Description of Encoding Apparatus

Figure 35:
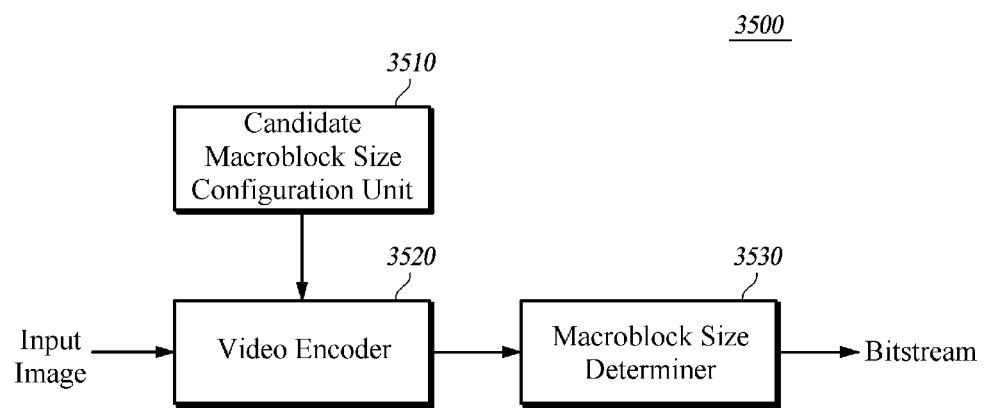
FIG. 35 is a schematic block diagram for illustrating a video encoding apparatus according to yet another aspect of the present disclosure.

FIG. 35 is a schematic block diagram for illustrating a video encoding apparatus 3500 according to yet another aspect of the present disclosure.

According to an implementation of the video encoding apparatus according to another aspect of the present disclosure, the video encoding apparatus may include a candidate macroblock size configuration unit 3510, a video encoder 3520, and a macroblock size determiner 3530. Each of the candidate macroblock size configuration unit 3510, the video encoder 3520, and the macroblock size determiner 3530 comprises one or more processors and/or application-specific integrated circuits (ASICs) specified for respectively corresponding operations and functions described hereinafter.

The candidate macroblock size configuration unit 3510 configures macroblock size candidates, which can be used by the video encoding apparatus 3500 according to yet another embodiment of the present disclosure. The macroblock size candidates are input by a user or determined according to image characteristics. Alternatively, the macroblock size candidates may be set candidates groups (e.g. size 64×64, size 32×32, and size 16×16) input by another apparatus.

In a case where the macroblock size candidates are determined according to image characteristics, if the image resolution is 4K×2K and a ratio of a width and a height is 16:9, the macroblock size candidates may include size 128×128, size 128×64, size 64×128, size 64×64, size 64×32, size 32×64, size 32×32, size 32×16, size 16×32, and size 16×16.

The video encoder 3520 may be implemented as the video encoding apparatus according to an aspect of the present disclosure described with reference to FIG. 6, 8, or 26. That is, the video encoder 3520 encodes an image by each macroblock size candidate configured by the candidate macroblock size configuration unit 3510 and generates image data for each macroblock size. In this event, each macroblock is internally split into subblocks (here, the subblock having a minimum subblock size may be a block by unit of 4×4 pixels), which are smaller blocks than the macroblock, and an intra encoding or an inter encoding is performed on the split subblocks. Partition information indicating sizes and shapes of subblocks within the macroblock may be included in the bitstream by using the partition information encoding method according to the aforementioned aspects of the present disclosure.

As another operation method of the video encoder 3520, an encoding is performed using macroblocks of size 16×16 and size 32×32. As a result of the encoding, when an encoding cost in a case of using the macroblocks of size 32×32 is higher than an encoding cost in a case of using the macroblocks of size 16×16, the size 16×16 is determined as the macroblock size. When the encoding cost in the case of using the macroblocks of size 32×32 is lower than the encoding cost in the case of using the macroblocks of size 16×16, an encoding is performed again using macroblocks of size 64×64 and then encoding costs of using the macroblock of size 32×32 and size 64×64 are compared in the same way. Accordingly, the macroblock size may be determined.

Further, as another operation method of the video encoder 3520, an encoding is performed using macroblocks of size 16×16, size 32×16, size 16×32, and size 32×32. As a result of the encoding, a macroblock size having the best encoding efficiency is selected. And then, the encoding is performed using pixel blocks generated by enlarging a width, a height, and both the width and the height of the selected macroblock two times, respectively, as the macroblocks. If the encoding efficiency is not improved using an enlarged macroblock size, the encoding is stopped and the macroblock size is determined.

The macroblock size determiner 3530 calculates encoding costs (i.e. encoding costs of image data for each macroblock size) generated when the video encoder 3520 encodes the image by each macroblock size and compares encoding costs of respective macroblock sizes to determine an optimal macroblock size among macroblock size candidates. Here, the optimal macroblock size may be any macroblock size if the macroblock size generates the lowest encoding cost when the image is encoded using the corresponding macroblock size. However, in a case of using encoding cost, various optimal macroblock sizes may be determined using the encoding cost.

Further, when the macroblock size is determined, the macroblock size determiner 3530 generates image data encoded in the corresponding macroblock size as the bitstream. In this event, information on the determined macroblock size may be encoded and included in the bitstream. The information on the macroblock size may be included in the bitstream for an entire image only once or may be included in the bitstream in every picture of the entire image. Further, according to another aspect of the present disclosure, the macroblock size, which corresponds to the encoding/decoding units, may be differently selected for each picture, slice or macroblock layer.

D-1-2) Macroblock Size Encoding Method

Hereinafter, various methods of encoding the macroblock size according to aspects of the present disclosure are described.

As described above, since the macroblock size can be calculated by using the minimum subblock size and the maximum partition layer (MaxLayer), the macroblock size can be obtained by encoding a determined macroblock size value or encoding the minimum subblock size and the maximum partition layer.

That is, in a method of encoding block size information indicating the macroblock size or the minimum subblock size and encoding the subblock size, maximum partition layer (MaxLayer) information is together encoded and transmitted to the video decoding apparatus.

The maximum partition layer information can be encoded into a binary bit string by using a lossless compression coding such as a binary arithmetic coding, a Huffman coding, etc. Alternatively, the maximum partition layer information can be encoded by using various binary coding methods such as a unary code, a truncated unary code, an Exp-Golomb code, etc.

D-1-2-1) Macroblock Size Encoding Method 1

A first method of encoding the macroblock size is first described.

A flag (Set_MBsize_flag) indicating whether to transmit information on the macroblock size may be included in a sequence header, a header of each picture, or a slice header. The macroblock size may be either transmitted or not according to a value of the flag. In a case of not transmitting the macroblock size, macroblocks having a predetermined size, for example, blocks of size 16×16 are used as macroblocks.

If macroblock size is designated, information on the macroblock size is transmitted. In this event, macroblocks having an arbitrary size, of which horizontal sizes and vertical sizes are separately set, may be used. Alternatively, in a case of using square macroblocks, only information on one side of the square macroblock is encoded and then may be transmitted to the decoding apparatus.

A macroblock size value to be encoded may be designated as an actual macroblock size or a value indicating the number of times, by which a macroblock is to be enlarged or reduced with respect to a predetermined size, may be transmitted. Further, the macroblock size value may be represented using smaller bits through applying a log function to the macroblock size value instead of directly encoding the macroblock size value. For example, a value of $\log_2$ (selected MBsize/X) (X is any positive integer, which is a multiple of 2) is encoded. In this event, a value of X may be selected as an available minimum macroblock size. For example, if the available minimum macroblock size is 8×8, it is preferable to select "8" as the value of X. In this event, "0" is encoded when a current macroblock is a block of size 8×8, and "1" is encoded when the current macroblock is a block of size 16×16. If the available minimum macroblock size is 16×16, it is preferable to select "16" instead of "8" as the value of X. In this event, "0" is encoded when the current macroblock is a block of size 16×16, and "1" is encoded when the current macroblock is a block of size 32×32. Accordingly, a current macroblock size can be represented using bits smaller than bits used for encoding a large number such as 8, 16, or 32.

Further, magnifications of the horizontal size and the vertical size may be encoded, respectively.

Alternatively, the macroblock size value may be an index value of a prearranged table between the video encoding apparatus and the video decoding apparatus.

In this event, the macroblock size to be transmitted can be encoded using various binary coding methods such as a unary code, a truncated unary code, an Exp-Golomb code, etc.

Hereinafter, it is not described to separately set a horizontal size and a vertical size for the convenience of the description, but it is applicable to separately set the horizontal size and the vertical size. Further, although it is exemplified to encode data on a sequence header and a picture header, the data may be encoded on a slice header or a macroblock header.

An example of a syntax according to the first method of encoding the macroblock size is as follows.

```
Set_MBsize_Flag
if(Set_MBsize_Flag == 1)
{
MBsize
}
Or
Set_MBsize_Flag
if(Set_MBsize_Flag == 1)
{
MBsize_width
MBsize_height
}
```

Further, block size information such as MB_size, which indicates the macroblock size, can be encoded through the minimum subblock size and the maximum partition layer.

Here, a minimum subblock size value to be encoded may be designated as an actual minimum subblock size or a value indicating the number of times, by which a subblock is to be enlarged or reduced with respect to a predetermined size, may be transmitted. Further, the minimum subblock size value may be represented using smaller bits through applying a log function to the minimum subblock size value instead of directly encoding the minimum subblock size value. For example, a value of $\log_2$ (minblockSize/X) (X is any positive integer, which is a multiple of 2) is encoded. In this event, a value of X may be selected as an available minimum subblock size. For example, if the available minimum subblock size is 4×4, it is preferable to select "4" as the value of X. In this event, "0" is encoded when a minimum subblock to be encoded according to a current macroblock size is a block of size 4×4, and "1" is encoded when the minimum subblock is a block of size 8×8. If the available minimum macroblock size is 8×8, it is preferable to select "8" instead of "4" as the value of X. In this event, "0" is encoded when the available minimum subblock size according to the current macroblock size is 8×8, and "1" is encoded when the minimum subblock size is 16×16.

Further, magnifications of the horizontal size and the vertical size may be encoded, respectively.

Alternatively, the minimum subblock size value may be an index value of a table defining a prearranged block size between the video encoding apparatus and the video decoding apparatus.

In this event, the minimum subblock size can be encoded using various binary coding methods such as a unary code, a truncated unary code, an Exp-Golomb code, etc.

The maximum partition layer information can be encoded into a binary bit string by using a lossless compression coding such as a binary arithmetic coding, a Huffman coding, etc. Alternatively, the maximum partition layer information can be encoded by using various binary coding methods such as a unary code, a truncated unary code, an Exp-Golomb code, etc.

When the macroblock size is encoded by using the minimum subblock size and the maximum partition layer, an example of the aforementioned first syntax can be represented as follows.

```
Set_MBsize_Flag
if(Set_MBsize_Flag == 1)
{
minBlockSize
MaxLayer
}
Or
Set_MBsize_Flag
```

-continued

```
if(Set_MBsize_Flag == 1)
{
minBlockSize_width
minBlockSize _height
MaxLayer
}
```

Alternatively, the macroblock size may be transmitted to the video decoding apparatus in every sequence, picture, slice, or macroblock header without encoding the flag (Set_MBsize_flag) indicating whether to transmit information on the macroblock size.

D-1-2-2) Macroblock Size Encoding Method 2

Hereinafter, a second method of encoding the macroblock size is described.

According to the second method, a size M×N is set as a reference macroblock size, and a flag indicating whether to use the reference macroblock size is encoded in every picture, slice, or macroblock header. When the reference macroblock size is not used, a selected macroblock size is encoded. Alternatively, after a flag indicating whether to set the reference macroblock size is encoded in the sequence header, a predetermined size, for example, a size 16×16 is used as the reference macroblock size if the reference macroblock size is not set, and the reference macroblock size may be encoded and included in the sequence header if the reference macroblock size is set.

Here, in a method of encoding a value of default_MBsize, which is information indicating the reference macroblock size, or a value of MB_size, which is information indicating a current macroblock size, an actual macroblock size may be designated or a value indicating the number of times, by which a macroblock is to be enlarged or reduced with respect to a predetermined size, may be transmitted. Alternatively, as described in the aforementioned first method, the macroblock size value may be represented using smaller bits through applying a log function to the macroblock size value instead of directly encoding the macroblock size value.

Further, magnifications of the horizontal size and the vertical size may be encoded, respectively.

Alternatively, the macroblock size value may be an index value of a prearranged table between the video encoding apparatus and the video decoding apparatus.

In this event, the macroblock size to be transmitted may be encoded using various binary coding methods such as a unary code, a truncated unary code, an Exp-Golomb code, etc.

An example of a syntax according to the aforementioned second method of encoding the macroblock size is represented as follows.

```
Sequence, picture, or slice header
Set_defaultMBsize_Flag
if(Set_MBsize_Flag == 1)
{
defalt_MBsize
}
Picture, slice, or macroblock header
use_defalt_MBsize_flag
if(use_defalt_MBsize_flag == 0)
{
MB_size
}
```

In addition, block size information such as default_MBsize for indicating a default or reference macroblock size and MB_size for indicating a macroblock size may be encoded through the minimum subblock size and maximum partition layer.

In a method of encoding reference minimum subblock size default_minBlockSize for indicating the reference macroblock size or minimum subblock size minBlockSize for indicating information on the current macroblock size, a minimum subblock size to be actually encoded may be designated and a value indicating the number of times, by which a subblock is to be enlarged or reduced from a predetermined size, may be transmitted. Alternatively, as described in the aforementioned first method, the minimum subblock size value may be represented using smaller bits through applying a log function to the minimum subblock size value instead of directly encoding the minimum subblock size value.

Further, magnifications of the horizontal size and the vertical size may be encoded, respectively.

Alternatively, the minimum subblock size value may be an index value of a prearranged table between the video encoding apparatus and the video decoding apparatus.

In this event, the minimum subblock size to be transmitted may be encoded using various binary coding methods such as a unary code, a truncated unary code, Exp-Golomb code, etc.

The maximum partition layer information can be encoded into a binary bit string by using a lossless compression coding such as a binary arithmetic coding, a Huffman coding, etc. Alternatively, the maximum partition layer information can be encoded by using various binary coding methods such as a unary code, a truncated unary code, an Exp-Golomb code, etc.

When the macroblock size is encoded by using the minimum subblock size and the maximum partition layer, an example of the aforementioned second syntax can be represented as follows.

```
Sequence, picture, or slice header
Set_defaultMBsize_Flag
if(Set_MBsize_Flag == 1)
{
default_minBlockSize
default_MaxLayer
}
Picture, slice, or macroblock header 해더
use_default_MBsize_flag
if(use_default_MBsize_flag == 0)
{
minBlockSize
MaxLayer
}
```

D-1-2-3) Macroblock Size Encoding Method 3

Hereinafter, a third method of encoding the macroblock size is described.

According to the third method, a size M×N is set as the reference macroblock size, and a flag indicating whether to use the reference macroblock size is encoded in every header of each picture, slice header, or minimum subblock header and transmitted to the video decoding apparatus. When the flag indicates that the reference macroblock size is used, a block having the same size as the reference macroblock size is selected as a current macroblock. However, when the flag indicates that the reference macroblock size is not used, a block having a size enlarged or reduced by a predetermined ratio with respect to the reference macroblock size is selected as the current macroblock in an encoding or a decoding process. For example, a block having a horizontal size and a vertical size twice as large or twice as small as the horizontal size and the vertical size of the reference macroblock may be selected as the current macroblock.

When there are various enlarging or reducing ratios, various ratios may be represented by making a length of the flag larger than 2 bits. Alternatively, information indicating the enlarging ratio or the reducing ratio may be additionally encoded in addition to the flag indicating whether to use the reference macroblock size.

When the flag indicates that the reference macroblock size is not used and a block having a size enlarged from the reference macroblock size is selected as the current macroblock, the reference macroblock size corresponds to a minimum macroblock size available for the current bitstream encoding or decoding. On the contrary, when the flag indicates that the reference macroblock size is not used and a block having a size reduced with respect to the reference macroblock size is selected as the current macroblock, the reference macroblock size corresponds to a minimum macroblock size available for the current bitstream encoding or decoding.

The video decoding apparatus can select the current macroblock size by using the flag indicating whether to use the reference macroblock size and/or additional information indicating an enlargement or a reduction by a predetermined ratio with respect to the reference macroblock size.

According to an aspect of the present disclosure, the flag indicating whether to set the reference macroblock size may be included in the sequence header. If the reference macroblock size is not set, it may be prearranged to use a predetermined size, for example, a size 16×16 as the reference macroblock size.

When the reference macroblock size is set and signaled to the video decoding apparatus, information on the reference macroblock size is encoded and may be included in the sequence header. According to an aspect of the present disclosure, the video encoding apparatus can signal information indicating the maximum macroblock size available for the current bitstream encoding or decoding to the video decoding apparatus as the information on the reference macroblock size. According to another aspect of the present disclosure, the video encoding apparatus can signal information indicating the minimum macroblock available for the current bitstream encoding or decoding to the video decoding apparatus as the information on the reference macroblock size. According to yet another aspect of the present disclosure, the video encoding apparatus can signal information on both the maximum macroblock and the minimum macroblock size available for the current bitstream encoding or decoding to the video decoding apparatus as the information on the reference macroblock size.

In a method of encoding default_MBSize, which is the information on the reference macroblock size, the actual macroblock size may be designated and a value indicating the number of times, by which a macroblock is to be enlarged or reduced from a predetermined size, may be transmitted. Alternatively, as described in the aforementioned first method, the macroblock size value may be represented using smaller bits through applying a log function to the macroblock size value instead of encoding directly the macroblock size value.

More specifically, for example, when default_MBSize indicates the maximum macroblock size available for the current bitstream encoding or decoding, a value of $\log_2$ (X/default_MBSize) (X is any positive integer, which is a multiple of 2) is encoded. In this event, an available maximum macroblock size may be selected as a value of X. Alternatively, when default_MBSize indicates the minimum macroblock size available for the current bitstream encoding or decoding, a value of $\log_2$ (default_MBSize/X) (X is any positive integer, which is a multiple of 2) is encoded. In this event, an available minimum macroblock size may be selected as the value of X.

Further, magnifications of the horizontal size and the vertical size may be encoded, respectively.

Alternatively, the macroblock size value may be an index value of a prearranged table between the video encoding apparatus and the video decoding apparatus.

In this event, the macroblock size to be transmitted may be encoded using various binary coding methods such as a unary code, a truncated unary code, Exp-Golomb code, etc.

In addition, block size information such as default_MBsize indicating the reference macroblock size and MB_size indicating the macroblock size can be encoded through the minimum subblock size and the maximum partition layer.

In a method of encoding default_minBlockSize, which is information on the reference minimum subblock size, a minimum subblock size to be actually encoded may be designated and a value indicating the number of times, by which a subblock is to be enlarged or reduced from a predetermined size, may be transmitted. Alternatively, as described in the aforementioned first method, the minimum subblock size value may be represented using smaller bits through applying a log function to the minimum subblock size value instead of encoding directly the minimum subblock size value.

More specifically, for example, when default_minBlockSize indicates the maximum subblock size according to the maximum macroblock size available for the current bitstream encoding or decoding, a value of $\log_2$ (X/default_minBlockSize) (X is any positive integer, which is a multiple of 2) is encoded. In this event, an available maximum subblock size may be selected as a value of X. Alternatively, when default_minBlockSize indicates the minimum subblock size according to the minimum macroblock size available for the current bitstream encoding or decoding, a value of $\log_2$ (default_minBlockSize/X) (X is any positive integer, which is a multiple of 2) is encoded. In this event, an available minimum subblock size may be selected as the value of X.

Further, magnifications of the horizontal size and the vertical size may be encoded, respectively.

Alternatively, the reference minimum subblock size may be an index value of a prearranged table between the video encoding apparatus and the video decoding apparatus.

In this event, the reference minimum subblock size may be encoded using various binary coding methods such as a unary code, a truncated unary code, Exp-Golomb code, etc.

The maximum partition layer information can be encoded into a binary bit string by using a lossless compression coding such as a binary arithmetic coding, a Huffman coding, etc. Alternatively, the maximum partition layer information can be encoded by using various binary coding methods such as a unary code, a truncated unary code, an Exp-Golomb code, etc.

D-1-2-4) Macroblock Size Encoding Method 4

Hereinafter, a fourth method of encoding the macroblock size is described.

According to the fourth method, after a flag indicating whether to use the reference macroblock size and a macroblock size selected in a case where the reference macroblock size is not used are encoded in a first picture, a flag indicating whether to use a macroblock size of a previous picture and a macroblock size of a current picture in a case where the macroblock size of the previous picture is not used may be encoded from a second picture.

In a method of encoding default_MB size, which is the information indicating the reference macroblock size or MB_size, which is the information indicating the current macroblock size, an actual macroblock size may be designated and a value indicating the number of times, by which a macroblock is to be enlarged or reduced from a predetermined size, may be transmitted. Alternatively, as described in the aforementioned first method, macroblock size values can be represented using smaller bits through applying a log function to the macroblock size values instead of directly encoding the macroblock size values.

Further, magnifications of the horizontal size and the vertical size may be encoded, respectively. Alternatively, the size values of macroblocks to be encoded may be index values of a table prearranged between the video encoding apparatus and the video decoding.

In this event, the macroblock size to be transmitted may be encoded using various binary coding methods such as a unary code, a truncated unary code, an Exp-Golomb code, etc.

An example of a syntax according to the aforementioned fourth method of encoding the macroblock size is represented as follows.

```
First picture
use_default_MBsize_flag
if(use_default_MBsize_flag == 0)
{
MB_size
}
From second picture
use_prevPic_MBsize_flag
if(use_prevPic_MBsize_flag == 0)
{
MB_size
}
```

Further, block size information such as MBsize indicating the macroblock size can be encoded through the minimum subblock size and the maximum partition layer.

A minimum subblock size to be actually encoded may be designated and a value indicating the number of times, by which a subblock is to be enlarged or reduced from a predetermined size, may be transmitted. Alternatively, as described in the aforementioned first method, a log function may be applied to the minimum subblock size value instead of directly encoding the minimum subblock size value.

Further, magnifications of the horizontal size and the vertical size may be encoded, respectively. Alternatively, the minimum subblock size may be an index value of a prearranged table between the video encoding apparatus and the video decoding apparatus.

In this event, the reference minimum subblock size may be encoded using various binary coding methods such as a unary code, a truncated unary code, Exp-Golomb code, etc.

The maximum partition layer information can be encoded into a binary bit string by using a lossless compression coding such as a binary arithmetic coding, a Huffman coding, etc. Alternatively, the maximum partition layer information can be encoded by using various binary coding methods such as a unary code, a truncated unary code, an Exp-Golomb code, etc.

When the reference macroblock size or the macroblock size is encoded by using the minimum subblock size and the maximum partition layer, an example of the aforementioned fourth syntax can be represented as follows.

```
First picture
use_defalt_MBsize_flag
if(use_defalt_MBsize_flag == 0)
{
minBlockSize
MaxLayer
}
From second picture
use_prevPic_MBsizeflag
if(use_prevPic_MBsize_flag == 0)
{
minBlockSize
MaxLayer
}
```

D-1-2-5) Macroblock Size Encoding Method 5

Hereinafter, a fifth method of encoding macroblock sizes will be described.

According to the fifth method, different macroblock sizes are used for an intra picture and an inter picture. That is, a macroblock size for the intra picture and a macroblock size for the inter picture are encoded in the sequence header. Alternatively, each macroblock size according to a picture type can be encoded only in headers of a first intra picture and a first inter picture. A method of encoding information on the macroblock size of the intra picture and the macroblock size of the inter picture may be used in combination with the aforementioned methods.

```
Sequence header
Set_intraMBsize_Flag
Set_interMBsize_Flag
if(Set_interMBsize_Flag == 1)
{
intraMBsize
}
if(Set_interMBsize_Flag == 1)
{
interMBsize
}
```

Further, information on the intra macroblock size or the inter macroblock size can be encoded through the minimum subblock size and the maximum partition layer.

When the intra macroblock size or the inter macroblock size is encoded by using the minimum subblock size and the maximum partition layer, an example of the aforementioned fifth syntax can be represented as follows.

```
Sequence header
Set_intraMBsize_Flag
Set_interMBsize_Flag
if(Set_intraMBsize_Flag == 1)
{
Intra_minBlockSize
Intra_MaxLayer
}
if(Set_interMBsize_Flag == 1)
{
Inter_minBlockSize
Inter_MaxLayer
}
```

D-1-3) Description of Encoding Method Order

Figure 36:
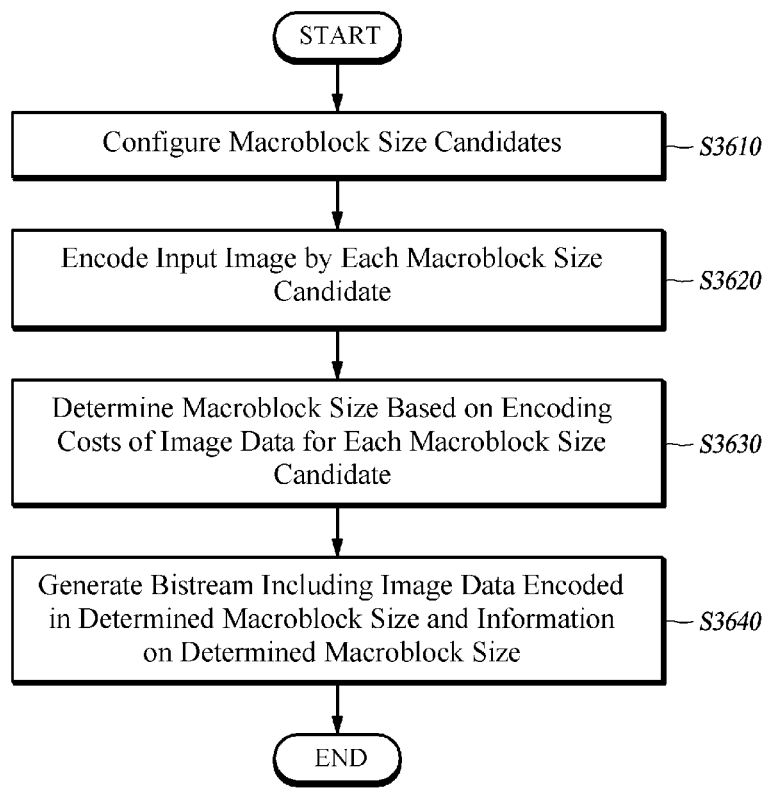
FIG. 36 is a flowchart for illustrating an implementation of a video encoding method according to another aspect of the present disclosure.

FIG. 36 is a flowchart for illustrating an implementation of a video encoding method according to another aspect of the present disclosure.

The video encoding apparatus configures macroblock size candidates in step S3610, encodes an input image by each macroblock size candidate in step S3620, determines a macroblock size based on encoding costs for each macroblock size candidate in step S3630, and generates a bitstream including image data encoded in the determined macroblock size and information on the determined macroblock size in step S3640. Since it has been described through FIG. 35 that the video encoding apparatus configures macroblock size candidates, encodes an image for each macroblock size candidate, and determines a macroblock size based on encoding costs of encoded image data for each macroblock size candidate, its detailed description is omitted.

D-2) Video Decoding Apparatus

D-2-1) Description of Decoding Apparatus

Figure 37:
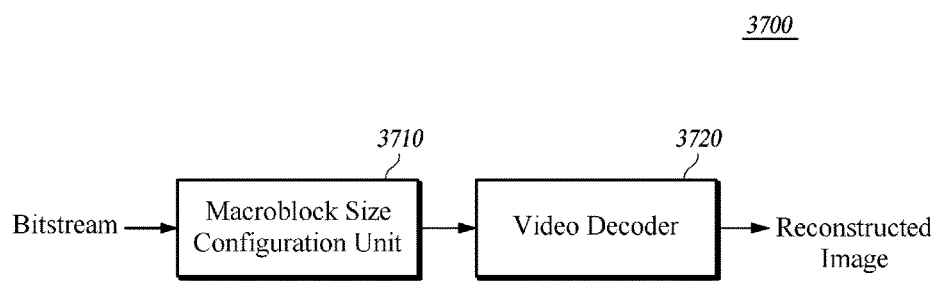
FIG. 37 is a block diagram for illustrating an implementation of a video decoding apparatus according to another aspect of the present disclosure.

FIG. 37 is a block diagram for illustrating an implementation of a video decoding apparatus according to another aspect of the present disclosure.

According to the implementation of the video decoding apparatus according to another aspect of the present disclosure, the video decoding apparatus 3700 may include a macroblock size configuration unit 3710 and a video decoder 3720. Each of the macroblock size configuration unit 3710 and the video decoder 3720 comprises one or more processors and/or application-specific integrated circuits (ASICs) specified for respectively corresponding operations and functions described hereinafter.

The macroblock size configuration unit 3710 extracts information on a macroblock size from the bitstream before performing a decoding by unit of macroblocks and configures a macroblock size by using the extracted information.

When it is prearranged between the video encoding apparatus and the video decoding apparatus that the information on the macroblock size is included in the bitstream only once, an image can be reconstructed by decoding theinformation into the bitstream for an entire image only once and using the extracted macroblock size in the entire image decoding. When it is prearranged that the macroblock size is encoded/decoded in every picture, the image can be reconstructed by extracting the macroblock size from the bitstream in every picture and using different macroblock sizes in every picture. Further, according to another aspect of the present disclosure, the image can be reconstructed by extracting the macroblock size in every picture, slice, or macroblock layer and using the selected macroblock size.

The video decoder 3720 may be implemented as the video decoding apparatus according to an aspect of the present disclosure described with reference to FIG. 32, and sizes and shapes of subblocks split for the prediction or the transform within the macroblock are reconstructed by decoding partition information according to the reconstructed macroblock size through methods according to the aforementioned aspects. Respective subblocks are reconstructed by extracting and decoding encoded image data of the respective subblocks from the bitstream.

D-2-2) Macroblock Size Information Decoding Method

Hereinafter, various methods of encoding the macroblock size according to aspects of the present disclosure are described.

D-2-2-1) Macroblock Size Information Decoding Method 1

A decoding method according to the first method of encoding the macroblock size is first described.

A flag (Set_MBsize_flag) indicating whether to transmit information on the macroblock size may be included, the flag (Set_MBsize_flag) indicating whether to transmit information on the macroblock size is entropy-decoded in a prearranged position such as the sequence header, the header of each picture, or the slice header. When the decoded flag has a value indicating that the macroblock size is not transmitted, a macroblock having a predetermined size prearranged between the video encoding apparatus and the video decoding apparatus, for example, a 16×16 block is used as the macroblock.

When the decoded macroblock size designating flag (Set_MBsize_flag) indicates that the macroblock size is designated, the macroblock size is entropy-decoded and extracted through a method prearranged between the video encoding apparatus and the video decoding apparatus among various entropy decoding methods such as a unary code, a truncated unary-code, an Exp-Golomb code, etc.

When a horizontal size and a vertical size of the macroblock are separately set and then transmitted, the horizontal size and the vertical size may be obtained by entropy-decoding each of the sizes. Alternatively, if a square macroblock is used, only information indicating one side of the square macroblock may be entropy decoded.

A decoded value may be designated as the actual macroblock size, and a value indicating the number of times, by which a macroblock is to be enlarged or reduced from a predetermined size, may be transmitted. Further, when the video encoding apparatus encodes a value generated by applying a log function to the macroblock size value, the macroblock size may be set by applying an exponential function to the entropy-decoded value. For example, when the video encoding apparatus encodes y, which is a value of $\log_2$ (MBsize selected in the encoder/X) (X is any positive integer, which is a multiple of 2), the video decoding apparatus entropy-decodes y and can obtain the macroblock size selected in the encoder by multiplying $2^y$ and X. Here, X corresponds to a prearranged value between the video encoding apparatus and the video decoding apparatus or a value extracted from the bitstream before a macroblock size decoding. When a minimum macroblock size available for X is selected and used and the available minimum macroblock size is 8×8, the macroblock size is set to 8×8 if a decoded value of y is "0", and the macroblock size is set to 16×16 if the decoded value of y is '1". When the available minimum macroblock size is 16×16, "16" instead of "8" is used as X, and the macroblock size is set to 16×16 if the decoded value of y is "0".

Further, when the video encoding apparatus decodes magnifications of the horizontal size and the vertical size, respectively, the macroblock size may be obtained by entropy-decoding the magnifications of the horizontal size and the vertical size, respectively.

In addition, when an index value of a prearranged table between the video encoding apparatus and the video decoding apparatus is encoded, the macroblock size may be obtained by using a decoded value as the index value of the table.

In this event, the macroblock size to be transmitted may be decoded using various binary coding methods such as a unary code, a truncated unary code, an Exp-Golomb code, etc. Hereinafter, it is not described to separately decode and extract the horizontal size and the vertical size for the convenience of descriptions, but it is applicable to separately extract the horizontal size and the vertical size. Further, although it is exemplified to decode data on the sequence header and the picture header, the macroblock size may be decoded on a slice header or a macroblock header when the video encoding apparatus encodes the macroblock size in the slice header or the macroblock header.

When it is prearranged between the video encoding apparatus and the video decoding apparatus that the minimum subblock size and the maximum partition layer are used as information on the macroblock size, information on the minimum subblock size and the maximum partition layer is extracted and decoded from the bitstream, and then the macroblock size can be reconstructed.

When the decoded macroblock size designating flag (Set_MBsize_flag) indicates that the macroblock size is designated, the minimum subblock size is entropy-decoded and extracted through a prearranged method between the video encoding apparatus and the video decoding apparatus among various entropy decoding methods such as a unary code, a truncated unary-code, an Exp-Golomb code, etc.

When the horizontal size and the vertical size of the minimum subblock size are separately set and then transmitted, the horizontal size and the vertical size may be obtained by entropy-decoding each of the sizes. Alternatively, if a square macroblock is used, only information indicating one side of the square macroblock may be entropy-decoded.

A decoded value may be designated as the actual minimum subblock size, and a value indicating the number of times, by which a subblock is to be enlarged or reduced from a predetermined size, may be transmitted. Further, when the video encoding apparatus encodes a value generated by applying a log function to the minimum subblock size value, the minimum subblock size may be set by applying an exponential function to the entropy-decoded value. For example, when the video encoding apparatus encodes y, which is a value of $\log_2$ (minBlockSize selected in the video encoding apparatus according to the selected macroblock size/X) (X is any positive integer, which is a multiple of 2), the video decoding apparatus entropy-decodes y and can obtain the minimum subblock size according to the macroblock size selected in the video encoding apparatus by multiplying $2_y$ and X. Here, X corresponds to a prearranged value between the video encoding apparatus and the video decoding apparatus or a value extracted from the bitstream before a minimum subblock size decoding. When a minimum subblock size available for X is selected and used and the available minimum subblock size is 4×4, the minimum subblock size is set to 4×4 if a decoded value of y is "0", and the minimum subblock size is set to 8×8 if the decoded value of y is "1". When the available minimum subblock size is 8×8, "8" instead of "4" is used as X, and the minimum subblock size is set to 8×8 if the decoded value of y is "0".

Further, when the video encoding apparatus decodes magnifications of the horizontal size and the vertical size, respectively, the minimum subblock size may be obtained by entropy-decoding the magnifications of the horizontal size and the vertical size, respectively.

In addition, when an index value of a prearranged table between the video encoding apparatus and the video decoding apparatus is encoded, the minimum subblock size may be obtained by using a decoded value as the index value of the table.

In this event, the minimum subblock size may be decoded using various binary coding methods such as a unary code, a truncated unary code, an Exp-Golomb code, etc.

The maximum partition layer information is decoded by using lossless compression coding such as a binary arithmetic coding, a Huffman coding, etc., and can be decoded by using various methods such as a unary code, a truncated unary code, an Exp-Golomb code, etc.

When the reconstructed minimum subblock size is N×N and the maximum partition layer is x, the macroblock size is (N×2$^x$)×(N×2$^x$).

E-2-2-2) Macroblock Size Information Decoding Method 2

Hereinafter, a decoding method according to the second method of encoding the macroblock size is described.

According to the second method, a prearranged size M×N between the video encoding apparatus and the video decoding apparatus is set as the reference macroblock size, and a flag indicating whether to use the reference macroblock size is entropy-decoded from a header of each picture, a slice header, and a macroblock header. When a value of the decoded flag indicates that the reference macroblock size is not used, information related to the macroblock is extracted by entropy-decoding macroblock size information, and the macroblock size is set. When the value of the decoded flag indicates that the reference macroblock size is used, it means that the macroblock size information is not included in the bitstream, so that a preset reference macroblock size is set as the macroblock size and a series of decoding processes are performed.

When the reference macroblock size is included in the sequence header and transmitted to the video decoding apparatus from the video encoding apparatus, the reference macroblock size may be extracted from a prearranged position such as the sequence header, etc. within the bitstream. Here, the reference macroblock size or the current macroblock size is allocated an entropy-decoded value, and the macroblock size may be obtained by scaling (enlarging or reducing) a predetermined size by the entropy-decoded value. Alternatively, as described in the aforementioned first decoding method, when the video encoding apparatus encodes a value generated by applying a log function to the macroblock size value, the macroblock size value may be obtained by using an exponential function.

Further, when the video encoding apparatus decodes magnifications of the horizontal size and the vertical size, respectively, the macroblock size can be obtained by entropy-decoding the magnifications of the horizontal size and the vertical size, respectively.

In addition, when an index value of a prearranged table between the video encoding apparatus and the video decoding apparatus is encoded, the macroblock size can be obtained by using a decoded value as the index value of the table.

In this event, the macroblock size to be transmitted can be decoded using various binary coding methods such as a unary code, a truncated unary code, an Exp-Golomb code, etc.

Further, when information on the reference macroblock size or the macroblock size corresponds to information on the minimum subblock size and the maximum partition layer, information on a reference minimum subblock size according to the reference macroblock size or the minimum subblock size according to the macroblock size and information on the maximum partition layer are extracted and decoded from the bitstream, and then the macroblock size is decoded.

Here, the reference minimum subblock size and the minimum subblock size can be extracted from a prearranged position such as a sequence within the bitstream. The reference minimum subblock size and the current minimum subblock size can be is allocated an entropy-decoded value, and the minimum subblock size may be obtained by scaling (enlarging or reducing) a predetermined size by the entropy-decoded value. Alternatively, as described in the aforementioned first decoding method, when the video encoding apparatus encodes a value generated by applying a log function to the minimum subblock size value, the minimum subblock size value may be obtained by using an exponential function.

Further, when the video encoding apparatus decodes magnifications of the horizontal size and the vertical size, respectively, the minimum subblock size can be obtained by entropy-decoding the magnifications of the horizontal size and the vertical size, respectively.

In addition, when an index value of a prearranged table between the video encoding apparatus and the video decoding apparatus is encoded, the minimum subblock size can be obtained by using a decoded value as the index value of the table.

In this event, the minimum subblock size can be decoded using various binary coding methods such as a unary code, a truncated unary code, an Exp-Golomb code, etc.

The maximum partition layer information can be decoded by using a lossless compression coding such as a binary arithmetic coding, a Huffman coding, etc, and various binary coding methods such as a unary code, a truncated unary code, an Exp-Golomb code, etc.

When the reconstructed minimum subblock size is N×N and the maximum partition layer is x, the macroblock size is $(N \times 2^x) \times (N \times 2^x)$.

D-2-2-3) Macroblock Size Information Decoding Method 3

Hereinafter, a decoding method according to the third method of encoding the macroblock size is described.

According to the third method, the video decoding apparatus extracts a flag indicating whether to use the reference macroblock size and/or additional information indicating an enlargement or a reduction by a predetermined ratio with respect to the reference macroblock size from the bitstream, and then the macroblock size may be extracted using the above information.

First, a size N×N is set as the reference macroblock size and the flag indicating whether to use the reference macroblock size is decoded in every header of each picture, slice header, and macroblock header. When the flag indicates that the reference macroblock size is used, the current macroblock size is equally set to the reference macroblock size and a decoding is performed using the set macroblock size in the unit of macroblocks. However, when the flag indicates that the reference macroblock size is not used, a value enlarged or reduced with respect to the reference macroblock size by a predetermined ratio prearranged between the video encoding apparatus and the video decoding apparatus is set as the current macroblock size and a decoding is performed in the unit of macroblocks. For example, a size enlarged or reduced twice from the horizontal size and the vertical size of the reference macroblock may be set as the current macroblock size.

When the video encoding apparatus uses various enlarging or reducing ratios, includes a selected ratio in the bitstream, and encodes the bitstream, the video decoding apparatus can obtain various ratios by decoding the number of bits prearranged between the video encoding apparatus and the video decoding apparatus from the bitstream in a flag entropy decoding.

Alternatively, when information indicating an enlarging ratio or a reducing ratio is included in the bitstream and encoded in addition to the flag indicating whether to use the reference macroblock size, the enlarging ratio or the reducing ratio may be either decoded or not according to a value of the flag indicating whether to use the reference macroblock size after the flag is decoded. If the enlarging ratio or the reducing ratio is not decoded, the reference macroblock size is set as the current macroblock size and then decoding processes are performed.

When the decoded flag indicates that the reference macroblock size is different from the current macroblock size and the decoded ratio is the enlarging ratio, the reference macroblock size is set as the minimum macroblock size available for the current bitstream encoding or decoding, and then a size enlarged from the reference macroblock size by the entropy decoded ratio is set as the current macroblock size. On the contrary, when the entropy-decoded ratio is the reducing ratio, the reference macroblock size is set as the maximum macroblock size available for the current bitstream encoding or decoding, and then a size reduced with respect to the reference macroblock size by the entropy-decoded ratio is set as the current macroblock size.

According to an embodiment of the present disclosure, when a flag indicating whether to set the reference macroblock size is included in the sequence header of the bitstream and then transmitted, the decoder entropy-decodes the flag from the sequence header. And then, when the flag indicates that the reference macroblock size is set, the decoder extracts reference macroblock size information from a prearranged position such as the sequence header of the bitstream and sets the reference macroblock size by using the extracted information. When the flag indicates that the reference macroblock size is not set, a predetermined size prearranged between the video encoding apparatus and the video decoding apparatus, for example, a size 16×16 may be used as the reference macroblock size.

According to an embodiment of the present disclosure, the video decoding apparatus extracts information indicating the maximum macroblock size available for the current bitstream encoding or decoding from the bitstream and can use the extracted information in setting the reference macroblock size. According to another embodiment of the present disclosure, the video decoding apparatus extracts information indicating the minimum macroblock size available for the current bitstream encoding or decoding from the bitstream and can use the extracted information in setting the reference macroblock size. According to yet another embodiment of the present disclosure, the video decoding apparatus extracts information indicating both the maximum macroblock size and the minimum macroblock size available for the current bitstream encoding or decoding from the bitstream and can use the extracted information in setting the reference macroblock size.

In a method of decoding default_MBsize, which is the information indicating the reference macroblock size, an entropy-decoded value itself can be set as a reference macroblock size value, and the reference macroblock size can be obtained through an enlargement or a reduction from a predetermined size by using the entropy-decoded value as an enlarging ratio or a reducing ratio. Alternatively, as described in the aforementioned first decoding method, when the video encoding apparatus encodes a value generated by applying a log function to the macroblock size value, the macroblock size value may be obtained using an exponential function.

More specifically, for example, when default_MBsize indicates the maximum macroblock size available for the current bitstream encoding or decoding and the video encoding apparatus encodes y, which is a value of $\log_2$ (X/default_MBsize) (X is any positive integer, which is a multiple of 2), the video decoding apparatus can obtain default_MBsize by entropy-decoding y and multiplying X and $2^y$. In this event, X may be a value prearranged between the video encoding apparatus and the video decoding apparatus like the available maximum macroblock size or a value extracted from the bitstream before decoding default_MBsize.

Alternatively, when default_MBsize indicates the minimum macroblock size available for the current bitstream encoding or decoding and the video encoding apparatus encodes y, which is a value of $\log_2$ (X/default_MBsize) (X is any positive integer, which is a multiple of 2), the video decoding apparatus extracts y from the bitstream through an entropy decoding. And then, the video decoding apparatus sets a value generated by multiplying X and $2^y$ as default_MBsize. In this event, X may be a value prearranged between the video encoding apparatus and the video decoding apparatus like the available minimum macroblock size or a value extracted from the bitstream before decoding default_MBsize.

Further, when the video encoding apparatus decodes magnifications of the horizontal size and the vertical size, respectively, the reference macroblock size can be obtained by entropy-decoding the magnifications of the horizontal size and the vertical size, respectively.

In addition, when an index value of a prearranged table between the video encoding apparatus and the video decoding apparatus is encoded, the reference macroblock size can be obtained by using a decoded value as the index value of the table.

In this event, the reference macroblock size can be decoded using various binary coding methods such as a unary code, a truncated unary code, an Exp-Golomb code, etc.

Further, when information on the reference macroblock size or the macroblock size corresponds to information on the minimum subblock size and the maximum partition layer, information on a reference minimum subblock size according to the reference macroblock size or the minimum subblock size according to the macroblock size and information on the maximum partition layer are extracted and decoded from the bitstream, and then the macroblock size is decoded.

In a method of decoding default_minBlockSize, which is the information indicating the reference minimum subblock size, an entropy decoded value itself can be set as a reference minimum subblock size value and the reference minimum subblock size can be obtained through an enlargement or a reduction from a predetermined size by using the entropy-decoded value as an enlarging ratio or a reducing ratio. Alternatively, as described in the aforementioned first decoding method, when the video encoding apparatus encodes a value generated by applying a log function to the minimum subblock size value, the minimum subblock size value may be obtained using an exponential function.

More specifically, for example, when default_minBlockSize indicates the maximal minimum subblock size available for the current bitstream encoding or decoding and the video encoding apparatus encodes y, which is a value of $\log_2$ (X/default_minBlockSize) (X is any positive integer, which is a multiple of 2), the video decoding apparatus can obtain default_minBlockSize by entropy-decoding y and multiplying X and $2^y$. In this event, X may be a prearranged value between the video encoding apparatus and the video decoding apparatus like the available maximal minimum subblock size or a value extracted from the bitstream before decoding default_minBlockSize.

Alternatively, when default_minBlockSize indicates the minimal minimum subblock size available for the current bitstream encoding or decoding and the video encoding apparatus encodes y, which is a value of $\log_2$ (X/default_minBlockSize) (X is any positive integer, which is a multiple of 2), the video decoding apparatus entropy-decodes and extracts y from the bitstream through an entropy decoding. And then, the video decoding apparatus sets a value generated by multiplying X and $2^y$ as default_minBlockSize. In this event, X may be a prearranged value between the video encoding apparatus and the video decoding apparatus like the available minimal minimum subblock size or a value extracted from the bitstream before decoding default_minBlockSize.

Further, when the video encoding apparatus decodes magnifications of the horizontal size and the vertical size, respectively, the reference minimum subblock size can be obtained by entropy-decoding the magnifications of the horizontal size and the vertical size, respectively.

In addition, when an index value of a prearranged table between the video encoding apparatus and the video decoding apparatus is encoded, the reference minimum subblock size can be obtained by using a decoded value as the index value of the table.

In this event, the reference minimum subblock size can be decoded using various binary coding methods such as a unary code, a truncated unary code, an Exp-Golomb code, etc.

The maximum partition layer information can be decoded by using a lossless compression coding such as a binary arithmetic coding, a Huffman coding, etc., and various methods such as a unary code, a truncated unary code, an Exp-Golomb code, etc.

When the reconstructed minimum subblock size is N×N and the maximum partition layer is x, the macroblock size is $(N \times 2^x) \times (N \times 2^x)$.

D-2-2-4) Macroblock Size Information Decoding Method 4

Hereinafter, a decoding method according to the fourth method of encoding the macroblock size is described.

According to the fourth method, after a flag indicating whether to use the reference macroblock size and a macroblock size selected in a case where the reference macroblock size is not used are encoded in a first picture, a flag indicating whether to use a macroblock size of a previous picture and a macroblock size of a current picture in a case where the macroblock size of the previous picture is not used may be encoded from a second picture.

When the flag indicating whether to use the reference macroblock size indicates that the reference macroblock size is used, the macroblock size is equally set to the reference macroblock size and then a first picture decoding is started.

From a second picture, a flag indicating whether to use a macroblock size of a previous picture as a macroblock size of a current picture is decoded and then macroblock size information for a current picture decoding is decoded when the macroblock size of the previous picture is not used. When the macroblock size of the previous picture is used for the current picture decoding, a macroblock size is set to a value equal to the macroblock size of the previous picture and a second picture is decoded.

In a method of decoding default_MBsize, which is the information indicating the reference macroblock size, or MB_size, which is information indicating the macroblock size of the current picture, an entropy-decoded value can be used as the macroblock size and the macroblock size can be obtained through an enlargement or a reduction from a predetermined size by using the entropy-decoded value as an enlarging ratio or a reducing ratio. Alternatively, as described in the aforementioned first decoding method, when the video encoding apparatus encodes a value generated by applying a log function to the macroblock size value, the macroblock size value may be obtained using an exponential function.

Further, when the video encoding apparatus decodes magnifications of the horizontal size and the vertical size, respectively, the reference macroblocksize can be obtained by entropy-decoding the magnifications of the horizontal size and the vertical size, respectively.

In addition, when an index value of a prearranged table between the video encoding apparatus and the video decoding apparatus is encoded, the reference macroblock size can be obtained by using a decoded value as the index value of the table.

In this event, the reference macroblock size can be decoded using various binary coding methods such as a unary code, a truncated unary code, an Exp-Golomb code, etc.

Further, when macroblock size information corresponds to information on the minimum subblock size and the maximum partition layer, minimum subblock size information and maximum partition layer information are entropy-decoded from the bitstream and then the macroblock size is decoded.

In a method of decoding default_minBlockSize, which is the information indicating the reference minimum subblock size, or minblockSize, which is information indicating the minimum subblock size of the current picture, an entropy-decoded value can be used as the minimum subblock size and the minimum subblock size can be obtained through an enlargement or a reduction from a predetermined size by using the entropy-decoded value as an enlarging ratio or a reducing ratio. Alternatively, as described in the aforementioned first decoding method, when the video encoding apparatus encodes a value generated by applying a log function to the minimum subblock size value, the minimum subblock size value may be obtained using an exponential function.

Further, when the video encoding apparatus decodes magnifications of the horizontal size and the vertical size, respectively, the reference minimum subblock size can be obtained by entropy-decoding the magnifications of the horizontal size and the vertical size, respectively.

In addition, when an index value of a prearranged table between the video encoding apparatus and the video decoding apparatus is encoded, the reference minimum subblock size can be obtained by using a decoded value as the index value of the table.

In this event, the reference minimum subblock size can be decoded using various binary coding methods such as a unary code, a truncated unary code, an Exp-Golomb code, etc.

The maximum partition layer information can be decoded by using a lossless compression coding such as a binary arithmetic coding, a Huffman coding, etc., and various methods such as a unary code, a truncated unary code, an Exp-Golomb code, etc.

When the reconstructed minimum subblock size is N×N and the maximum partition layer is x, the macroblock size is $(N \times 2^x) \times (N \times 2^x)$.

D-2-2-5) Macroblock Size Information Decoding Method 5

Hereinafter, a decoding method according to the fifth method of encoding the macroblock size is described.

According to the fifth method, macroblock sizes of the intra picture and the inter picture are extracted from prearranged positions within the bitstream between the video encoding apparatus and the video decoding apparatus, respectively, and a macroblock size according to the picture type is set.

Flags indicating whether to decode a macroblock size for the intra picture and indicating whether to decode a macroblock size for the inter picture are reconstructed in the sequence header or the picture header, respectively, and then the macroblock size for the intra picture or the inter picture is decoded according to a value of the flag through the bitstream or the image is reconstructed using a prearranged macroblock size.

A method of decoding information on the macroblock size of the intra picture and the macroblock size of the inter picture may be used in combination with the aforementioned decoding methods according to the aforementioned encoding methods.

Further, when information on the intra macroblock size or the inter macroblock size corresponds to information on the minimum subblock size and the maximum partition layer, minimum subblock size information and maximum partition layer information are entropy-decoded from the bitstream and then the macroblock size is decoded.

A method of decoding information on the minimum subblock size of the intra picture or the minimum subblock size of the inter picture can be used in combination with the aforementioned decoding methods according to the aforementioned encoding methods.

The maximum partition layer information can be decoded by using a lossless compression coding such as a binary arithmetic coding, a Huffman coding, etc., and various methods such as a unary code, a truncated unary code, an Exp-Golomb code, etc.

When the reconstructed minimum subblock size is N×N and the maximum partition layer is x, the macroblock size is $(N \times 2^x) \times (N \times 2^x)$.

D-2-3) Flowchart for Illustrating Decoding Operation

Meanwhile, a video decoding method according to an aspect of the present disclosure may include extracting information on a macroblock size from the bitstream and configuring a macroblock size by using the extracted information in step S3810, extracting encoded image data from the bitstream and generating a reconstructed image by decoding the encoded image data according to a block size identified by information on the block size in step S3820.

It will be apparent to those skilled in the art that respective aspects of determining the macroblock size and encoding and decoding information on the macroblock size can be implemented in various manners by combining them with respective aspects of splitting the macroblock and encoding and decoding macroblock partition information according to the aforementioned aspects of the present disclosure.

Main features of the present disclosure are summarized as follows.

Employing blocks having a variable size (e.g. macroblock, which is the encoding/decoding units)

Determining a block size having a variable size and encoding size information

Splitting a block having a determined size into subblocks and encoding partition information Meanwhile, as an example of the macroblock split according to aspects of the present disclosure, the splitting for the prediction or the transform has been described in the aforementioned aspects. However, the prediction or the transform is only an example to which the splitting can be applied, but the macroblock can be split for various purposes in addition to the prediction or the transform. Further, a subject to be split is not only the macroblock but also any image area. For example, even when a block having a predetermined size, which corresponds to the prediction unit, is split into subblocks for an efficient transform, the splitting according to the aspects of the present disclosure can be used.

In other words, the present disclosure provides various splitting methods and a method and an apparatus for efficiently encoding and decoding information on the splitting when it is required to split an image block into subblocks for any purpose.

Meanwhile, a video encoding and/or decoding apparatus according to an aspect of the present disclosure can be implemented by connecting an input terminal of a video decoding apparatus according to an aspect of the present disclosure with an output terminal of a video decoding apparatus according to an aspect of the present disclosure.

A video encoding and/or decoding apparatus according to an aspect of the present disclosure includes a video encoder for encoding an image through generating an encoded image data by encoding a current block partitioned into a plurality of subblocks and generating an encoded partition information data by encoding a partition information of the current block; and a video decoder for decoding the image through reconstructing the partition information of the current block by decoding the encoded partition information data extracted from a bitstream and reconstructing the current block partitioned into the plurality of subblocks by decoding the encoded image data extracted from the bitstream, according to a reconstructed partition information of the current block.

A video encoding and/or decoding method according to various embodiments of the present disclosure includes encoding an image through generating an encoded image data by encoding a current block partitioned into a plurality of subblocks and generating an encoded partition information data by encoding a partition information of the current block; and decoding the image through reconstructing the partition information of the current block by decoding the encoded partition information data extracted from a bitstream and reconstructing the current block partitioned into the plurality of subblocks by decoding the encoded image data extracted from the bitstream, according to a reconstructed partition information of the current block.

According to various embodiments of the present disclosure as described above, an efficient video encoding and decoding is able to be achieved by encoding an image through the use of variable sized macroblocks and various sizes of subblocks when a high resolution image is encoded, and encoding and decoding block partition information.

In the description above, although all of the components of the embodiments of the present disclosure have been explained as assembled or operatively connected as a unit, the present disclosure is not intended to limit itself to such embodiments. Rather, within the objective scope of the present disclosure, the respective components are able to be selectively and operatively combined in any numbers. Every one of the components is also implemented by itself in hardware while the respective ones can be combined in part or as a whole selectively and implemented in a computer program having program modules for executing functions of the hardware equivalents. Codes or code segments to constitute such a program are easily deduced by a person of ordinary skill in the art. The computer program is stored in non-transitory computer readable media, which in operation can realize various embodiments of the present disclosure. Examples of the non-transitory computer readable recording medium include magnetic recording media, such as a hard disk, a floppy disk, and a magnetic tape, and optical recording media, such as a compact disk read only memory (CD-ROM) and a digital video disk (DVD), magneto-optical media, such as a floptical disk, and hardware devices that are specially configured to store and execute program instructions, such as a ROM, a random access memory (RAM), and a flash memory.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those of ordinary skill in the art will appreciate that various modifications, additions and substitutions are possible, without the spirit and scope of the claimed invention. Specific terms used in this disclosure and drawings are used for illustrative purposes and not to be considered as limitations of the present disclosure. Therefore, exemplary embodiments of the present disclosure have not been described for limiting purposes. Accordingly, the scope of the claimed invention is not to be limited by the above embodiments but by the claims and the equivalents thereof.

The invention claimed is:

1. A method of decoding a video in the unit of blocks at a video decoding apparatus, the method comprising:
   extracting and decoding a first information indicating a minimum block size and a second information indicating an enlarging ratio relative to the minimum block size, from a bitstream encoded by a video encoding apparatus, wherein the first and second information are values of log scale;
   setting a maximum block size to a size enlarged from the minimum block size by the enlarging ratio, and setting a size of a square current block to be decoded as the maximum block size; and
   reconstructing one or more subblocks in the current block which has the maximum block size, by decoding, from the bitstream, partition information of the current block by a tree structure, wherein the subblocks in the current block have sizes equal to or larger than the minimum block size,
   wherein the decoding of the partition information comprises:
   reconstructing, from the bitstream, a partition flag indicating whether or not each node of the tree structure, starting from a node of an uppermost layer corresponding to the current block, is divided into four nodes of a lower layer; and
   identifying blocks corresponding to nodes which are not further divided as the subblocks in the current block,
   wherein the partition flag indicating whether a node, which corresponds to a block having the minimum subblock size, is divided is not included in the bitstream.

2. The method of claim 1, wherein the maximum block size is determined from among 16*16, 32*32 and 64*64.

3. The method of claim 1, wherein when a node of the tree structure is divided into nodes of a lower layer, a block corresponding to the node is divided into four equal-sized square blocks corresponding to the nodes of the lower layer.

4. The method of claim 1, wherein the partition flag is decoded by a binary arithmetic coding.

5. A video decoding apparatus of decoding a video in the unit of blocks, the apparatus comprising a microprocessor configured to:
   extract and decode a first information indicating a minimum block size and a second information indicating an enlarging ratio relative to the minimum block size, from a bitstream encoded by a video encoding apparatus, wherein the first and second information are values of log scale,
   set a maximum block size to a size enlarged from the minimum block size by the enlarging ratio, and set a size of a square current block to be decoded as the maximum block size; and
   reconstructing one or more subblocks in the current block which has the maximum block size, by decoding, from the bitstream, partition information of the current block by a tree structure, wherein the subblocks in the current block have sizes equal to or larger than the minimum block size,
   wherein the microprocessor is configured to decode the partition information by:
   reconstructing, from the bitstream, a partition flag indicating whether or not each node of the tree structure, starting from a node of an uppermost layer corresponding to the current block, is divided into four nodes of a lower layer; and
   identifying blocks corresponding to nodes which are not further divided as the subblocks in the current block,
   wherein the partition flag indicating whether a node, which corresponds to a block having the minimum subblock size, is divided is not included in the bitstream.

6. The apparatus of claim 5, wherein the maximum block size is determined from among 16*16, 32*32 and 64*64.

7. The apparatus of claim 5, wherein when a node of the tree structure is divided into nodes of a lower layer, a block corresponding to the node is divided into four equal-sized square blocks corresponding to the nodes of the lower layer.

8. The apparatus of claim 5, wherein the partition flag is decoded by a binary arithmetic coding.

* * * * *